US009985872B2

(12) United States Patent
Jaffer et al.

(10) Patent No.: US 9,985,872 B2
(45) Date of Patent: May 29, 2018

(54) ROUTER WITH BILATERAL TCP SESSION MONITORING

(71) Applicant: 128 Technology, Inc., Burlington, MA (US)

(72) Inventors: Sarah V. Jaffer, Billerica, MA (US); Abilash Menon, Boxborough, MA (US); Anna Yungelson, Lexington, MA (US); Patrick Timmons, Newton, MA (US)

(73) Assignee: 128 Technology, Inc., Burlington, MA (US)

( * ) Notice: Subject to any disclaimer, the term of this patent is extended or adjusted under 35 U.S.C. 154(b) by 70 days.

(21) Appl. No.: 15/283,946

(22) Filed: Oct. 3, 2016

(65) Prior Publication Data
US 2018/0097720 A1 Apr. 5, 2018

(51) Int. Cl.
*H04L 12/28* (2006.01)
*H04L 12/707* (2013.01)
*H04L 29/06* (2006.01)
*H04L 12/755* (2013.01)
*H04L 29/08* (2006.01)

(52) U.S. Cl.
CPC ............ *H04L 45/22* (2013.01); *H04L 45/021* (2013.01); *H04L 67/142* (2013.01); *H04L 67/2804* (2013.01); *H04L 69/16* (2013.01)

(58) Field of Classification Search
None
See application file for complete search history.

(56) References Cited

U.S. PATENT DOCUMENTS

| 5,754,754 A | 5/1998 | Dudley et al. |
| 6,515,963 B1 | 2/2003 | Bechtolsheim et al. |

(Continued)

FOREIGN PATENT DOCUMENTS

| CN | 101552703 A | 10/2009 |
| CN | 101646220 A | 2/2010 |

(Continued)

OTHER PUBLICATIONS

Berners-Lee et al., *Uniform Resource Identifier (URI): Generic Syntax*, Network Working Group, Request for Comments 3986, The Internet Society, 61 pages, Jan. 2005.

(Continued)

*Primary Examiner* — Otis L Thompson, Jr.
(74) *Attorney, Agent, or Firm* — Sustein Kann Murphy & Timbers LLP

(57) ABSTRACT

A router is specially configured to implement a bilateral TCP state machine to monitor the status of TCP sessions based on TCP sequence numbers in both forward session packets and return session packets received by the router for a TCP bi-flow session. Among other things, the router may determine the status of a TCP session, for example, based on statistical information such as the number or rate of errors detected (e.g., the number of dropped packets, duplicated packets, out-of-sequence packets, and/or out-of-window packets). Each router is typically configured to collect and store status information and optionally also to use the status information in making intelligent routing decisions, such as, for example, deciding whether or not to forward a particular packet, deciding whether to reconfigure a bi-flow routing session, or updating routing table information used for routing packets.

30 Claims, 35 Drawing Sheets

(56) References Cited

U.S. PATENT DOCUMENTS

| | | | |
|---|---|---|---|
| 6,563,824 B1 | 5/2003 | Bhatia et al. |
| 6,584,071 B1 | 6/2003 | Kodialam et al. |
| 6,721,334 B1 | 4/2004 | Ketcham |
| 6,738,387 B1 | 5/2004 | Lin et al. |
| 6,778,531 B1 | 8/2004 | Kodialam et al. |
| 6,798,743 B1 | 9/2004 | Ma et al. |
| 7,020,143 B2 | 3/2006 | Zdan |
| 7,035,214 B1 | 4/2006 | Seddigh et al. |
| 7,106,739 B2 | 9/2006 | Beier |
| 7,154,902 B1 | 12/2006 | Sikdar |
| 7,218,632 B1 | 5/2007 | Bechtolsheim et al. |
| 7,315,541 B1 | 1/2008 | Housel et al. |
| 7,373,660 B1 | 5/2008 | Guichard et al. |
| 7,466,703 B1 | 12/2008 | Arunachalam et al. |
| 7,536,720 B2 | 5/2009 | Burdett et al. |
| 7,634,805 B2 | 12/2009 | Aroya |
| 7,706,411 B2 | 4/2010 | Wakumoto et al. |
| 7,730,301 B2 | 6/2010 | Correll et al. |
| 7,773,611 B2 | 8/2010 | Booth, III et al. |
| 7,872,973 B2 | 1/2011 | Sterne et al. |
| 8,068,417 B1 | 11/2011 | Roberts |
| 8,094,560 B2 | 1/2012 | Bagepalli et al. |
| 8,139,479 B1 | 3/2012 | Raszuk |
| RE44,119 E | 4/2013 | Wang et al. |
| 8,437,248 B2 | 5/2013 | Li et al. |
| 8,527,641 B2 | 9/2013 | Degaonkar et al. |
| 8,570,893 B2 | 10/2013 | Guo et al. |
| 8,584,199 B1 | 11/2013 | Chen et al. |
| 8,634,428 B2 | 1/2014 | Le Pennec et al. |
| 8,804,489 B2 | 8/2014 | Lu et al. |
| 8,942,085 B1 | 1/2015 | Pani et al. |
| 8,989,020 B2 | 3/2015 | So |
| 9,059,920 B2 | 6/2015 | Ravindran et al. |
| 9,160,652 B2 | 10/2015 | Taillon et al. |
| 9,240,953 B2 | 1/2016 | Carlstrom |
| 9,276,864 B1 | 3/2016 | Vincent |
| 2001/0030649 A1 | 10/2001 | Mamiya et al. |
| 2002/0044553 A1 | 4/2002 | Chakravorty |
| 2002/0075883 A1 | 6/2002 | Dell et al. |
| 2002/0176363 A1 | 11/2002 | Durinovic-Johri et al. |
| 2003/0198189 A1 | 10/2003 | Roberts et al. |
| 2003/0214938 A1 | 11/2003 | Jindal et al. |
| 2004/0073655 A1 | 4/2004 | Kan et al. |
| 2004/0088542 A1 | 5/2004 | Daude et al. |
| 2004/0264481 A1 | 12/2004 | Darling et al. |
| 2005/0036616 A1 | 2/2005 | Huang et al. |
| 2005/0063307 A1 | 3/2005 | Samuels et al. |
| 2005/0182932 A1 | 8/2005 | Wheeler |
| 2005/0238022 A1 | 10/2005 | Panigrahy |
| 2006/0176894 A1 | 8/2006 | Oh et al. |
| 2007/0171825 A1 | 7/2007 | Roberts et al. |
| 2007/0171826 A1 | 7/2007 | Roberts et al. |
| 2008/0214175 A1 | 9/2008 | Papadoglou et al. |
| 2009/0007021 A1 | 1/2009 | Hayton |
| 2009/0059958 A1 | 3/2009 | Nakata |
| 2010/0027485 A1 | 2/2010 | Noh et al. |
| 2010/0125898 A1 | 5/2010 | Dubuc et al. |
| 2010/0191968 A1 | 7/2010 | Patil et al. |
| 2011/0252116 A1* | 10/2011 | Menoher ............... H04L 63/105 709/217 |
| 2012/0030768 A1* | 2/2012 | Mraz ..................... G06F 21/85 726/26 |
| 2012/0144061 A1 | 6/2012 | Song |
| 2012/0236860 A1 | 9/2012 | Kompella et al. |
| 2013/0227166 A1 | 8/2013 | Ravindran et al. |
| 2013/0297824 A1 | 11/2013 | Lan et al. |
| 2014/0040488 A1 | 2/2014 | Small et al. |
| 2014/0337407 A1* | 11/2014 | Mraz ...................... H04L 67/42 709/203 |
| 2015/0058925 A1* | 2/2015 | Curry .................... H04L 63/08 726/3 |
| 2015/0067104 A1* | 3/2015 | Curry ................. H04L 63/0209 709/218 |
| 2015/0188814 A1 | 7/2015 | Jain et al. |
| 2015/0229618 A1 | 8/2015 | Wan et al. |
| 2015/0358323 A1* | 12/2015 | Mraz ................ G06F 17/30203 726/4 |
| 2015/0381324 A1 | 12/2015 | Mirsky et al. |
| 2016/0094444 A1 | 3/2016 | MeLampy et al. |
| 2017/0201601 A1* | 7/2017 | Bright ................... H04L 69/03 |

FOREIGN PATENT DOCUMENTS

| | | |
|---|---|---|
| CN | 101068242 B | 4/2010 |
| CN | 102158371 A | 8/2011 |
| CN | 101640629 B | 8/2012 |
| CN | 102739507 A | 10/2012 |
| CN | 101207604 B | 3/2013 |
| CN | 102769679 B | 6/2015 |
| CN | 103179192 B | 11/2015 |
| CN | 105245469 A | 1/2016 |
| EP | 1 313 267 B1 | 12/2006 |
| KR | 10-2011-0062994 A | 6/2011 |
| WO | WO 2007/084707 A2 | 7/2007 |
| WO | WO 2007/084755 A2 | 7/2007 |
| WO | WO 2008/043230 A1 | 4/2008 |
| WO | WO 2015/131537 A1 | 9/2015 |

OTHER PUBLICATIONS

Bjorklund, *Yang—A Data Modeling Language for the Network Configuration Protocol (NETCONF)*, Internet Engineering Task Force (IETF), Request for Comments 6020, ISSN: 2070-1721, 173 pages, Oct. 2010.

CAIDA, *Observing routing asymmetry in Internet traffic*, (www.caida.org/research/traffic-analysis/asymmetry/1), 7 pages, dated Jul. 17, 2013.

Chiosi, et al, *Network Functions Virtualisation—Introductory White Paper*, Issue 1, at the "SDN and OpenFlow World Congress", Darmstadt-Germany, (http://portal.etsi.org/nfv/nfv_white_paper), 16 pages, dated Oct. 22, 2012.

Cisco Systems, *Parallel Express Forwarding on the Cisco 10000 Series*, (White Paper) Cisco Systems, 4 pages, printed Jun. 17, 2015.

Data Plane Development Kit, *Programmer's Guide*, Release 16.04.0, 216 pages, Apr. 12, 2016.

Davis, *Layer 3 Switches Explained*, Happy Router, 6 pages, dated Aug. 30, 2007.

Filsfils, et al., *Segment Routing Architecture*, Network Working Group, Draft, 28 pages, Oct. 21, 2013.

Hansson, et al., *A Unified Approach to Constrained Mapping and Routing on Network-on-Chip Architectures*, CODES+ISSS '05 Proceedings of the 3rd IEEE/ACM/IFIP International Conference on Hardware/Software Codesign and System Synthesis, 6 pages, Sep. 19-21, 2005.

Herbert, *xps: Transmit Packet Steering*, Eklektix, Inc., 11 pages, Oct. 26, 2010.

IANA, *Transmission Control Protocol (TCP) Parameters*, (www.iana.org/assignments/tcp-parameters/tcp-parameters.xhtm), 5 pages, dated Sep. 22, 2014.

Katz et al., *Bidirectional Forwarding Detection (BFD)*, Internet Engineering Task Force (IETF), Request for Comments 5880, ISSN: 2070-1721, Juniper Networks, 49 pages, Jun. 2010.

Klement, *1.2 Overview of a TCP communications session*, RPG IV Socket Tutorial (http://www.scottklement.com/rpg/socketut/overview), 2 pages, 2001.

Microsoft, *Introduction to Receive Side Scaling*, Developer Resources, https://msdn.microsoft.com/en-us/library/windows/hardware/ff556942(v=vs.85).aspx, 3 pages, Apr. 2014.

Microsoft, *RSS with a Single Hardware Receive Queue*, Developer Resources, https://msdn.microsoft.com/en-us/library/windows/hardware/ff570727(v=vs.85).aspx, 2 pages, Jan. 2015.

Microsoft, *RSS with Hardware Queuing*, Developer Resources, https://msdn.microsoft.com/en-us/library/windows/hardware/ff570728(v=vs.85).aspx, 2 pages, Jan. 2015.

Microsoft, *Non-RSS Receive Processing*, Developer Resources, https://msdn.microsoft.com/en-us/library/windows/hardware/ff568798(v=vs.85).aspx, 2 pages, Jan. 2015.

(56) References Cited

OTHER PUBLICATIONS

PC Magazine Encyclopedia, *Definition of: TCP/IP abc's*, PC Magazine Encyclopedia (www.pcmag.com/encyclopedia/term/52615), 5 pages, 2005.
Previdi, et al., *IPv6 Segment Routing Header (SRH)*, Network Working Group, Draft, 24 pages, Jul. 3, 2014.
Roberts, *The Next Generation of IP—Flow Routing*, SSGRR 2003S International Conference, L'Aquila, Italy, 11 pages, Jul. 29, 2003.
Rouse, What is routing table? Posted by Margaret Rouse (http://searchnetworking.techtarget.com/definition/routing-table), 5 pages, Apr. 2007.
Shang, et al., *Making Better Use of All Those TCP ACK Packets*, Computer Science Department, Worcester Polytechnic Institute, 10 pages, 2005.
Shaw, *Multi-queue network interfaces with SMP on Linux*, Greenhost, https://greenhost.net/2013/04/10/multi-queue-network-interfaces-with-smp-on-linux/, 5 pages, Apr. 10, 2013.
Sollins, et al., *Functional Requirements for Uniform Resource Names*, Network Working Group, Request for Comments 1737, 7 pages, Dec. 1994.
Srinivasan, et al., *A Technique for Low Energy Mapping and Routing in Network-on-Chip Architectures*, ISLPED '05 Proceedings of the 2005 International Symposium on Low Power Electronics and Design, 6 pages, Aug. 8-10, 2005.
Wikipedia, *LAN switching*, 5 pages, dated Jun. 12, 2013.
Wikipedia, *Management information base*, 6 pages, dated Jul. 15, 2013.
Wikipedia, *Reverse path forwarding*, 3 pages, dated Jul. 31, 2013.
Wikipedia, *Equal-cost multi-path routing*, 1 page, dated Sep. 12, 2013.
Wikipedia, *Transmission Control Protocol*, 18 pages, dated Sep. 16, 2013.
Wikipedia, *Software-defined networking*, 6 pages, dated Sep. 16, 2013.
Wikipedia, *Network socket*, 4 pages, dated Sep. 19, 2013.
Wikipedia, *Router (computing)*, 8 pages, dated Sep. 23, 2013.
Wikipedia, *Network address translation*, 11 pages, dated Sep. 24, 2013.
Wikipedia, *Open vSwitch*, 2 pages, dated Nov. 24, 2013.
Wikipedia, *Active queue management* https://en.wikipedia.org/wiki/Active_queue_management, 2 pages, Apr. 22, 2015.
Wikipedia, *Network interface controller*, https://en.wikipedia.org/wiki/Network_interface_controller, 5 pages, May 19, 2015.
International Searching Authority, International Search Report—International Application No. PCT/2015/044815, dated Dec. 6, 2015, together with the Written Opinion of the International Searching Authority, 8 pages.
International Searching Authority, International Search Report—International Application No. PCT/US2015/060840, dated Mar. 8, 2016, together with the Written Opinion of the International Searching Authority, 13 pages.
International Searching Authority, International Search Report—International Application No. PCT/US2016/013416, dated Jun. 8, 2016, together with the Written Opinion of the International Searching Authority, 12 pages.
International Searching Authority, International Search Report—Application No. PCT/US2016/026938, dated Jul. 28, 2016, together with the Written Opinion of the International Searching Authority, 9 pages.
Postel, *Transmission Control Protocol*, Internet Request for Comments RFC 793, 176 pages Sep. 30, 1981.
International Searching Authority, International Search Report—Application No. PCT/US2017/052997, dated Dec. 31, 2017, together with the Written Opinion of the International Searching Authority, 10 pages.

\* cited by examiner

AIPR 1  708

Session X

Return Association (RA)

SSA   1.1.1.1

SSP   10

SDA   5.5.5.5

SDP   20

SPR   100

Forward Association (FA)

SSA   2.2.2.2     (implicit)

SSP   30         (session source port assigned by AIPR 1  708)

SDA   3.3.3.3     (next node address - AIPR 2  714)

SDP   40         (session destination port assigned by AIPR 1  708)

SPR   100

Flag = First Waypoint AIPR

Session Y

RA

FA

Flag

Session Z

RA

FA

Flag

*FIG. 9*

AIPR 2  714

Session X

Return Association (RA)

SSA   2.2.2.2

SSP   30

SDA   3.3.3.3      (implicit)

SDP   40

SPR   100

Forward Association (FA)

SSA   3.3.3.3      (implicit)

SSP   50          (session source port assigned by AIPR 2  714)

SDA   4.4.4.4      (next node address - AIPR 4  722)

SDP   60          (session destination port assigned by AIPR 2  714)

SPR   100

Flag = Intermediate Waypoint AIPR

Session Y

RA

FA

Flag

Session Z

RA

FA

Flag

*FIG. 10*

AIPR 4    722

Session X

Return Association (RA)

SSA    3.3.3.3

SSP    50

SDA    4.4.4.4      (implicit)

SDP    60

SPR    100

Forward Association (FA)

SSA    1.1.1.1      (original source address from metadata)

SSP    10           (original source port from metadata)

SDA    5.5.5.5      (original destination address from metadata)

SDP    20           (original destination port from metadata)

SPR    100

Flag = Final Waypoint AIPR

Session Y

RA

FA

Flag

Session Z

RA

FA

Flag

*FIG. 11*

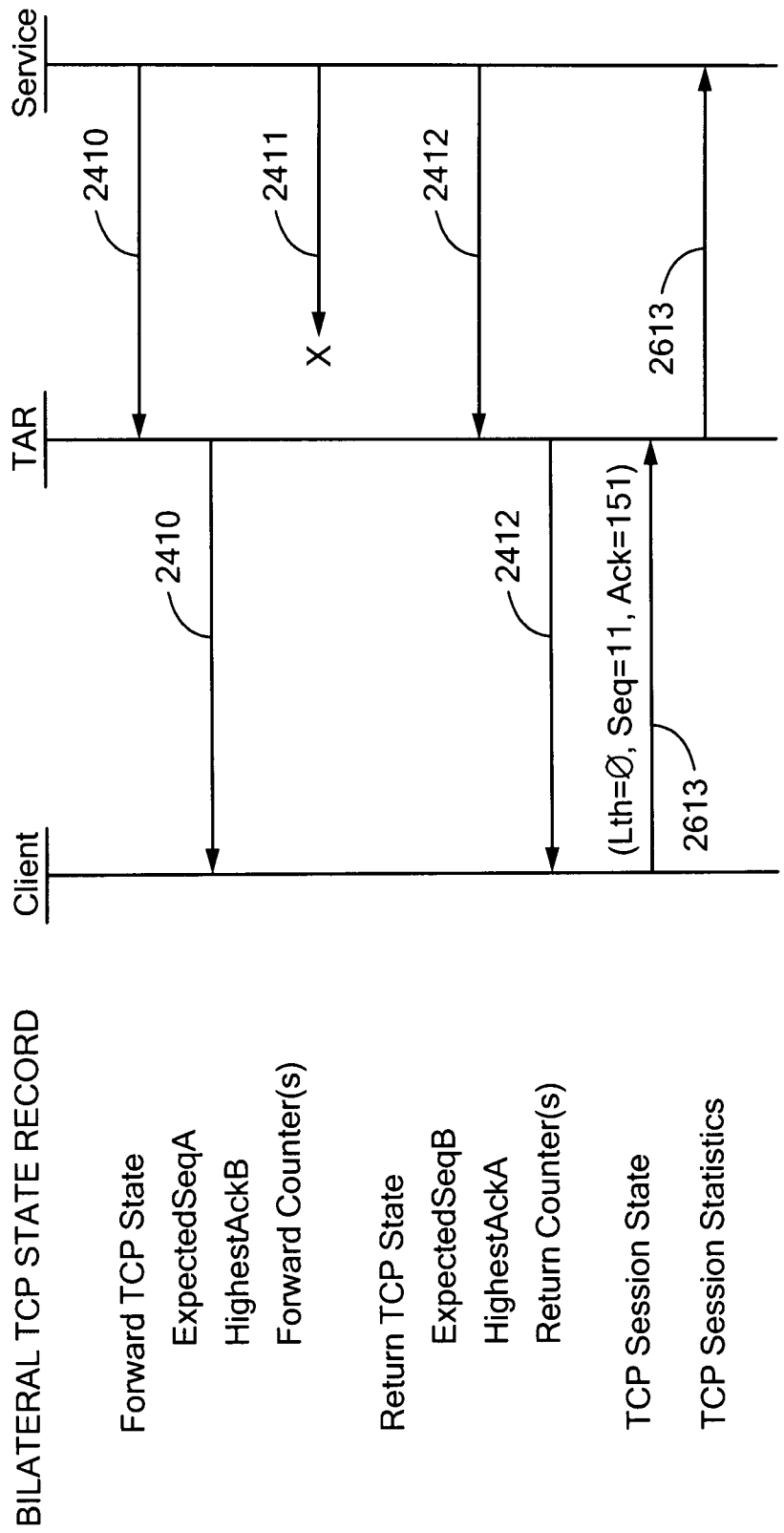

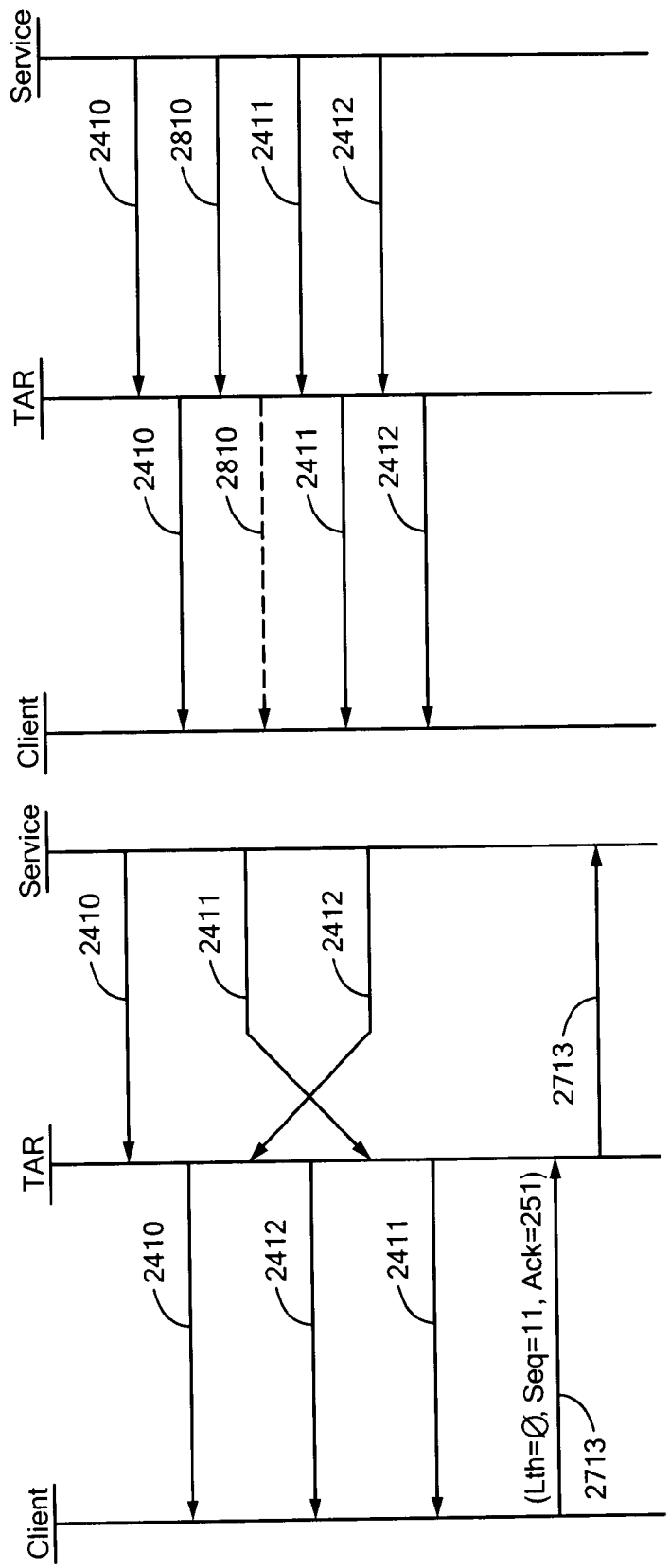

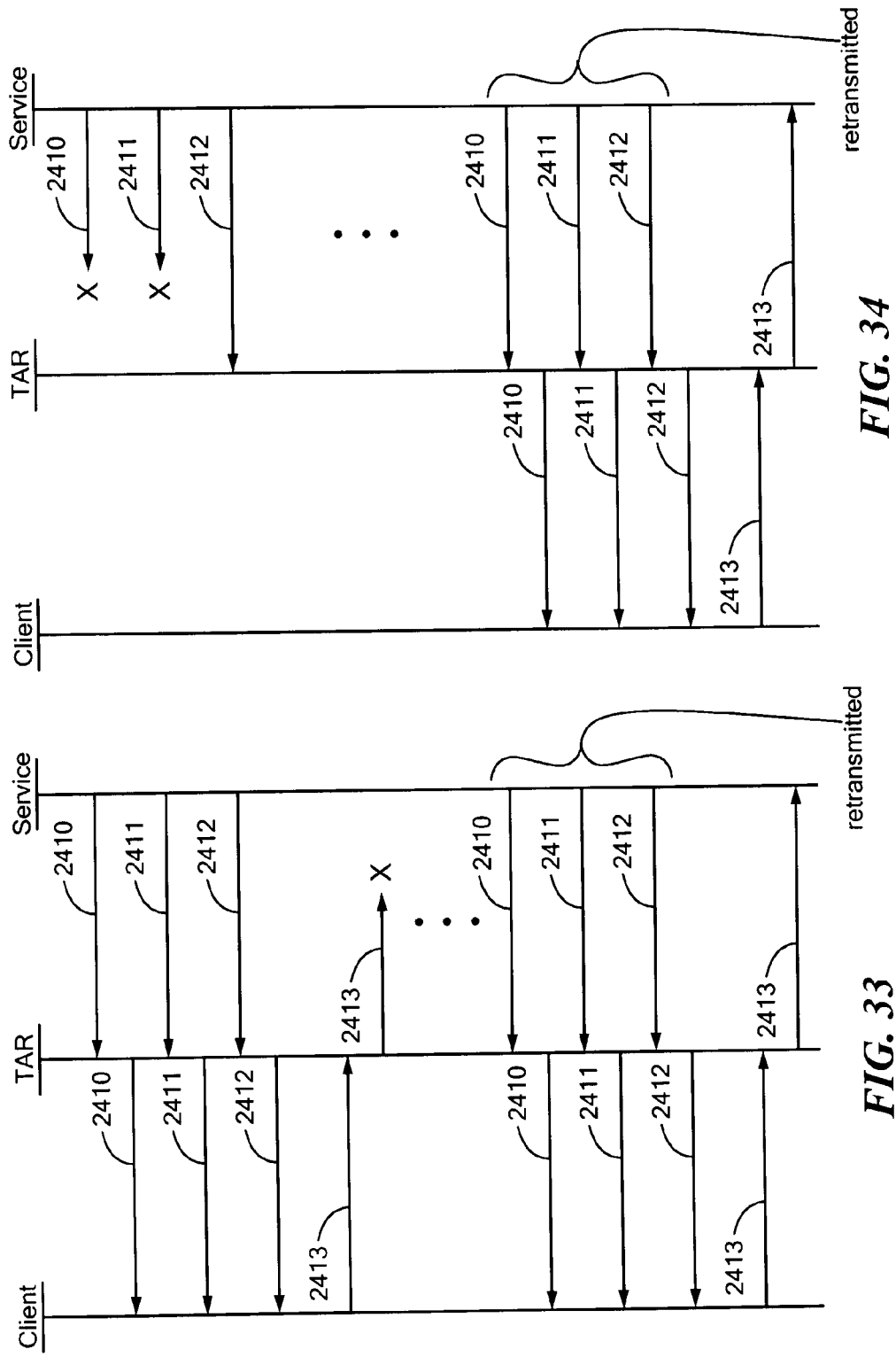

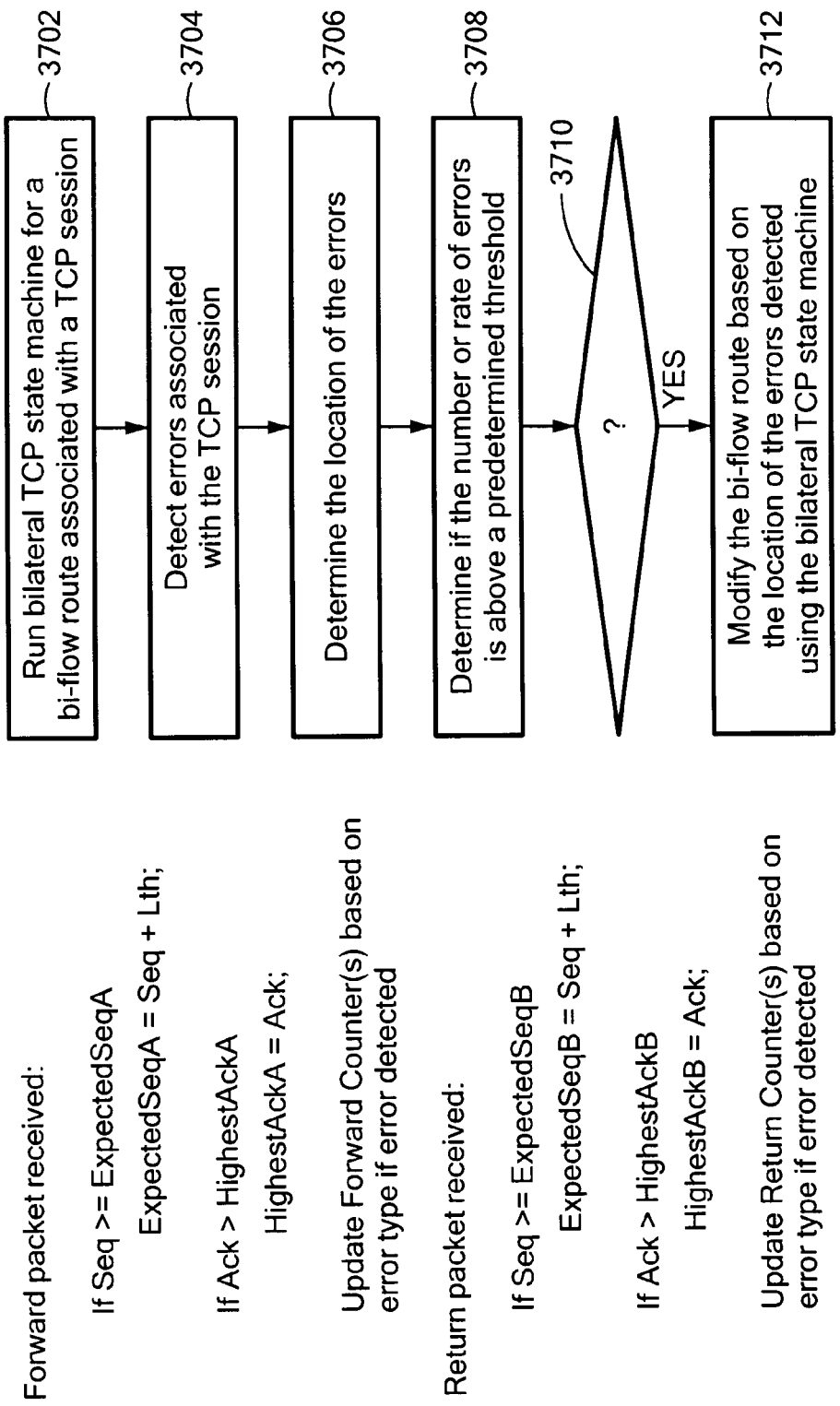

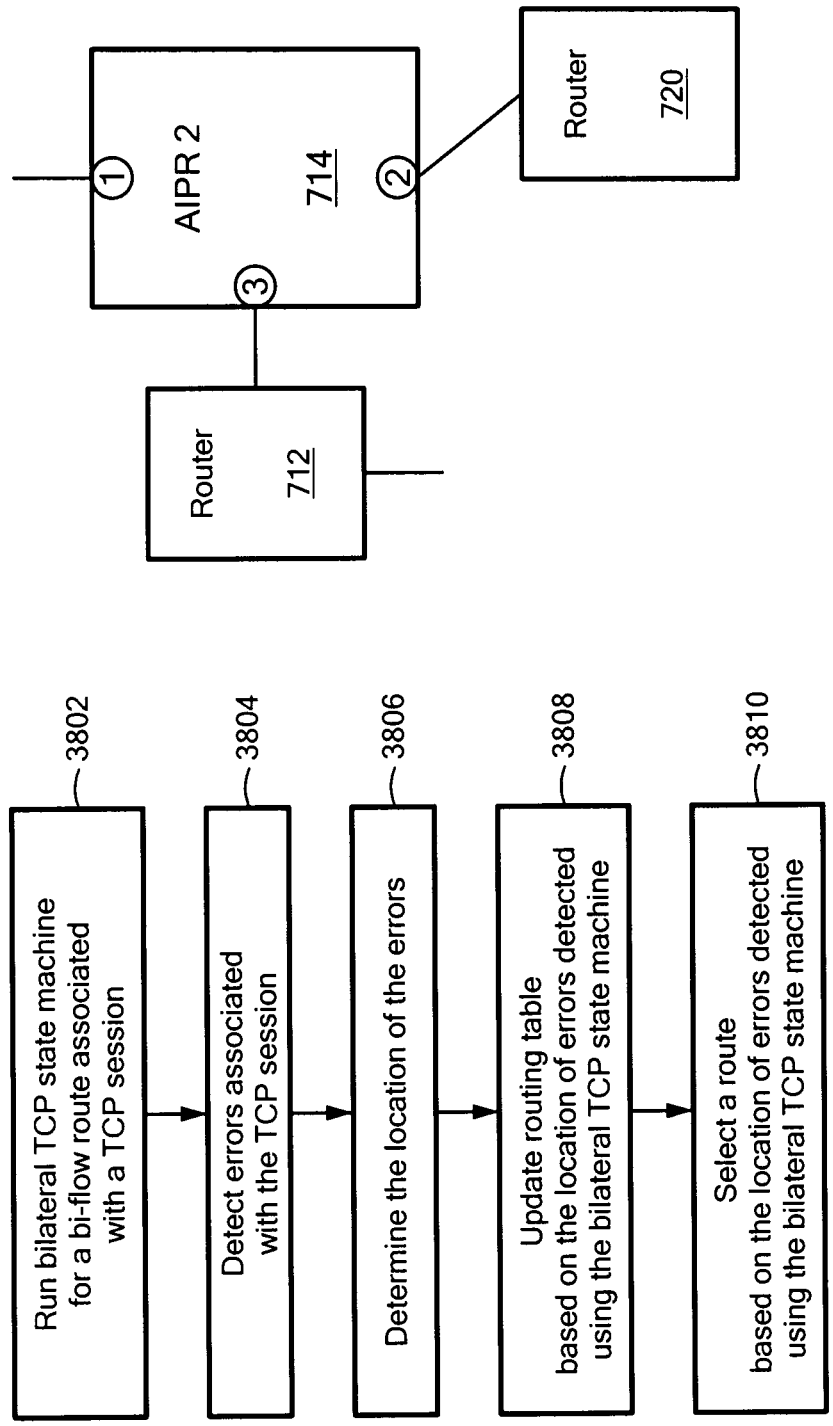

ROUTER WITH BILATERAL TCP SESSION MONITORING

CROSS-REFERENCE TO RELATED APPLICATION(S)

This patent application is related to U.S. patent application Ser. No. 14/497,954 filed Sep. 26, 2014, entitled, "NETWORK PACKET FLOW CONTROLLER," and naming MeLampy, Baj, Kaplan, Kumar, Penfield, and Timmons as inventors, the disclosure of which is incorporated herein, in its entirety, by reference.

This patent application also is related to U.S. patent application Ser. No. 14/562,917, filed Dec. 8, 2014, entitled, "STATEFUL LOAD BALANCING IN A STATELESS NETWORK," and naming Timmons, Baj, Kaplan, MeLampy, Kumar, and Penfield as inventors, the disclosure of which is incorporated herein, in its entirety, by reference.

This patent application also is related to U.S. patent application Ser. No. 14/715,036, filed May 18, 2015, entitled, "NETWORK DEVICE AND METHOD FOR PROCESSING A SESSION USING A PACKET SIGNATURE," and naming Kumar, Timmons, and MeLampy as inventors, the disclosure of which is incorporated herein, in its entirety, by reference.

This patent application also is related to U.S. patent application Ser. No. 14/963,999, filed Dec. 9, 2015, entitled, "ROUTER WITH OPTIMIZED STATISTICAL FUNCTIONALITY," and naming Gosselin, Yungelson, Baj, and MeLampy as inventors, the disclosure of which is incorporated herein, in its entirety, by reference.

This patent application also is related to U.S. patent application Ser. No. 14/833,571, filed Aug. 24, 2015, entitled, "NETWORK PACKET FLOW CONTROLLER WITH EXTENDED SESSION MANAGEMENT," and naming Kaplan, Kumar, Timmons, and MeLampy as inventors, the disclosure of which is incorporated herein, in its entirety, by reference.

This patent application also is related to U.S. patent application Ser. No. 15/168,700, filed May 31, 2016, entitled, "FLOW MODIFICATION INCLUDING SHARED CONTEXT," and naming Menon, Yungelson, McCulley, and Penfield as inventors, the disclosure of which is incorporated herein, in its entirety, by reference.

This patent application also is related to U.S. patent application Ser. No. 15/169,003, filed May 31, 2016, entitled, "REVERSE FORWARDING INFORMATION BASE ENFORCEMENT," and naming Menon, Penfield, and Kaplan as inventors, the disclosure of which is incorporated herein, in its entirety, by reference.

FIELD OF THE INVENTION

The present invention relates to data routing and, more particularly, to bilateral TCP session monitoring by routers in a communication system.

BACKGROUND OF THE INVENTION

The Internet Protocol ("IP") serves as the de-facto standard for forwarding data messages ("datagrams") between network devices connected with the Internet. To that end, IP delivers datagrams across a series of Internet devices, such as routers and switches, in the form of one or more data packets. Each packet has two principal parts: (1) a payload with the information being conveyed (e.g., text, graphic, audio, or video data), and (2) a header, known as an "IP header," having the address of the network device to receive the packet(s) (the "destination device"), the identity of the network device that sent the packet (the "originating device"), and other data for routing the packet. Within the TCP/IP suite of protocols, IP generally operates at the internet layer, which generally corresponds to layer 3 (i.e., the network layer) of the OSI 7-layer model.

There are two commonly-used versions of IP, namely IP version 4 ("IPv4") and IP version 6 ("IPv6"). IPv4 is described in IETF RFC 791, which is hereby incorporated herein by reference in its entirety. IPv6 is described in IETF RFC 2460, which is hereby incorporated herein by reference in its entirety. The main purpose of both versions is to provide unique global computer addressing to ensure that communicating devices can identify one another. One of the main distinctions between IPv4 and IPv6 is that IPv4 uses 32-bit addresses, whereas IPv6 utilizes 128 bit addresses. In addition, IPv6 can support larger datagram sizes.

IPv4 datagrams have the general header format shown in FIG. 43.

IPv6 datagrams have the general header format shown in FIG. 44.

Many people thus analogize packets to a traditional letter using first class mail, where the letter functions as the payload, and the envelope, with its return and mailing addresses, functions as the IP header.

IP datagrams often encapsulate higher layer protocol messages as part of the IP datagram payload. Two commonly-used higher layer protocols in the TCP/IP protocol suite that are often carried in IP datagrams are the Transmission Control Protocol (TCP) and the User Datagram Protocol (UDP). TCP and UDP messages include a header and a payload in which data from upper protocol layers are carried. Within the TCP/IP suite of protocols, TCP and UDP generally operate at the transport layer, which generally corresponds to layer 4 (i.e., the transport layer) of the OSI 7-layer model.

TCP is described generally in IETF RFC 793, which is hereby incorporated herein by reference in its entirety. The general format of a TCP segment is shown in FIG. 45.

UDP is described generally in IETF RFC 768, which is hereby incorporated herein by reference in its entirety. The general format of a UDP segment is shown in FIG. 46.

Thus, for example, an IP datagram will often include an IP header, a TCP or UDP header, and a payload. The TCP or UDP payload can be used to carry upper layer protocol messages that in turn may include a header and a payload.

Current Internet devices, such as routers and switches, generally forward packets one-by-one based essentially on the address of the destination device in the packet header in accordance with an Internet routing protocol such as BGP, OSPFv2, IS-IS, etc. Among other benefits, this routing scheme enables network devices to forward different packets of a single datagram along different routes to reduce network congestion, or avoid malfunctioning network devices. Those skilled in the art thus refer to IP as a "stateless" or "connectionless" protocol because, among other reasons, it does not save packet path data, and does not pre-arrange transmission of packets between end points.

SUMMARY OF VARIOUS EMBODIMENTS

In accordance with various embodiments, a TCP augmented router, computer program product, and method of monitoring TCP sessions involves implementing, for each of a number of TCP bi-flow sessions, a bilateral TCP state machine that performs a process comprising:

establishing, in a bilateral TCP state database, a bilateral TCP state record for the TCP bi-flow session including reference TCP sequence information for monitoring the TCP bi-flow session and statistical information regarding TCP errors detected by the bilateral TCP state machine;

receiving, via a first network interface, forward session packets in transit from a source node to a target node;

receiving, via a second network interface, return session packets in transit from the target node to the source node;

monitoring the TCP bi-flow session based on received TCP sequence information from both the received forward session packets and the received return session packets and the reference TCP sequence information maintained in the bilateral TCP state record, including detecting TCP errors based on the received and reference TCP sequence information; and updating the bilateral TCP state record for the TCP bi-flow session, including updating the reference TCP sequence information in the bilateral TCP state record based on the received TCP sequence information from the received forward and return session packets and updating the statistical information in the bilateral TCP state record when a TCP error is detected.

In various alternative embodiments, at least one TCP bi-flow route may be a stateful bi-flow route.

Monitoring the TCP bi-flow session may involve (a) for each received forward session packet: (i) determining a next sequence number expected from the source node based on the reference TCP sequence information maintained in the bilateral TCP state record; (ii) comparing a TCP sequence number in the received forward session packet with the next sequence number expected from the source node to determine if a TCP error occurred for the TCP bi-flow session; and (iii) updating the bilateral TCP state record, including updating the reference TCP sequence information in the bilateral TCP state record based on the TCP sequence number in the received forward session packet and updating the statistical information in the bilateral TCP state record when a TCP error is detected; and (b) for each received return session packet: (i) determining a next sequence number expected from the target node based on the reference TCP sequence information maintained in the bilateral TCP state record; (ii) comparing a TCP sequence number in the received return session packet with the next sequence number expected from the target node to determine if a TCP error occurred for the TCP bi-flow session; and (iii) updating the bilateral TCP state record, including updating the reference TCP sequence information in the bilateral TCP state record based on the TCP sequence number in the received return session packet and updating the statistical information in the bilateral TCP state record when a TCP error is detected.

Additionally or alternatively, monitoring the TCP bi-flow session may involve monitoring the TCP bi-flow session based on received TCP sequence and acknowledgment numbers from the received forward and return session packets, including detecting TCP errors based on the received TCP sequence and acknowledgment numbers and the reference TCP sequence information, and wherein updating the bilateral TCP state record for the TCP bi-flow session includes updating the reference TCP sequence information based on the received TCP sequence and acknowledgment numbers from the received forward and return session packets.

The process further may further involve determining if the number or rate of TCP errors exceeds a predetermined threshold and reconfiguring the TCP bi-flow session when the number or rate of TCP errors exceeds the predetermined threshold. In this regard, the TCP bi-flow route may be associated with a forward flow and a return flow using the first and second network interfaces, and reconfiguring the TCP bi-flow route may involve modifying the forward and return flows to utilize at least one network interface other than the first and second network interfaces and transmitting stateful routing session metadata in at least one session packet following such modifying of the forward and return flows.

Detecting TCP errors based on the received and reference TCP sequence information may involve determining a location of TCP errors based on the received and reference TCP sequence information. In this regard, the process may further involve at least one of updating a routing table of the TCP augmented router based on the determined location of TCP errors or selecting a route based on the determined location of TCP errors.

The process may further involve determining if a received session packet is outside of an advertised window size for the TCP bi-flow session based on received TCP sequence information from the received session packet and the reference TCP sequence information maintained in the bilateral TCP state record; and dropping said packet without forwarding said packet when the bilateral TCP state machine determines that the received session packet is outside of the advertised window size for the TCP bi-flow session.

The process may further involve monitoring status of the TCP bi-flow session including determination of at least initiation, establishment, and termination of the TCP bi-flow session and storing statistical information related to the status of the TCP bi-flow session.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 9 is a schematic diagram showing session-related data associated with a first waypoint AIPR based on the lead packet processing of FIG. 8, in accordance with one exemplary embodiment.

FIG. 10 is a schematic diagram showing session-related data associated with an intermediate waypoint AIPR based on the lead packet processing of FIG. 8, in accordance with one exemplary embodiment.

FIG. 11 is a schematic diagram showing session-related data associated with a final waypoint AIPR based on the lead packet processing of FIG. 8, in accordance with one exemplary embodiment.

FIG. 25 is a schematic diagram showing the contents of a bilateral TCP state record that is maintained as part of a bilateral TCP state database by the bilateral TCP state machine, in accordance with one exemplary embodiment.

FIG. 26 schematically shows an exemplary TCP message exchange in which a packet from the destination service node is lost prior to reaching the router.

FIG. 27 schematically shows an exemplary TCP message exchange in which packets from the destination service node are received by the router out-of-order.

FIG. 28 schematically shows an exemplary TCP message exchange in which the router receives a duplicate packet from the destination service node.

FIG. 33 schematically shows an exemplary TCP message exchange in which an acknowledgment packet from the source client node is forwarded by the router but is lost prior to reaching the destination service node.

FIG. 34 schematically shows an exemplary TCP message exchange in which an out-of-window packet is received by the router from the destination service node.

FIG. 36 is a flowchart schematically describing the process of updating a bilateral TCP state record, in accordance with one exemplary embodiment.

FIG. 37 is a flowchart schematically describing a process for modifying a bi-flow route based on errors detected by the bilateral TCP state machine, in accordance with one exemplary embodiment.

FIG. 38 is a flowchart schematically describing a process for enhancing routing decisions based on errors detected by the bilateral TCP state machine, in accordance with one exemplary embodiment.

FIG. 39 shows an enlarged section of FIG. 7 focusing on AIPR 2 714 and identifying three network interfaces.

DESCRIPTION OF ILLUSTRATIVE EMBODIMENTS

Embodiments of the present invention monitor the status of TCP sessions by ensuring that TCP session packets transmitted between two nodes are made to traverse a given set of routers such that each of the routers receives session packets traveling in both directions between the nodes (referred to herein as a "bi-flow" route or session). The set of routers includes at least one router (referred to herein as a "TCP Augmented Router" or "TAR") that is specially configured to implement a bilateral TCP state machine to monitor the status of TCP sessions based on TCP sequence numbers in both forward session packets and return session packets received by the router for the TCP bi-flow session. Among other things, the TAR may determine the status of a TCP session, for example, based on statistical information such as the number or rate of errors detected (e.g., the number of dropped packets, duplicated packets, out-of-sequence packets, and/or out-of-window packets). Each TAR is typically configured to collect and store status information and optionally also to use the status information in making intelligent routing decisions, such as, for example, deciding whether or not to forward a particular packet, deciding whether to reconfigure a bi-flow routing session, or updating routing table information used for routing packets. Specific exemplary embodiments may be used in the context of "stateful" routing, for example, as described in 14/497,954, 14/562,917, 14/715,036, 14/963,999, and 14/833,571, and also described below. Embodiments of the present invention therefore provide technological solutions to problems that specifically arise in technology.

Networks

Illustrative embodiments preferably are implemented within an otherwise conventional computer network that uses common networking devices and protocols. Among other things, a network includes at least two nodes and at least one communication link between the nodes. Nodes can include computing devices (sometimes referred to as hosts or devices) and routers. Computers can include personal computers, smart phones, television "cable boxes," automatic teller machines (ATMs) and many other types of equipment that include processors and network interfaces. Links can include wired and wireless connections between pairs of nodes. In addition, nodes and/or links may be implemented completely in software, such as in a virtual machine, a software defined network, and using network function virtualization. Many networks include switches, which are largely transparent for purposes of this discussion. However, some switches also perform routing functions. For the present discussion, such routing switches are considered routers. Routers are described below.

Figure 1:
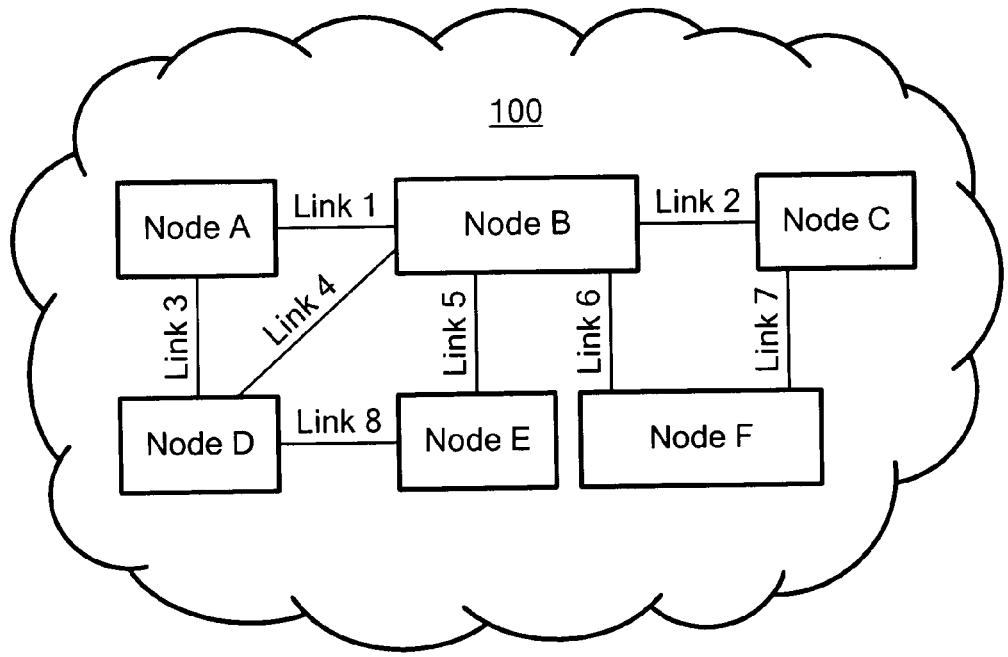
FIG. 1 schematically shows a hypothetical prior art network that may implement certain illustrative embodiments of the invention.

A node can be directly connected to one or more other nodes, each via a distinct communication link. For example, FIG. 1 schematically shows a Node A directly connected to Node B via Link 1. In a given network (e.g., within a local area network), each node has a unique network address to facilitate sending and receiving data. A network includes all the nodes addressable within the network according to the network's addressing scheme and all the links that interconnect the nodes for communication according to the network's addressing scheme. For example, in FIG. 1, Nodes A-F and all the links 1-8 together make up a network 100. For simplicity, a network is depicted as a cloud or as being enclosed within a cloud. Absence of a cloud, however, does not mean a collection of nodes and links are not a network. For example, a network may be formed by a plurality of smaller networks.

Nodes can initiate communications with other nodes via the network, and nodes can receive communications initiated by other nodes via the network. For example, a node may transmit/forward/send data (a message) to a directly connected (adjacent) node by sending the message via the link that interconnects the adjacent nodes. The message includes the network address of a sending node (the "source address") and the network address of an intended receiving node (the "destination address"). A sending node can send a message to a non-adjacent node via one or more other intervening nodes. For example, Node D may send a message to Node F via Node B. Using well known networking protocols, the node(s) between the source and the destination forward the message until the message reaches its destination. Accordingly, to operate properly, network protocols enable nodes to learn or discover network addresses of non-adjacent nodes in their network.

Nodes communicate via networks according to protocols, such as the well-known Internet Protocol (IP) and Transmission Control Protocol (TCP). The protocols are typically implemented by layered software and/or hardware components, such as according to the well-known seven-layer Open System Interconnect (OSI) model. As an example, IP operates at OSI Layer 3 (Network Layer), while TCP and UDP operate largely at OSI Layer 4 (Transport Layer). Each layer performs a logical function and abstracts the layer below it, therefore hiding details of the lower layer.

Figure 2:
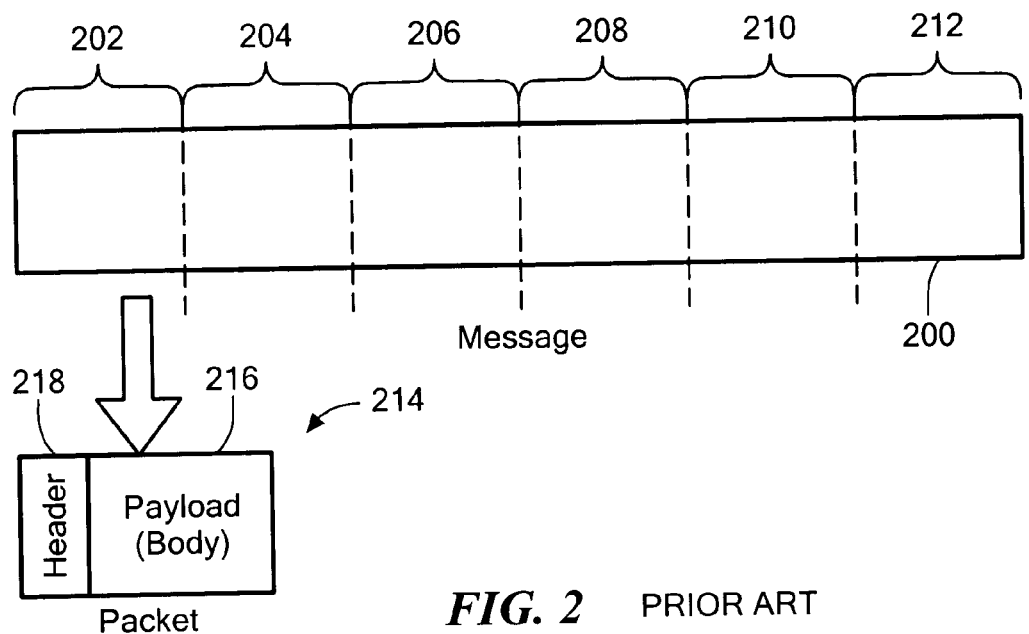
FIG. 2 schematically illustrates a prior art technique for fragmenting a message.

For example, a Layer 3 message may be fragmented into smaller Layer 2 packets if Layer 2 (Data Link Layer) cannot handle the Layer 3 message as one transmission. FIG. 2 schematically illustrates a large message 200 divided into several pieces 202, 204, 206, 208, 210 and 212. Each piece 202-212 may then be sent in a separate packet, exemplified by packet 214. Each packet includes a payload (body) portion, exemplified by payload 216, and a header portion, exemplified at 218. The header portion 218 contains information, such as the packet's source address, destination address and packet sequence number, necessary or desirable for: 1) routing the packet to its destination, 2) reassembling the packets of a message, and 3) other functions provided according to the protocol. In some cases, a trailer portion is also appended to the payload, such as to carry a checksum of the payload or of the entire packet. All packets of a message need not be sent along the same path, i.e., through the same nodes, on their way to their common destination. It should be noted that although IP packets are officially called IP datagrams, they are commonly referred to simply as packets.

Some other protocols also fragment data into packets. For example, the well-known TCP protocol can fragment Layer 4 (Transport Layer) messages into segments, officially referred to as TCP protocol data units (PDUs), if Layer 3 (Network Layer) cannot handle the Layer 4 (Transport Layer) message as one transmission. Nevertheless, in common usage, the term packet is used to refer to PDUs and datagrams, as well as Ethernet frames.

Most protocols encapsulate packets of higher level protocols. For example, IP encapsulates a TCP packet by adding an IP header to the TCP packet to produce an IP packet. Thus, packets sent at a lower layer can be thought of as being made up of packets within packets. Conventionally, a component operating according to a protocol examines or modifies only information within a header and/or trailer that was created by another component, typically within another node, operating according to the same protocol. That is, conventionally, components operating according to a protocol do not examine or modify portions of packets created by other protocols.

In another example of abstraction provided by layered protocols, some layers translate addresses. Some layers include layer-specific addressing schemes. For example, each end of a link is connected to a node via a real (e.g., electronic) or virtual interface, such as an Ethernet interface.

At Layer 2 (Data Link Layer), each interface has an address, such as a media access control (MAC) address. On the other hand, at Layer 3 using IP, each interface, or at least each node, has an IP address. Layer 3 converts IP addresses to MAC addresses.

Figure 3:
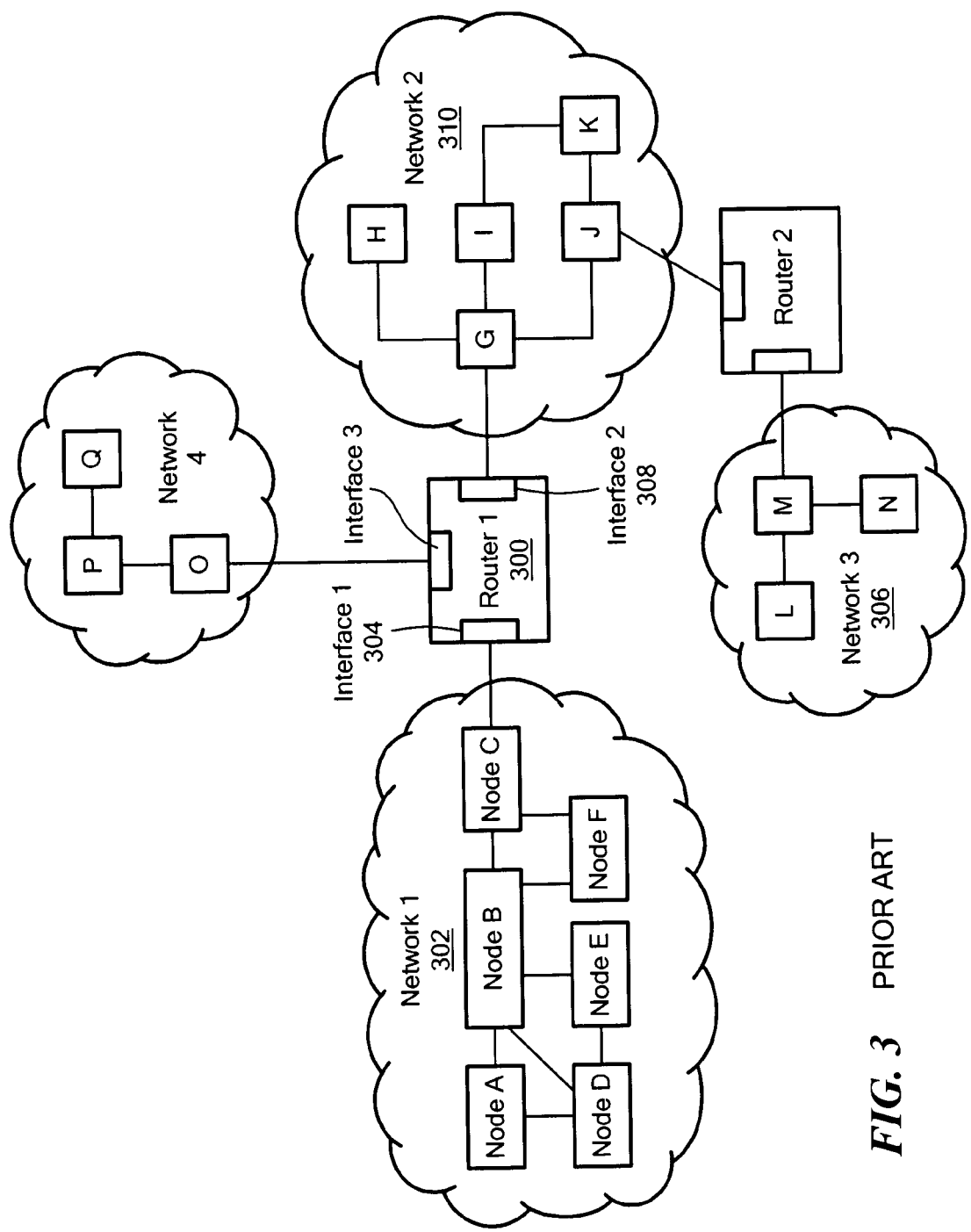
FIG. 3 schematically shows a hypothetical internet that may implement certain illustrative embodiments of the invention.

As depicted schematically in FIG. 3, a router typically acts as a node that interconnects two or more distinct networks or two or more sub-networks (subnets) of a single network, thereby creating a "network of networks" (i.e., an internet). Thus, a router has at least two interfaces; e.g., where each interface connects the router to a different network, as exemplified by Router 1 300 in FIG. 3. Each router also includes a packet router (not shown in FIG. 3 for convenience) that is configured to route packets between the various interfaces based on routing information stored in a routing table in a computer memory. As part of routing packets or otherwise, the packet router is configured to process packets received by the router and to generate packets for transmission by the router.

When a router receives a packet via one interface from one network, it uses information stored in its routing table (sometimes referred to as a "Forwarding Information Base" or "FIB") to direct the packet to another network via another interface, e.g., based on the destination address in the packet, or based on a combination of information in the packet. The routing table thus contains network/next hop associations. These associations tell the router that a particular destination can optimally be reached by sending the packet to a specific router that represents a next hop on the way to the final destination. For example, if Router 1 300 receives a packet, via its Interface 1 304, from Network 1 302, and the packet is destined to a node in Network 3 306, the Router 1 300 consults its router table and then forwards the packet via its Interface 2 308 to Network 2 310. Network 2 310 will then forward the packet to Network 3 306. The next hop association can also be indicated in the routing table as an outgoing (exit) interface to the final destination.

Large organizations, such as large corporations, commercial data centers and telecommunications providers, often employ sets of routers in hierarchies to carry internal traffic. For example, one or more gateway routers may interconnect each organization's network to one or more Internet service providers (ISPs). ISPs also employ routers in hierarchies to carry traffic between their customers' gateways, to interconnect with other ISPs, and to interconnect with core routers in the Internet backbone.

A router is considered a Layer 3 device because its primary forwarding decision is based on the information in the Layer 3 IP packet—specifically the destination IP address. A conventional router does not look into the actual data contents (i.e., the encapsulated payload) that the packet carries. Instead, the router only looks at the Layer 3 addresses to make a forwarding decision, plus optionally other information in the header for hints, such as quality of service (QoS) requirements. Once a packet is forwarded, a conventional router does not retain historical information about the packet, although the forwarding action may be collected to generate statistical data if the router is so configured.

Accordingly, an IP network is considered to be "stateless" because, among other things, it does not maintain this historical information. For example, an IP network generally treats each IP packet as an independent transaction that is unrelated to any previous IP packet. A router thus may route a packet regardless of how it processed a prior packet. As such, an IP network typically does not store session information or the status of incoming communications partners. For example, if a part of the network becomes disabled mid-transaction, there is no need to reallocate resources or otherwise fix the state of the network. Instead, packets may be routed along other nodes in the network. Certain illustrative embodiments, however, may include routers that statefully communicate, as discussed herein.

As noted, when a router receives a packet via one interface from one network, the router uses its routing table to direct the packet to another network. The following is some of the types of information typically found in a basic IP routing table:

Destination: Partial IP address (Expressed as a bit-mask) or Complete IP address of a packet's final destination;

Next hop: IP address to which the packet should be forwarded on its way to the final destination;

Interface: Outgoing network interface to use to forward the packet;

Cost/Metric: Cost of this path, relative to costs of other possible paths;

Routes: Information about subnets, including how to reach subnets that are not directly attached to the router, via one or more hops; default routes to use for certain types of traffic or when information is lacking.

Routing tables may be filled in manually, such as by a system administrator, or dynamically by the router. Routers generally run routing protocols to exchange information with other routers and, thereby, dynamically learn about surrounding network or internet topology. For example, routers announce their presence in the network(s), more specifically, the range of IP addresses to which the routers can forward packets. Neighboring routers update their routing tables with this information and broadcast their ability to forward packets to the network(s) of the first router. This information eventually spreads to more distant routers in a network. Dynamic routing allows a router to respond to changes in a network or internet, such as increased network congestion, new routers joining an internet, and router or link failures.

Additionally, routers also may utilize the Bidirectional Forwarding Detection (BFD) protocol to monitor communication links to adjacent routers. The BFD protocol is described in IETF RFC 5880, which is hereby incorporated herein by reference in its entirety. In many cases, the BFD protocol can detect the failure of a communication link before the routing protocol detects the failure, so, in some situations, the BFD protocol can provide advanced warning to the router that a routing change is needed or is forthcoming.

A routing table therefore provides a set of rules for routing packets to their respective destinations. When a packet arrives, a router examines the packet's contents, such as its destination address, and finds the best matching rule in the routing table. The rule essentially tells the router which interface to use to forward the packet and the IP address of a node to which the packet is forwarded on its way to its final destination IP address.

With hop-by-hop routing, each routing table lists, for all reachable destinations, the address of the next node along a path to that destination, i.e., the next hop. Assuming that the routing tables are consistent, a simple algorithm of each router relaying packets to their destinations' respective next hop suffices to deliver packets anywhere in a network. Hop-by-hop is a fundamental characteristic of the IP Internetwork Layer and the OSI Network Layer.

Thus, each router's routing table typically merely contains information sufficient to forward a packet to another router that is "closer" to the packet's destination, without a guarantee of the packet ever being delivered to its destination. In a sense, a packet finds its way to its destination by visiting a series of routers and, at each router, using then-current rules to decide which router to visit next, with the hope that at least most packets ultimately reach their destinations.

Note that the rules may change between two successive hops of a packet or between two successive packets of a message, such as if a router becomes congested or a link fails. Two packets of a message may, therefore, follow different paths and even arrive out of order. In other words, when a packet is sent by a source or originating node, as a stateless network, there is no predetermined path the packet will take between the source node and the packet's destination. Instead, the path typically is dynamically determined as the packet traverses the various routers. This may be referred to as "natural routing," i.e., a path is determined dynamically as the packet traverses the internet.

Although natural routing has performed well for many years, natural routing has shortcomings. For example, because each packet of a session may travel along a different path and traverse a different set of routers, it is difficult to collect metrics for the session. Security functions that may be applicable to packets of the session must be widely distributed or risk not being applied to all the packets. Furthermore, attacks on the session may be mounted from many places.

It should be noted that conventionally, packets sent by the destination node back to the source node may follow different paths than the packets from the source node to the destination node.

In many situations, a client computer node ("client") establishes a session with a server computer node ("server"), and the client and server exchange packets within the session. For example, a client computer executing a browser may establish a session with a web server using a conventional process. The client may send one or more packets to request a web page, and the web server may respond with one or more packets containing contents of the web page. In some types of sessions, this back-and-forth exchange of packets may continue for several cycles. In some types of sessions, packets may be sent asynchronously between the two nodes. In some cases, this handshake may be performed to provide a secure session over the Internet using well known protocols such as the Secure Sockets Layer Protocol ("SSL") or the Transport Layer Security Protocol ("TLS").

A session has its conventional meaning; namely, it is a plurality of packets sent by one node to another node, where all the packets are related, according to a protocol. A session may be thought of as including a lead (or initial) packet that begins the session, and one or more subsequent packets of the session. A session has a definite beginning and a definite end. For example, a TCP session is initiated by a SYN packet. In some cases, the end may be defined by a pre-scribed packet or series of packets. For example, a TCP session may be ended with a FIN exchange or an RST. In other cases, the end may be defined by lack of communication between the nodes for at least a predetermined amount of time (a timeout time). For example, a TCP session may be ended after a defined timeout period. Some sessions include only packets sent from one node to the other node. Other sessions include response packets, as in the web client/server interaction example. A session may include any number of cycles of back-and-forth communication, or asynchronous communication, according to the protocol, but all packets of a session are exchanged between the same client/server pair of nodes. A session is also referred to herein as a series of packets.

A computer having a single IP address may provide several services, such as web services, e-mail services and file transfer (FTP) services. Each service is typically assigned a port number in the range 0-65,535 that is unique on the computer. A service is, therefore, defined by a combination of the node's IP address and the service's port number. Note that this combination is unique within the network the computer is connected to, and it is often unique within an internet. Similarly, a single node may execute many clients. Therefore, a client that makes a request to a service is assigned a unique port number on the client's node, so return packets from the service can be uniquely addressed to the client that made the request.

The term socket means an IP address-port number combination. Thus, each service has a network-unique, and often internet-unique, service socket, and a client making a request of a service is assigned a network-unique, and sometimes internet-unique, client socket. In places, the terms source client and destination service are used when referring to a client that sends packets to make requests of a service and the service being requested, respectively.

Router Architecture

Figure 4:
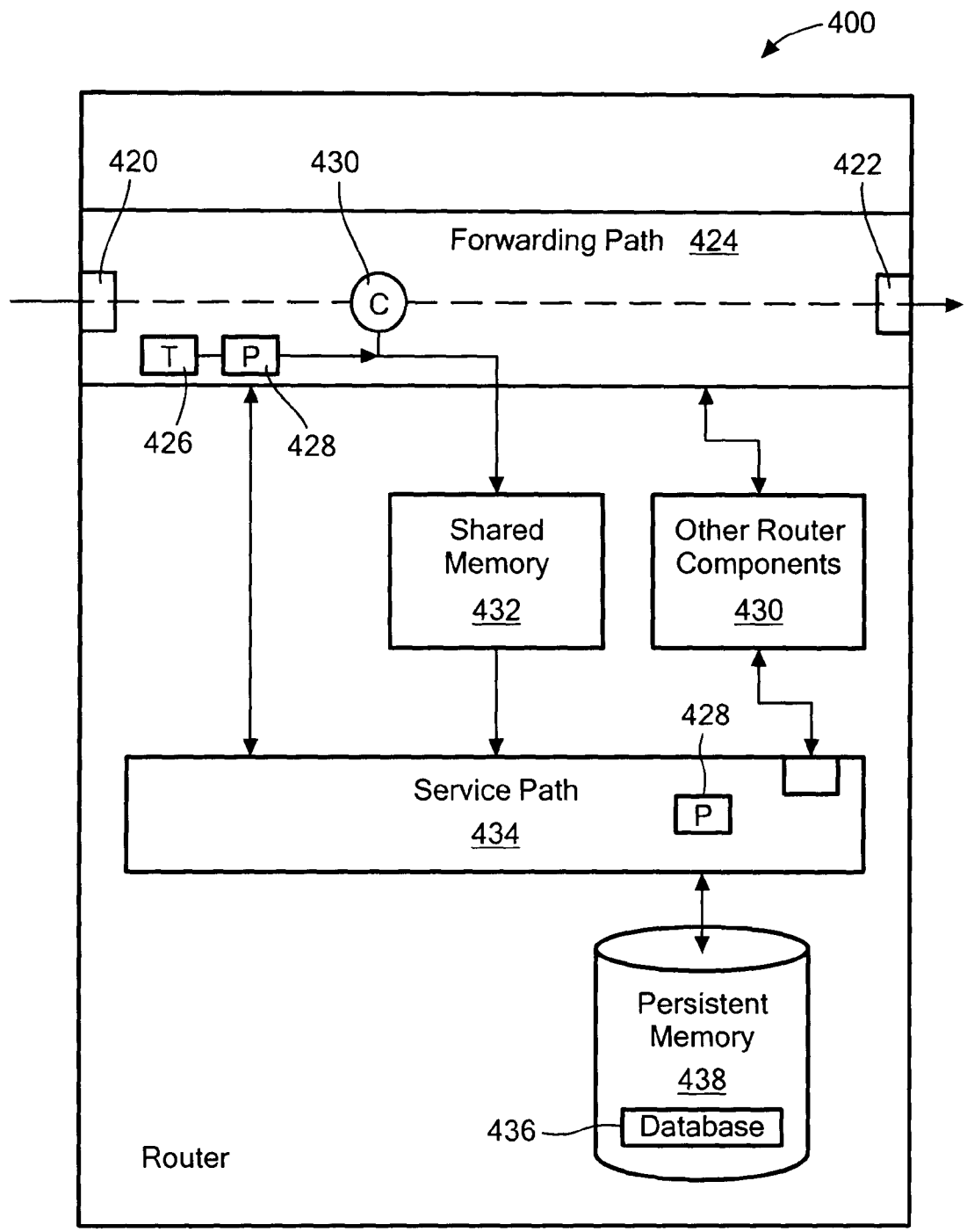
FIG. 4 schematically shows relevant portions of a router including a forwarding path and a service path, in accordance with one exemplary embodiment.

In certain exemplary embodiments (but not necessarily all embodiments), one or more routers may be configured, architecturally, such that the packet router includes two processing pathways or planes, namely a "forwarding path" and a "service path." FIG. 4 schematically shows relevant portions of a router that may be used to implement certain illustrative embodiments of the invention. It should be noted that the router 400 shown in FIG. 4 is a significantly simplified representation of a router used for illustrative purposes. The present invention is not limited to the router architecture shown in FIG. 4 or to any particular router architecture.

Among other things, the router 400 includes a number of interfaces (two are shown in FIG. 4 for convenience, specifically reference number "420" and reference number "422") for receiving packets from other network devices or nodes and/or for forwarding packets to other network devices or nodes. These interfaces are similar to those shown in FIG. 3 and identified as Interfaces 1, 2 and 3. As such, each interface can act as an input or output. For discussion purposes only, however, interface 420 of the router 400 of FIG. 4 is considered an input for receiving packets, while interface 422 is considered an output to forward packets to other network devices. Indeed, those skilled in the art understand that such interfaces can have both input and output functionality.

The router 400 also has a forwarding path 424 that forwards packets through the router 400 from the input interface 420 to the output interface 422. Specifically, as known by those skilled in the art, the forwarding path 424 (also known as a "fast path," "forwarding plane," "critical path," or "data plane") contains the logic for determining how to handle and forward inbound packets received at the input interface 420. Among other things, the forwarding path 424 may include the prior noted routing table (identified in FIG. 4 by reference number "426") and one or more processors/cores (all processors in FIG. 4 are identified by reference number "428") for directing the package through the forwarding fabric of the router 400 to the appropriate output interface 422. To those ends, the forwarding path 424 includes, among other things, logic for (1) decoding the packet header, (2) looking up the destination address of the packet header, (3) analyzing other fields in the packet, and (4) processing data link encapsulation at the output interface 422.

As known by those in the art, the forwarding path 424 may be considered to have a dynamically varying line rate of forwarding packets from the input interface 420 to the output interface 422. Indeed, this line rate is a function of the processing power of the processors 428 within the forwarding path 424, its routing algorithms, and the volume of packets it is forwarding. As noted below, some embodiments may configure the forwarding path 424 to have a minimum line rate that the forwarding path 424 should maintain.

The router 400 also has a service path 434 that is separate from the forwarding path 424. The service path 434 has logic/processing devices 428 configured to perform various processing functions. Among other things, the service path 434 typically runs one or more routing protocols and optionally also the BFD protocol in order to obtain routing and link status information, which it may store in a database 436 within a persistent memory 438 (e.g., a flash drive or hard drive) that can be internal to the router 400 as shown in FIG. 4 or optionally can be external to the router 400. The service path 434 typically also processes packets that cannot be processed completely by the forwarding path, such as, for example, packets that are specifically destined for router 400 or special processing involved with "stateful" routing (e.g., special processing of a first session packet containing special metadata) as discussed below. For example, the forwarding path 424 may redirect certain packets it receives to the service path 434 for special processing. Depending on the type of packet received, the service path 434 may terminate the received packet (e.g., without generating any packet to be transmitted), may create a return packet for the forwarding path 424 to forward back to the source of the received packet (e.g., over the input interface 420), or may create a forward packet for the forwarding path 424 to forward to another device (e.g., over the output interface 422).

The router 400 may have a shared memory 432 (e.g., RAM) and/or other shared router components 440 that permit the forwarding path 424 and the service path 434 to share information and in some embodiments also to communicate directly or indirectly with one another. For example, as discussed above, the forwarding path 424 may redirect packets to the service path 434 for processing, and the service path may generate packets to be forwarded by the forwarding path 424. Also, the forwarding path 424 may have one or more counters 430 that gather statistical information about packets traversing through the forwarding path 424, and these counters 430 may be stored in the shared memory 432 to allow the service path 434 to access the counters 430 for processing and optional storage in a database 436 within a persistent memory 438 (e.g., a flash drive or hard drive) that can be internal to the router 400 as shown in FIG. 4 or optionally can be external to the router 400. One advantage of this architecture is that time-intensive tasks can be offloaded from the forwarding path 424 and instead performed by the service path 434.

Typically, the service path 434 is responsible for managing the routing table 426 (e.g., via a shared memory 432 or via direct or indirect communication) to set up routing information (sometimes referred to herein as "flows") to be used by the forwarding path 424. The routing table 426 may be stored in the shared memory 432 so that it can be accessed as needed by both the forwarding path 424 and the service path 434. Based on information obtained from a routing protocol and/or other protocols, the service path 424 may determine routes and update the routing table 426 with such routes.

Figure 5:
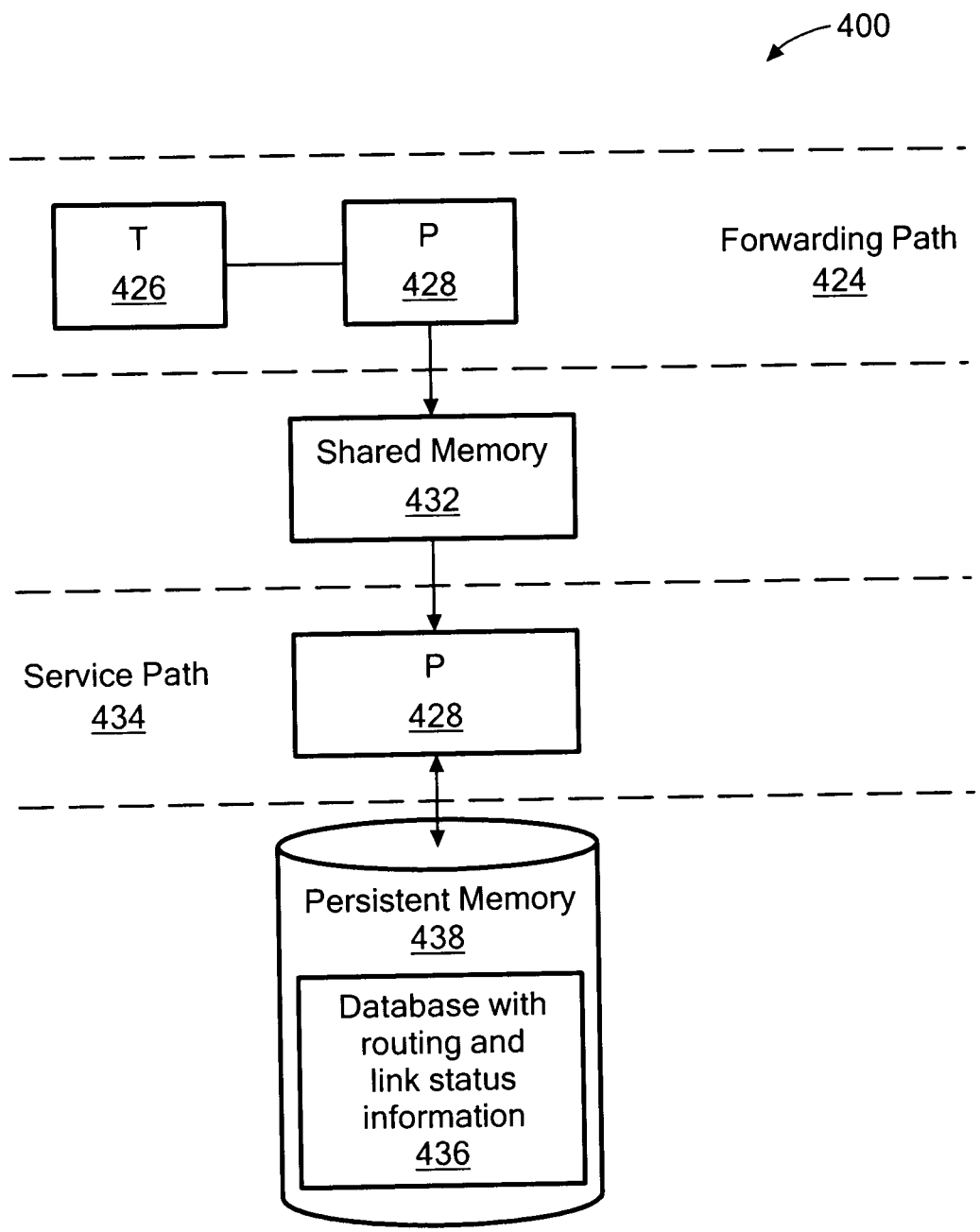
FIG. 5 schematically shows additional details of shared management of a routing table by the forwarding path and the service path of FIG. 4, in accordance with certain illustrative embodiments.

FIG. 5 schematically shows additional details of shared management of the routing table by the forwarding path 424 and the service path 434, in accordance with certain illustrative embodiments.

Routing Flows

Certain exemplary embodiments are described herein with reference to a construct referred to as a "flow." Generally speaking, a flow is a descriptor used internally by the router (e.g., by the forwarding path 424 of certain routers) to process and forward a particular set of packets (e.g., packets having a certain destination address or range of destination addresses, or packets associated with a particular "session" as discussed below with reference to "stateful" routing). In certain exemplary embodiments, a flow is associated with an ingress port on which such packets are expected to be received and an egress port over which such packets are to be forwarded. A flow typically also defines the type(s) of processing to be performed on such packets (e.g., decompress packets, decrypt packets, enqueue packets for forwarding, etc.). When a packet arrives at an interface of a router, the router attempts to find a flow that is associated with the packet (e.g., based on the destination address of the packet, or based on a session with which the packet is associated as discussed below). Generally speaking, if the router locates an active flow for the packet, then the router processes the packet based on the flow, but if the router cannot locate an active flow for the packet, then the router processes the packet (e.g., by the service path 434 of certain routers).

In certain exemplary embodiments, each flow is associated with an "action chain" established for the flow. Each action chain includes a series of functional blocks, with each functional block having a specific function associated with routing packets associated with the session/flow (e.g., decompress packets, decrypt packets, enqueue packets for forwarding, etc.). The action chains associated with different sessions/flows can have different functional blocks depending on the type of processing needed for the session/flow. In routers of the type shown and described with reference to FIG. 4, action chains may be stored in the shared memory 432, thereby allowing the forwarding path 424 to use the action chains and the service path 434 to manipulate the action chains as discussed below.

In certain exemplary embodiments, each action chain has a leading "chain descriptor" that includes two fields:

1. A pointer field containing a pointer to the first functional block in the action chain, and
2. A "valid" field (e.g., one or more bits) that is used to indicate whether the action chain is valid or invalid. Typically, one particular value of the valid field is used to indicate that the action chain is valid and can be used, while another value of the valid field is used to indicate that the action chain is invalid/deactivated.

Figure 6:
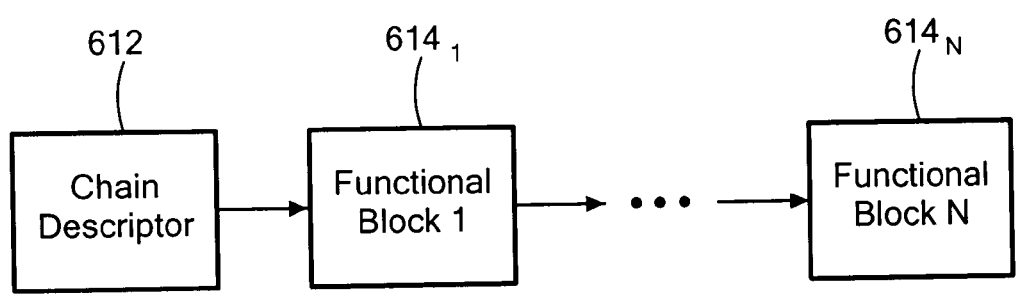
FIG. 6 is a schematic diagram of an action chain used to process and forward packets, in accordance with one exemplary embodiment.

FIG. 6 is a schematic diagram of an action chain, in accordance with one exemplary embodiment. As discussed above, the action chain includes a chain descriptor 612 and a number of functional blocks $614_1$-$614_N$. A packet is processed by first locating the action chain associated with the packet and then executing each functional block in order to effectuate processing/forwarding of the packet.

Bilateral TCP State Machine

Figure 7:
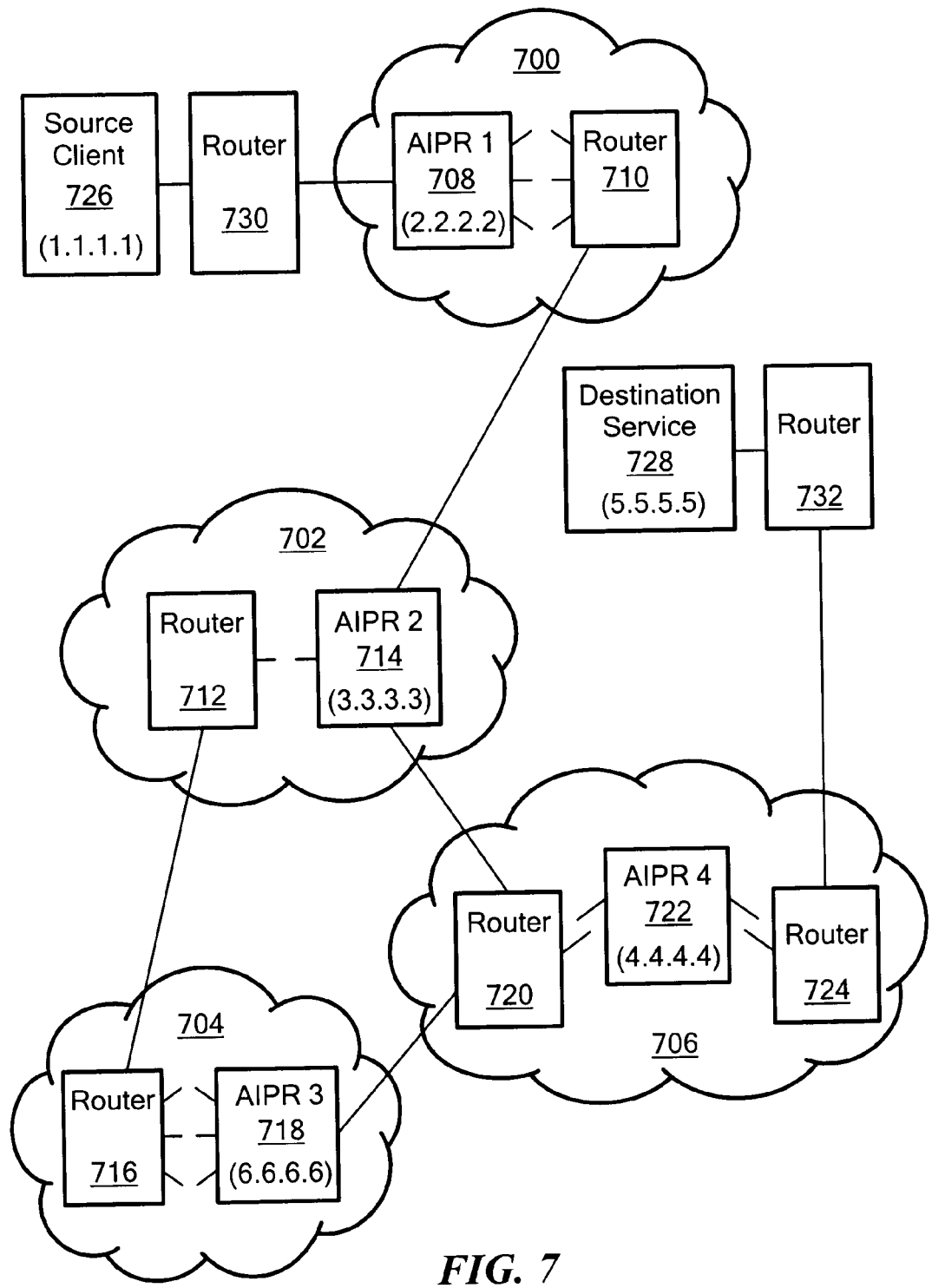
FIG. 7 schematically shows a hypothetical internet that includes conventional routers and augmented IP routers (AIPRs), in accordance with one exemplary embodiment.

Certain exemplary embodiments are now described with reference to the hypothetical internet shown in FIG. 7, although it should be noted that the present invention is not limited to the network shown in FIG. 7 or to any particular network. FIG. 7 schematically shows a hypothetical internet that includes conventional routers and "augmented" routers (sometimes referred to herein as augmented IP routers or AIPRs), according to one exemplary embodiment of the present invention. In the context of the present invention, each AIPR (and, in particular, the packet router in the AIPR) is configured to support bi-flow routes, as discussed below. Furthermore, at least one AIPR (and, in particular, the packet router in the AIPR) is further configured to implement a bilateral TCP state machine for monitoring TCP sessions, as discussed below. Such AIPRs are referred to herein as a "TCP augmented router" or "TAR."

Among other things, FIG. 7 illustrates a hypothetical set of interconnected networks 700, 702, 704 and 706, i.e., an internet. Each network 700-706 includes a number of routers and AIPRs, not all of which are necessarily shown. Network 700 includes AIPR1 708 and router 710. Network 700 may be, for example, a network of a telecommunications carrier. Network 702 includes a router 712 and AIPR 2 714. Network 702 may be, for example, a network of a first ISP. Network 704 includes a router 716 and AIPR 3 718. Network 704 may be, for example, the Internet backbone or a portion thereof. Network 706 includes a router 720, AIPR 4 722 and another router 724. Network 706 may be, for example, a network of a second ISP. For the sake of this discussion, the source client node 726 is associated with fictitious network address 1.1.1.1; AIPR 1 708 is associated with fictitious network address 2.2.2.2; AIPR 2 714 is associated with fictitious network address 3.3.3.3; APIR 3 718 is associated with fictitious network address 6.6.6.6; AIPR 4 722 is associated with fictitious network address 4.4.4.4; and destination service node 728 is associated with fictitious network address 5.5.5.5. It should be noted that the hypothetical internet shown in FIG. 7 may have additional interconnections that, for convenience, are not depicted. For example, the hypothetical internet may include interconnections between routers 710, 712, 716, 720, and 724 such that there may be communication paths between the source client 726 and the destination service 728 that do not traverse an AIPR. For convenience, packets being routed from the source client 726 toward the destination service 728 may be referred to herein as "forward" packets or the "forward" direction or path, and packets being routed from the destination service 728 toward the source client 726 may be referred to herein as "reverse" or "backward" or "return" packets or the "reverse" or "backward" or "reverse" direction or path.

Figure 24:
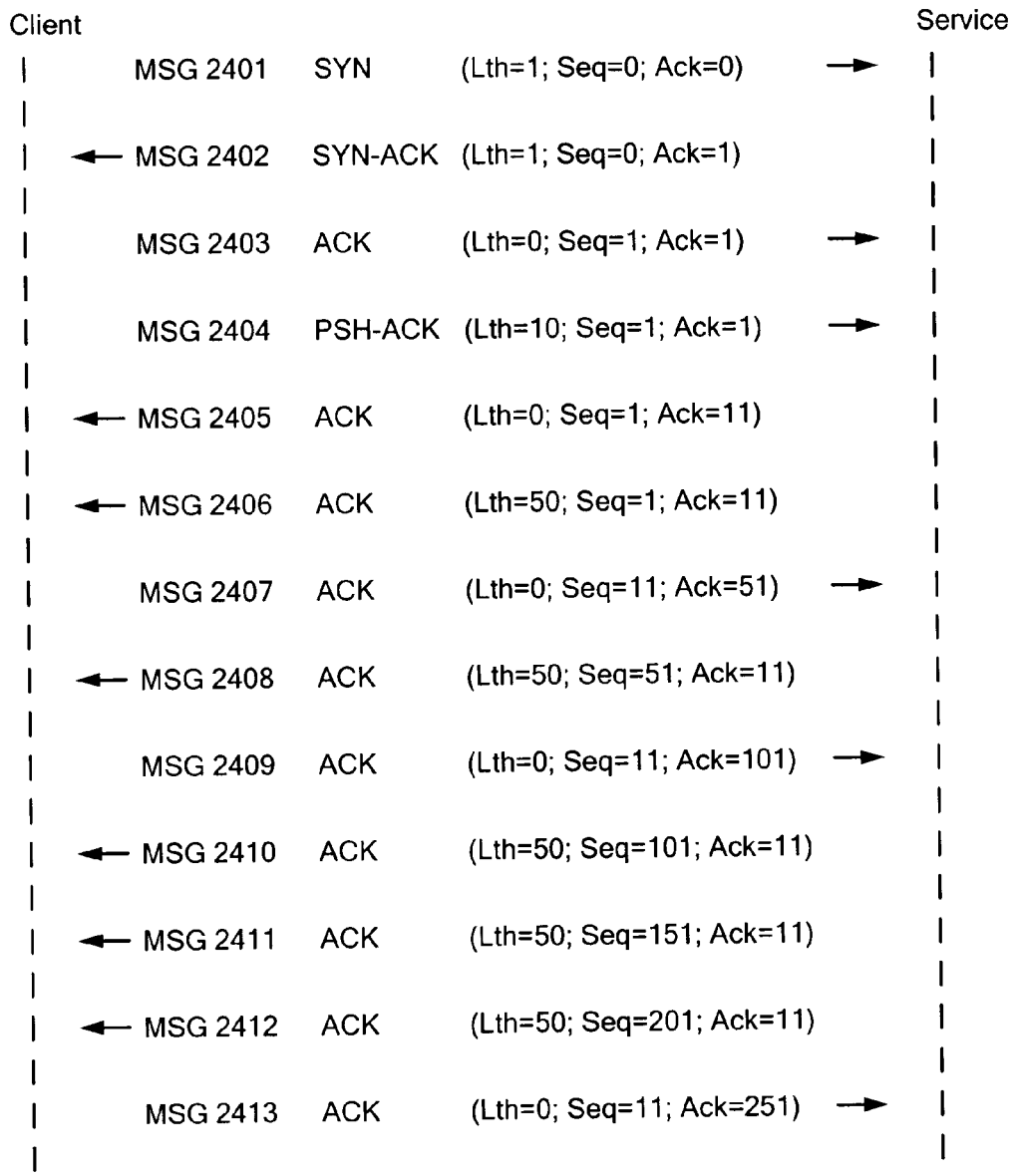
FIG. 24 schematically shows an exemplary TCP message exchange between the source client node and the destination service node of FIG. 7, in accordance with one exemplary embodiment.

With reference to the hypothetical internet shown in FIG. 7, FIG. 24 schematically shows an exemplary TCP message exchange between the source client node 726 and the destination service node 728, in accordance with one exemplary embodiment. It is well-known that TCP uses sequence numbers to allow each node to convey the amount of TCP packets and data it has transmitted and also to acknowledge receipt of TCP packets and data received from the other node. In a TCP connection between two nodes, each node maintains its own sequence number. The three-way TCP handshake (SYN, SYN-ACK, ACK) serves to synchronize the starting sequence numbers that the two nodes will use at the outset. In this example, each node begins with a relative sequence number (Seq) of zero and increases the sequence number included in TCP packets it transmits according to the amount of data it has transmitted. Each node also includes an acknowledgement (ACK) in each TCP packet it transmits to acknowledge TCP packets and data it has received from the other node. Certain types of TCP packets, such as TCP SYN packets and TCP FIN packets, have an implied length of one (1) byte even though such packets do not actually carry any payload data. The (implied) non-zero length allows for such packets to be tracked and acknowledged using the sequence number mechanism.

In this example, the source client node 726 initiates the TCP session by transmitting a TCP SYN message (MSG 2401) to the destination service node 728 including a sequence number of zero (0), indicating that this is the first TCP packet transmitted by the source client node 726 for the session, and also including an acknowledgement of zero (0), indicating that no TCP packets have yet been received by the source client node 726 from the destination service node 728. The TCP SYN packet (MSG 2401) has an implied length of one (1) byte even though there is no payload data carried in the TCP SYN packet.

The destination service node 728 replies to MSG 2401 with a TCP SYN message (MSG 2402) including a sequence number of zero (0), indicating that this is the first TCP packet transmitted by the destination service node 728 for the session, and also including an acknowledgement of one (1), indicating the destination service node 728 has received one (1) byte of data from the source client node 726 (i.e., MSG 2401). Again, the TCP SYN packet (MSG 2402) has an implied length of one (1) byte even though there is no payload of data carried in the TCP SYN packet.

The source client node 726 transmits a TCP ACK message (MSG 2043) including a sequence number of one (1), indicating that the source client node 726 has previously transmitted one (1) byte of data for the session (namely, MSG 2041), and also including an acknowledgement of one (1), indicating that the source client node 726 has received one (1) byte of data from the destination service node 728 (i.e., MSG 2402).

The source client node 726 then transmits a TCP PSH message (MSG 2404) with 10 bytes of data (e.g., a request for a web page or other data) and including a sequence number of one (1), indicating that the source client node 726 has previously transmitted one (1) byte of data for the session (i.e., MSG 2401), and also including an acknowledgement of one (1), indicating that the source client node 726 has received one (1) byte of data from the destination service node 728 (i.e., MSG 2402).

The destination service node 728 transmits a TCP ACK message (MSG 2405) including a sequence number of one (1), indicating that the destination service node 728 has previously transmitted one (1) byte of data for the session (i.e., MSG 2402), and also including an acknowledgement of 11, indicating that the destination service node 728 has received 11 bytes of data from the source client node 726 (i.e., MSG 2401 and MSG 2404).

The destination service node 728 then transmits a TCP ACK message (MSG 2406) with 50 bytes of data and including a sequence number of one (1), indicating that the destination service node 728 has previously transmitted one (1) byte of data for the session (i.e., MSG 2402), and also including an acknowledgement of 11, indicating that the destination service node 728 has received 11 bytes of data from the source client node 726 (i.e., MSG 2401 and MSG 2404).

The source client node 726 transmits a TCP ACK message (MSG 2407) including a sequence number of 11, indicating that the source client node 726 has previously transmitted 11 bytes of data for the session (i.e., MSG 2401 and MSG 2404), and also including an acknowledgement of 51, indicating that the source client node 726 has received 51 bytes of data from the destination service node 728 (i.e., MSG 2402 and MSG 2406).

The destination service node 728 transmits a TCP ACK message (MSG 2408) with 50 more bytes of data and including a sequence number of 51, indicating that the destination service node 728 has previously transmitted 51 bytes of data for the session (i.e., MSG 2402 and MSG 2406), and also including an acknowledgement of 11, indicating that the destination service node 728 has received 11 bytes of data from the source client node 726 (i.e., MSG 2401 and MSG 2404).

The source client node 726 transmits a TCP ACK message (MSG 2409) including a sequence number of 11, indicating that the source client node 726 has previously transmitted 11 bytes of data for the session (i.e., MSG 2401 and MSG 2404), and also including an acknowledgement of 101, indicating that the source client node 726 has now received 101 bytes of data from the destination service node 728 (i.e., MSG 2402, MSG 2406, and MSG 2408).

As the message exchange continues, each node increases its sequence number to reflect the number of bytes it has transmitted and sends back acknowledgements for TCP packets and data it has received.

In the example so far, each node acknowledges packets on a one-to-one basis, i.e., a node transmits a packet, receives an acknowledgement for the packet, and then transmits the next package. Typically, however, nodes are able to transmit multiple packets up to a predetermined "window" size supported by the other node without having to receive an acknowledgement from the other node, and an acknowledgement transmitted by a node can acknowledge receipt of multiple packets. Generally speaking, this sequence number mechanism with windowing allows for higher data throughput across the network.

Thus, for example, continuing with the above example, the destination service node 728 may transmit three more 50-byte packets (MSG 2410, MSG 2411, and MSG 2412) with appropriate sequence numbers of 101, 151, and 201, respectively. Assume, for the sake of this example, that the source client node 726 has a window size of 150 bytes, such that the destination service node 728 will not transmit any more data until it receives an acknowledgement for at least one of the three packets (e.g., if MSG 2410 is acknowledged, then the destination service node 728 can transmit 50 more bytes; if MSG 2411 is acknowledged, then the destination service node 728 can transmit 100 more bytes, etc.). The source client node 726 can acknowledge all three messages by transmitting a TCP ACK message (MSG 2413) with an acknowledgement of 251, indicating that the source client node 726 has now received 251 bytes from the destination service node 728 (i.e., MSG 2402, MSG 2406, MSG 2408, MSG 2410, MSG 2411, and MSG 2412).

The sequence number mechanism allows nodes to detect one or more lost packets. For example, if the source client node 726 had received MSG 2410 followed by MSG 2412, then the source client node 726 could determine that at least one packet (MSG 2411 in this example) was lost, based on the sequence numbers of the packets. Specifically, after receiving MSG 2410, the source client node 726 would expect the next packet to have a sequence number of 151. Upon receiving MSG 2412 with sequence number 201, the source client node 726 could detect the loss of MSG 2411. In this case, the source client node 726 generally would acknowledge receipt of MSG 2410 but not MSG 2412 (because acknowledging receipt of MSG 2412 would imply to the destination service node 728 that all packets had been received), and the destinations service node 728 typically would re-retransmit MSG 2411 and MSG 2412 after a predetermined time-out period.

Similarly, if the source client node 726 had not received any of the messages 2410-2412, then the source client node 726 would not have transmitted TCP ACK MSG 2413. In this case, the source client node 726 would not explicitly detect the lost packets, but the destination service node 728 would at least infer that those packets were lost because it would not receive an acknowledgement for those packets. Therefore, the destination service node 728 typically would retransmit messages 2410-2412 after a predetermined time-out period.

Similarly, if the source client node 726 had received messages 2410-2412 but the destination service node 728 had not received MSG 2413, the destination service node 728 would at least infer that those packets were lost because it would not receive an acknowledgement for those packets. Therefore, the destination service node 728 typically would retransmit messages 2410-2412 after a predetermined time-out period.

The sequence number mechanism also allows nodes to detect receipt of packets out-of-order. For example, if the source client node 726 had received MSG 2411 followed by MSG 2410, then the source client node 726 could determine that the packets were received out-of-order but also could determine that all packets have been received. Typically, the source client node 726 would be able to re-order the packets into the correct order and continue processing (e.g., acknowledge receipt of MSG 2410 and MSG 2411), although in some cases, the source client node 726 will drop MSG 2411 and acknowledge MSG 2410, in which case the destination service node 728 typically would re-transmit MSG 2411 and MSG 2412 after a predetermined time-out period.

The sequence number mechanism also allows nodes to detect receipt of duplicate packets. For example, if the source client node 726 had received MSG 2410 twice, then the source client node 726 could detect the duplicate packets based on the sequence numbers. Typically, the source client node 726 would simply acknowledge receipt of MSG 2410 and discard the duplicate packet.

It should be noted that, in traditional IP networks, packets transmitted by the source client node 726 to the destination service node 728 are not required to traverse the same set of routers. For example, MSG 2401 and MSG 2403 may traverse different paths through the network. Similarly, packets transmitted by the destination service node 728 to the source client node 726 are not required to traverse the same set of routers (e.g., MSG 2402 and MSG 2405 may traverse different paths through the network) and are not required to traverse the same set of routers as the forward packets (e.g., MSG 2402 may traverse a different set of routers than MSG 2401). Therefore, in traditional IP networks, no router is assured to receive all packets associated with a given TCP session in either direction.

In exemplary embodiments of the present invention, session packets transmitted between two nodes are made to traverse a given set of AIPRs such that each of the AIPRs receives session packets traveling in both directions between the nodes (referred to herein as "bi-flow" routes). The set of AIPRs includes at least one "TCP augmented router" or "TAR" that is specially configured to establish or otherwise participate in such bi-flow routes and also to implement, for each bi-flow route, a bilateral TCP state machine that monitors the status of the TCP session between two nodes based on the TCP sequence numbers in both directions, maintains and updates various statistics based on the status of the TCP session (e.g., dropped packets, duplicated packets, out-of-sequence packets, packet throughput, etc.), and optionally makes routing decisions (e.g., deciding whether or not to forward a particular packet, deciding whether to reconfigure a bi-flow routing session, etc.) based on the status of the TCP session, as discussed in greater detail below.

For example, with reference again to FIG. 7, routes are established for a given TCP session between the source client node 726 and the destination service node 728 through a given set of AIPRs in a bi-flow manner. Preferred embodiments establish such bi-flow routes using a stateful routing protocol, examples of which are discussed below, although other techniques can be used to establish such bi-flow routes, e.g., using hard-coded routes, or using Multiprotocol Label Switching (MPLS) as described in RFC 3031 and related RFCs 6178 and 6790, which are hereby incorporated herein by reference.

For the sake of the following discussion, it is assumed that the bi-flow routes associated with a given TCP session traverse AIPR 1 708, AIPR 2 714, and AIPR 4 722. Thus, with reference again to the exemplary message flow of FIG. 24, each of these AIPRs associated with the TCP session will (or at least should) receive all packets associated with the session in both directions, i.e., MSG 2401-MSG 2413 and beyond. At least one of these AIPRs (and typically all of these AIPRs) is a TCP augmented router (TAR).

In one exemplary embodiment, each TAR is configured to implement a bilateral TCP state machine for each TCP session, where the bilateral TCP state machine mirrors the TCP sequence numbering and windowing of the source client node (referred to in the following examples as "Node A") and the destination service node (referred to in the following examples as "Node B"). Generally speaking, the bilateral TCP state machine tracks the sequence numbers between the two parties in a TCP connection, as well as monitors the bytes sent between them. As packets arrive, the bilateral TCP state machine compares the sequence numbers that the host inserted to what the bilateral TCP state machine expects. If the sequence number in a packet is equal to the expected sequence number, then the bilateral TCP state machine forwards the packet. If the sequence number in a packet is less than the expected sequence number, then the packet may be a retransmitted packet or a packet received out-of-order, in which case the bilateral TCP state machine typically forwards the packet and logs the error. If the sequence number in a packet is greater than the expected sequence number, then one or more packets may have been dropped before reaching the TAR, in which case the bilateral TCP state machine typically logs the error and forwards the packet provided the packet sequence number is within the advertised window size for the TCP session (otherwise, the bilateral TCP state machine may discard the packet without forwarding). In any case, the bilateral TCP state machine updates the expected sequence number if needed according to the number of bytes in the packet. The bilateral TCP state machine is described in greater detail below.

The bilateral TCP state machine stores forward TCP state information and return TCP state information for each TCP bi-flow session. In certain exemplary embodiments, the bilateral TCP state machine stores forward TCP state information including information from which the bilateral TCP state machine can determine the next sequence number expected from Node A (ExpectedSeqA) and optionally also the highest acknowledgment sequence number received from Node B (HighestAckB) and also stores return TCP state information including information from which the bilateral TCP state machine can determine the next sequence number expected from Node B (ExpectedSeqB) and optionally also the highest acknowledgment sequence number received from Node A (HighestAckA). The bilateral TCP state machine uses such reference TCP sequence information to monitor the TCP bi-flow session, in combination with TCP sequence information received in TCP session packets. The bilateral TCP state machine also stores various statistical information (e.g., counters) for each direction of the bi-flow route, e.g., to track the number or rate of erroneous packets (e.g., dropped packets, duplicate packets, out-of-sequence packets, and/or out-of-window packets) encountered for each direction.

FIG. 25 is a schematic diagram showing the contents of a bilateral TCP state record that is maintained as part of a bilateral TCP state database by the bilateral TCP state machine, in accordance with one exemplary embodiment. Among other things, the bilateral TCP state record includes the forward TCP state information (e.g., HighestSeqA, HighestAckB, Forward Counters) and the return TCP state information (e.g., HighestSeqB, HighestAckA, Return Counters) as discussed above. Typically, the HighestSeqA and HighestSeqB store the next expected sequence number (e.g., the sum of the sequence number and length from a given packet, as in the various examples provided below), although the HighestSeqA and HighestSeqB alternatively may store the sequence number and length from a given packet. The bilateral TCP state record may contain other information, such as, for example, a full or partial history of forward and return packets received for the TCP session, where such information could be used by the bilateral TCP state machine in characterizing various types of errors. The bilateral TCP state machine also may maintain TCP Session State and TCP Session Statistics in the bilateral TCP state record to monitor the state of the corresponding TCP session (e.g., initiated, established, or closed), as discussed below.

With reference again to FIG. 24, the following sequence demonstrates how the bilateral TCP state machine maintains and uses sequence number information, in accordance with one exemplary embodiment. In this example, the client node is referred to as Node A and the destination node is referred to as Node B. In this example, the bilateral TCP state machine starts with the following initial sequence number information prior to transmission of MSG 2401:

| | |
|---|---|
| ExpectedSeqA | 0 |
| HighestAckB | 0 |
| ExpectedSeqB | 0 |
| HighestAckA | 0 |

Upon receipt of MSG 2401=SYN (Lth=1; Seq=0; Ack=0) from the client (Node A), the bilateral TCP state machine updates the sequence number information as follows:

| | |
|---|---|
| ExpectedSeqA | 1 |
| HighestAckB | 0 |
| ExpectedSeqB | 0 |
| HighestAckA | 0 |

Upon receipt of MSG 2402=SYN-ACK (Lth=1; Seq=0; Ack=1) from the destination (Node B), the bilateral TCP state machine updates the sequence number information as follows:

| | |
|---|---|
| ExpectedSeqA | 1 |
| HighestAckB | 1 |
| ExpectedSeqB | 1 |
| HighestAckA | 0 |

Upon receipt of MSG 2403=ACK (Lth=0; Seq=1; Ack=1) from the client (Node A), the bilateral TCP state machine updates the sequence number information as follows:

| | |
|---|---|
| ExpectedSeqA | 1 |
| HighestAckB | 1 |
| ExpectedSeqB | 1 |
| HighestAckA | 1 |

Upon receipt of MSG 2404=PSH-ACK (Lth=10; Seq=1; Ack=1) from the client (Node A), the bilateral TCP state machine updates the sequence number information as follows:

| | |
|---|---|
| ExpectedSeqA | 11 |
| HighestAckB | 1 |
| ExpectedSeqB | 1 |
| HighestAckA | 1 |

Upon receipt of MSG 2405=ACK (Lth=0; Seq=1; Ack=11) from the destination (Node B), the bilateral TCP state machine updates the sequence number information as follows:

| | |
|---|---|
| ExpectedSeqA | 11 |
| HighestAckB | 11 |
| ExpectedSeqB | 1 |
| HighestAckA | 1 |

Upon receipt of MSG 2406=ACK (Lth=50; Seq=1; Ack=11) from the destination (Node B), the bilateral TCP state machine updates the sequence number information as follows:

| | |
|---|---|
| ExpectedSeqA | 11 |
| HighestAckB | 11 |
| ExpectedSeqB | 51 |
| HighestAckA | 1 |

Upon receipt of MSG 2407=ACK (Lth=0; Seq=11; Ack=51) from the client (Node A), the bilateral TCP state machine updates the sequence number information as follows:

| | |
|---|---|
| ExpectedSeqA | 11 |
| HighestAckB | 11 |
| ExpectedSeqB | 51 |
| HighestAckA | 51 |

Upon receipt of MSG 2408=ACK (Lth=50; Seq=51; Ack=11) from the destination (Node B), the bilateral TCP state machine updates the sequence number information as follows:

| | |
|---|---|
| ExpectedSeqA | 11 |
| HighestAckB | 11 |
| ExpectedSeqB | 101 |
| HighestAckA | 51 |

Upon receipt of MSG 2409=ACK (Lth=0; Seq=11; Ack=101) from the client (Node A), the bilateral TCP state machine updates the sequence number information as follows:

| | |
|---|---|
| ExpectedSeqA | 11 |
| HighestAckB | 11 |
| ExpectedSeqB | 101 |
| HighestAckA | 101 |

Upon receipt of MSG 2410=ACK (Lth=50; Seq=101; Ack=11) from the destination (Node B), the bilateral TCP state machine updates the sequence number information as follows:

| | |
|---|---|
| ExpectedSeqA | 11 |
| HighestAckB | 11 |
| ExpectedSeqB | 151 |
| HighestAckA | 101 |

Upon receipt of MSG 2411=ACK (Lth=50; Seq=151; Ack=11) from the destination (Node B), the bilateral TCP state machine updates the sequence number information as follows:

| | |
|---|---|
| ExpectedSeqA | 11 |
| HighestAckB | 11 |
| ExpectedSeqB | 201 |
| HighestAckA | 101 |

Upon receipt of MSG 2412=ACK (Lth=50; Seq=201; Ack=11) from the destination (Node B), the bilateral TCP state machine updates the sequence number information as follows:

| | |
|---|---|
| ExpectedSeqA | 11 |
| HighestAckB | 11 |
| ExpectedSeqB | 251 |
| HighestAckA | 101 |

Upon receipt of MSG 2413=ACK (Lth=0; Seq=11; Ack=251) from the client (Node A), the bilateral TCP state machine updates the sequence number information as follows:

| | |
|---|---|
| ExpectedSeqA | 11 |
| HighestAckB | 11 |
| ExpectedSeqB | 251 |
| HighestAckA | 251 |

Using the TCP sequence number information in received packets and the TCP sequence number information maintained in the bilateral TCP state record, the bilateral TCP state machine can detect one or more lost or out-of-order packets.

For example, if the TAR had received MSG 2410 followed by MSG 2412 because MSG 2411 had been lost prior to reaching the TAR, as depicted schematically in FIG. 26, then the bilateral TCP state machine could determine that at least one packet (MSG 2411 in this example) was missing, because the TAR would expect to receive sequence number 151 in the next message from the destination service 728 following MSG 2410 but MSG 2412 includes sequence number 201. Furthermore, the bilateral TCP state machine can infer that the error occurred on the service side of the TCP session because the TAR had not previously received MSG 2410 and MSG 2412. In certain exemplary embodiments, the bilateral TCP state machine determines whether MSG 2412 is within the advertised window size for the TCP session, e.g., by comparing the sequence number in MSG 2412 to the next expected sequence number (i.e., ExpectedSeqB), and only forwards MSG 2412 if it is within the advertised window size for the TCP session; in alternative embodiments, the bilateral TCP state machine may forward MSG 2412 unconditionally. In either case, the bilateral TCP state machine may be configured to increment a counter (e.g., an error counter or a specific "lost packet" counter) associated with the return path and update the sequence number information as follows:

| | |
|---|---|
| ExpectedSeqA | 11 |
| HighestAckB | 11 |
| ExpectedSeqB | 251 |
| HighestAckA | 101 |

Assuming the client receives MSG 2410 forwarded by the TAR, then the client may acknowledge receipt of MSG 2410 by sending MSG 2613=ACK (Lth=0; Seq=11; Ack=151), in which case the bilateral TCP state machine may end up with the following TCP engine state:

| | |
|---|---|
| ExpectedSeqA | 11 |
| HighestAckB | 11 |
| ExpectedSeqB | 251 |
| HighestAckA | 151 |

The client generally will not acknowledge receipt of MSG 2412 because the client has not received MSG 2411. Thus, since MSG 2411 was lost prior to reaching the TAR, the destination service 728 will not receive acknowledgment of MSG 2411 and MSG 2412 and therefore will retransmit those packets after expiration of a predetermined timeout period. Assuming the retransmitted packets 2411 and 2412 reach the TAR, the bilateral TCP state machine will identify both packets as being retransmitted packets resulting from lost MSG 2411, since the sequence numbers of 151 and 201 are less than the next expected sequence number of 251, in which case the bilateral TCP state machine will forward the packets and may increment a counter (e.g., an error counter or a specific "duplicate packet" counter) associated with the return path for each of the two retransmitted packets.

Similarly, if the TAR had received MSG 2410 followed by MSG 2412 and then MSG 2411, as depicted schematically in FIG. 27, then the bilateral TCP state machine could determine that messages 2412 and 2411 were received out-of-order, because the bilateral TCP state machine would expect to receive sequence number 151 in the next message from the destination service 728 following MSG 2410 but MSG 2412 includes sequence number 201. Furthermore, the bilateral TCP state machine can infer that the error occurred on the service side of the TCP session because the TAR had not previously received MSG 2410 and MSG 2412. In certain exemplary embodiments, the bilateral TCP state machine determines whether MSG 2412 is within the advertised window size for the TCP session, e.g., by comparing the sequence number in MSG 2412 to the next expected sequence number (i.e., ExpectedSeqB), and only forwards MSG 2412 if it is within the advertised window size for the TCP session; in alternative embodiments, the bilateral TCP state machine may forward MSG 2412 unconditionally. In any case, the bilateral TCP state machine may be configured to increment a counter (e.g., an error counter or a specific "lost packet" counter) associated with the return path and update the sequence number information as follows:

| | |
|---|---|
| ExpectedSeqA | 11 |
| HighestAckB | 11 |
| ExpectedSeqB | 251 |
| HighestAckA | 101 |

Upon receiving MSG 2411, the bilateral TCP state machine identifies the packet as being received out-of-order because the sequence number of 151 is less than the next expected sequence number of 251, in which case the bilateral TCP state machine forwards MSG 2411 and may increment a counter (e.g., an error counter or a specific "out-of-order" counter) associated with the return path.

Assuming the client receives messages 2410-2412, the client may acknowledge receipt of messages 2410-2412 by sending MSG 2713=ACK (Lth=0; Seq=11; Ack=251), in which case the bilateral TCP state machine may end up with the following TCP engine state (which is the same state as in the receipt of MSG 2413 above):

| | |
|---|---|
| ExpectedSeqA | 11 |
| HighestAckB | 11 |
| ExpectedSeqB | 251 |
| HighestAckA | 251 |

Similarly, using the TCP sequence number information in received packets and the TCP sequence number information maintained in the TCP state database, the bilateral TCP state machine can detect receipt of a duplicate packet. For example, as depicted schematically in FIG. 28, if the TAR had received MSG 2410 followed by a duplicate of MSG 2410 as MSG 2810, then the TAR could determine that MSG 2810 is a duplicate of an earlier packet (in this case, MSG 2410) because the TAR would expect to receive sequence number 151 in the next message from the destination service 728 following MSG 2410 but MSG 2810 includes sequence number 101, which is less than the expected sequence number. In this case, the bilateral TCP state machine may be configured to increment a counter (e.g., an error counter or a specific "duplicate packet" counter) associated with the return path. The TAR typically would be configured to forward the duplicate packet to the client 726, although if MSG 2410 had been acknowledged by the client, the TAR may drop MSG 2810 (the dashed-line arrow represented the optional forwarding of duplicate message 2810). In one exemplary embodiment, the TCP engine state would not change throughout the process of forwarding the duplicate packet MSG 2810.

Various types of communication errors also can occur after the TAR forwards packets. For example, as depicted schematically in FIG. 29, assume the TAR had received and forwarded messages 2410-2412 but MSG 2410 did not reach the client. The bilateral TCP state machine would have the following TCP engine state (which is the same state as in the receipt of MSG 2412 above):

| | |
|---|---|
| ExpectedSeqA | 11 |
| HighestAckB | 11 |
| ExpectedSeqB | 251 |
| HighestAckA | 101 |

In this case, the client may send no acknowledgement for messages 2410-2412. After a predetermined timeout period, the destination service 728 would retransmit packets 2410-2412. Assuming the retransmitted packets 2410-2412 reach the TAR, the bilateral TCP state machine will identify all three packets as being retransmitted packets, since the sequence numbers of 101, 151 and 201 are less than the next expected sequence number of 251. In this case, the bilateral TCP state machine can infer that an error occurred on the client side of the TCP session, since the TAR had previously received and forwarded packets 2410-2412 and none of these packets had been acknowledged by the client. In this case, the bilateral TCP state machine will forward the packets and may increment a counter (e.g., an error counter or a specific "duplicate packet" counter) associated with the return path for each of the three retransmitted packets.

Figure 30:
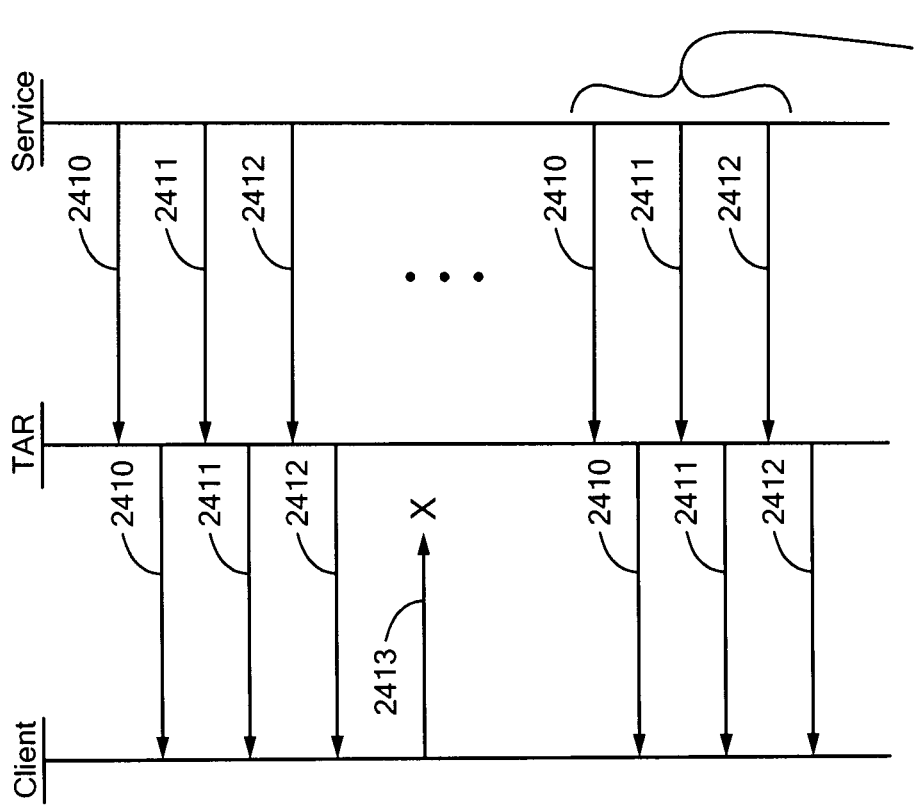
FIG. 30 schematically shows an exemplary TCP message exchange in which an acknowledgment packet from the source client node is lost prior to reaching the router.

Similarly, as depicted schematically in FIG. 30, assume the TAR had received and forwarded messages 2410-2412 but MSG 2413 acknowledging receipt of messages 2410-2412 did not reach the TAR. The TAR would have the following TCP engine state (which is the same state as in the receipt of MSG 2412 above):

|  |  |
|---|---|
| ExpectedSeqA | 11 |
| HighestAckB | 11 |
| ExpectedSeqB | 251 |
| HighestAckA | 101 |

After a predetermined timeout period, the destination service 728 would retransmit packets 2410-2412. Assuming the retransmitted packets 2410-2412 reach the TAR, the bilateral TCP state machine will identify all three packets as being retransmitted packets, since the sequence numbers of 101, 151 and 201 are less than the next expected sequence number of 251. In this case, the bilateral TCP state machine can infer that an error occurred on the client side of the TCP session, since the TAR had previously received and forwarded packets 2410-2412 and none of these packets had been acknowledged by the client. In this case, the bilateral TCP state machine will forward the packets and may increment a counter (e.g., an error counter or a specific "duplicate packet" counter) associated with the return path for each of the three retransmitted packets.

Figure 29:
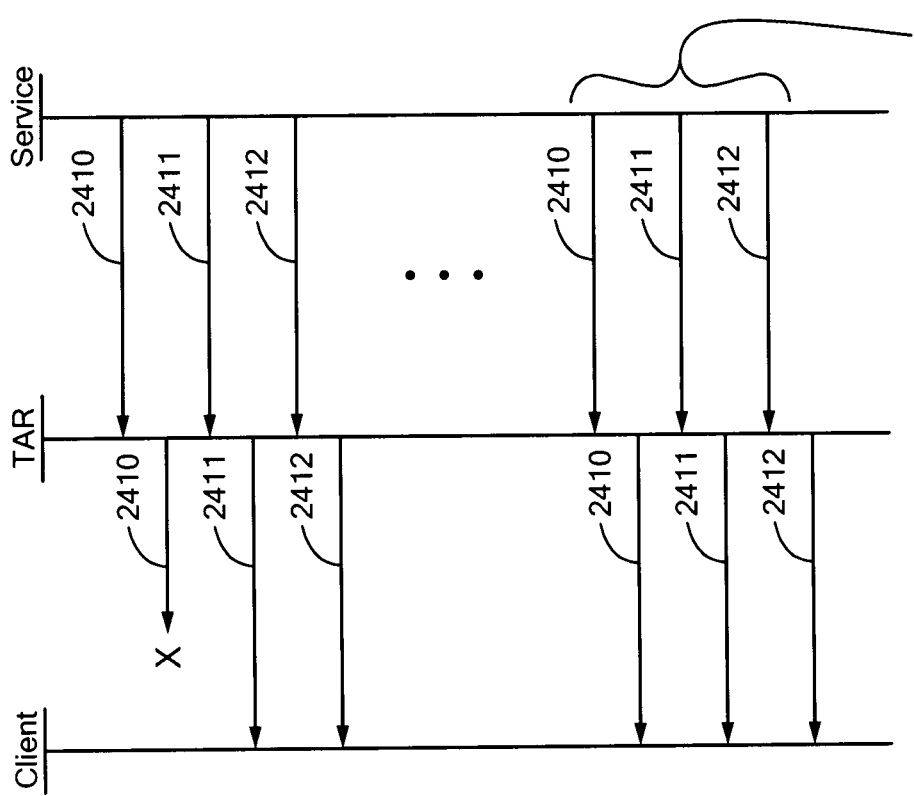
FIG. 29 schematically shows an exemplary TCP message exchange in which a packet from the destination service node is forwarded by the router but does not reach the source client node.
Figure 31:
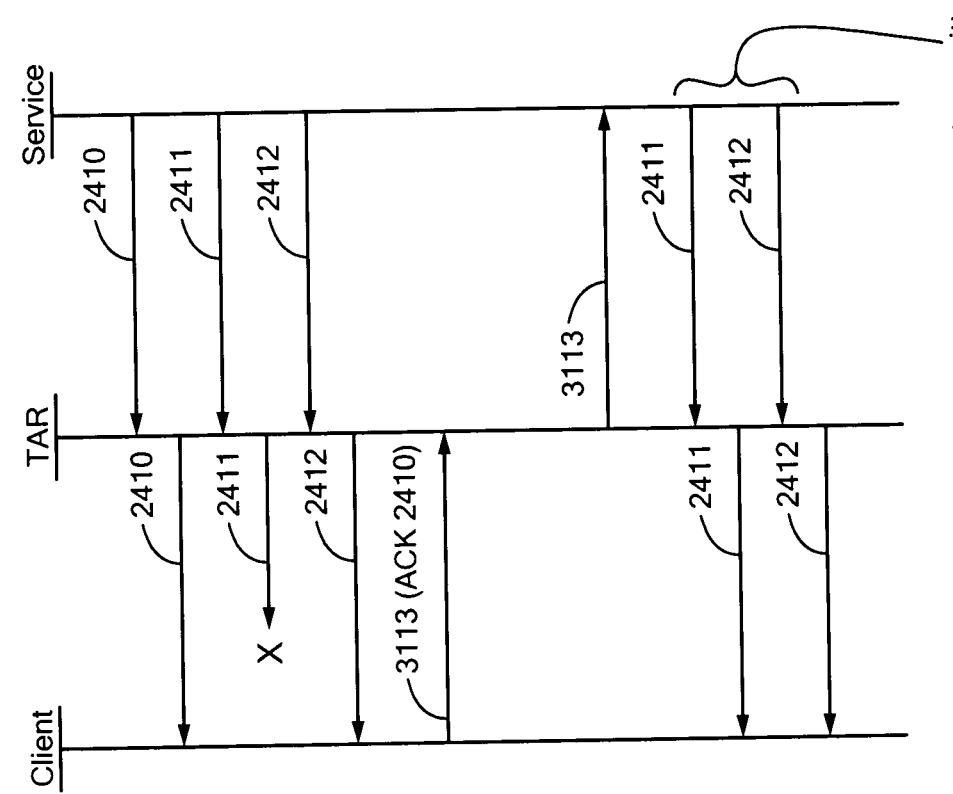
FIG. 31 schematically shows an exemplary TCP message exchange in which a second packet from the destination service node is forwarded by the router but does not reach the source client node.

FIG. 31 schematically depicts a situation similar to that of FIG. 29, but in this case, it is assumed that the TAR had received and forwarded messages 2410-2412 but MSG 2411 did not reach the client. The TAR would have the following TCP engine state (which is the same state as in the receipt of MSG 2412 above):

|  |  |
|---|---|
| ExpectedSeqA | 11 |
| HighestAckB | 11 |
| ExpectedSeqB | 251 |
| HighestAckA | 101 |

In this example, the client sends an acknowledgement message MSG 3113 ACK (Lth=0; Seq=11; Ack=151) to acknowledge receipt of MSG 2410, in which case the bilateral TCP state machine may end up with the following TCP engine state:

|  |  |
|---|---|
| ExpectedSeqA | 11 |
| HighestAckB | 11 |
| ExpectedSeqB | 251 |
| HighestAckA | 151 |

The client generally will not acknowledge receipt of MSG 2412 because the client has not received MSG 2411. Thus, since MSG 2411 was lost prior to reaching the client, the destination service 728 will not receive acknowledgment of MSG 2411 and MSG 2412 and therefore will retransmit those packets after expiration of a predetermined timeout period. Assuming the retransmitted packets 2411 and 2412 reach the TAR, the bilateral TCP state machine will identify both packets as being retransmitted packets, since the sequence numbers of 151 and 201 are less than the next expected sequence number of 251. In this case, the bilateral TCP state machine can infer that an error occurred on the client side of the TCP session, since the TAR had previously received and forwarded MSG 2411 and MSG 2412 but neither of these packets had been acknowledged by the client. In this case, the bilateral TCP state machine will forward the packets and may increment a counter (e.g., an error counter or a specific "duplicate packet" counter) associated with the return path for each of the two retransmitted packets.

Figure 32:
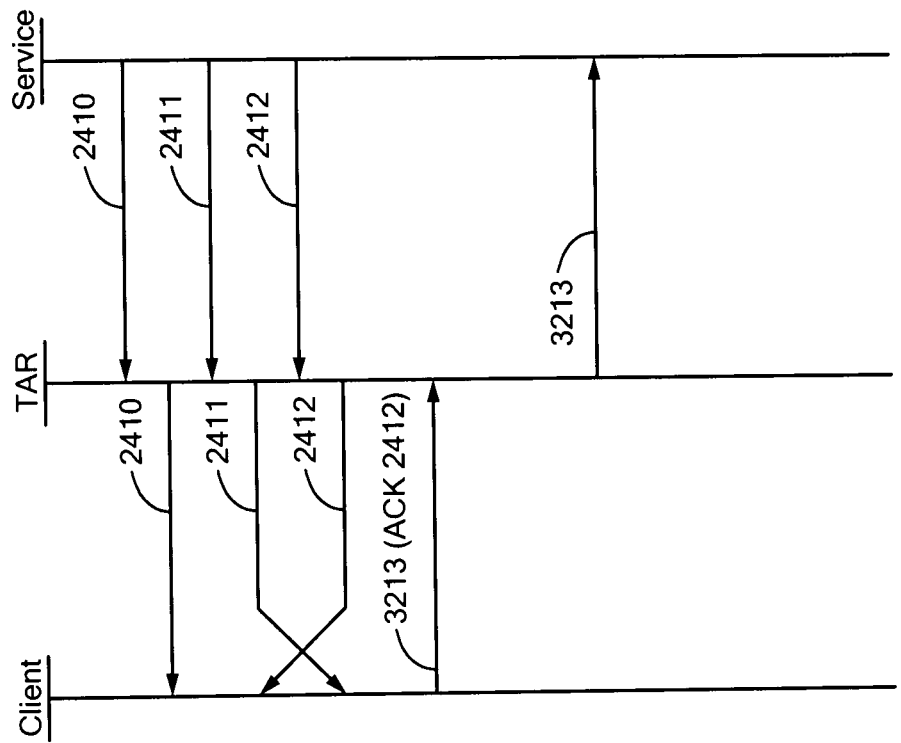
FIG. 32 schematically shows an exemplary TCP message exchange in which packets from the destination service node are forwarded by the router in-order but are received out-of-order by the source client node.

FIG. 32 schematically depicts a situation in which packets forwarded by the TAR are received out-of-order by the client 726 but are corrected and acknowledged by the client 726. In this case, assume the TAR had received and forwarded messages 2410-2412 but messages 2411 and 2412 arrived at the client out-of-order. The TAR would have the following TCP engine state (which is the same state as in the receipt of MSG 2412 above):

|  |  |
|---|---|
| ExpectedSeqA | 11 |
| HighestAckB | 11 |
| ExpectedSeqB | 251 |
| HighestAckA | 101 |

Upon receiving the acknowledgement message MSG 3213=ACK (Lth=0; Seq=11; Ack=251) acknowledging receipt of messages 2410-2412, the bilateral TCP state machine would update the TCP engine state as follows (which is the same state as in the receipt of MSG 2413 above):

|  |  |
|---|---|
| ExpectedSeqA | 11 |
| HighestAckB | 11 |
| ExpectedSeqB | 251 |
| HighestAckA | 251 |

Thus, in this example, the TAR does not detect the out-of-order receipt of messages 2411 and 2412 by the client 726.

FIG. 33 schematically depicts a situation in which an acknowledgement is received and forwarded by the TAR but is not received by the destination service 728. In this case, assume the TAR had received and forwarded messages 2410-2412 to the client 726, the client 726 had transmitted MSG 2413 to acknowledge receipt of messages 2410-2412, the TAR had received and forwarded MSG 2413 to the service 728, but the service 728 did not receive MSG 2413. The TAR would have the following TCP engine state (which is the same state as in the receipt of MSG 2413 above):

|  |  |
|---|---|
| ExpectedSeqA | 11 |
| HighestAckB | 11 |
| ExpectedSeqB | 251 |
| HighestAckA | 251 |

After a predetermined timeout period, the service 728 would retransmit messages 2410-2412, having received no acknowledgement for those messages. The bilateral TCP state machine would interpret the retransmitted packets as duplicate packets. In this case, the bilateral TCP state machine can infer that an error occurred on the service side of the TCP session, since the TAR had previously received and forwarded packets 2410-2412 and all of these packets had been acknowledged by the client. In this case, the bilateral TCP state machine will forward the packets and may increment a counter (e.g., an error counter or a specific "duplicate packet" counter) by three, to account for the three received retransmitted packets. The client 726 may then acknowledge receipt of the retransmitted packets, e.g., by transmitting MSG 3313=ACK (Lth=0; Seq=11; Ack=251) to acknowledge receipt of retransmitted messages 2410-2412. In one exemplary embodiment, the TCP engine state would not change throughout this retransmission process.

FIG. 34 schematically depicts a situation in which an out-of-window packet is received by the TAR. In this case, assume MSG 2410 and MSG 2411 did not reach the TAR such that the TAR receives MSG 2412. The bilateral TCP state machine can determine that at least one packet (MSG 2410 and MSG 2411 in this example) was missing, because the TAR would expect to receive sequence number 101 in the next message from the destination service 728 following MSG 2408 but MSG 2412 includes sequence number 201. Furthermore, the bilateral TCP state machine can infer that the error occurred on the service side of the TCP session. In certain exemplary embodiments, the bilateral TCP state machine determines whether MSG 2412 is within the advertised window size for the TCP session, e.g., by comparing the sequence number in MSG 2412 to the next expected sequence number (i.e., ExpectedSeqB), and only forwards MSG 2412 if it is within the advertised window size for the TCP session; in alternative embodiments, the bilateral TCP state machine may forward MSG 2412 unconditionally. In this example, it is assumed that MSG 2412 is outside of the advertised window size for the TCP session, in which case the bilateral TCP state machine may be configured to increment a counter (e.g., an error counter or a specific "out-of-window" counter) associated with the return path and update the sequence number information without forwarding MSG 2412.

It should be understood that the bilateral TCP state machine operates in substantially the same way for packets transmitted by the client to the destination service, e.g., using the received sequence number and the next expected sequence number (i.e., ExpectedSeqA) to determine whether an error condition occurred.

Figure 35:
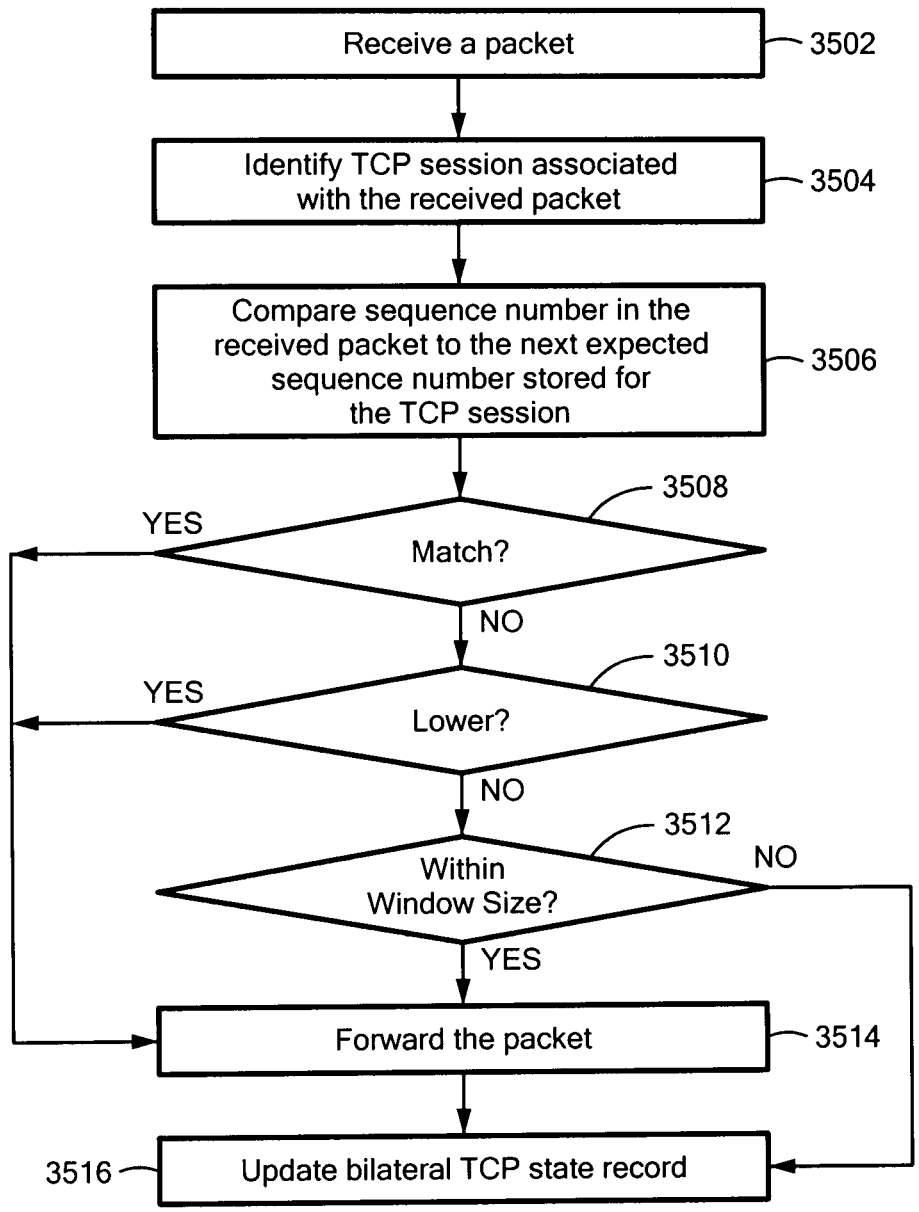
FIG. 35 is a flowchart schematically describing operation of the bilateral TCP state machine, in accordance with one exemplary embodiment.

FIG. 35 is a flowchart schematically describing operation of the bilateral TCP state machine, in accordance with one exemplary embodiment. In block 3502, the bilateral TCP state machine receives a packet. In block 3504, the bilateral TCP state machine identifies the TCP session associated with the received packet based on TCP session identification information in the received packet (e.g., a 5-tuple of information, for example, as discussed below). Among other things, identifying the TCP session associated with the received packet allows the bilateral TCP state machine to access the correct bilateral TCP state record in the database. In block 3506, the bilateral TCP state machine compares the sequence number in the received packet to the next expected sequence number stored for the TCP session (e.g., ExpectedSeqA for forward packets, ExpectedSeqB for return packets). If the sequence numbers match (YES in block 3508), then the bilateral TCP state machine forwards the packet, in block 3514, and updates the bilateral TCP state record, in block 3516 (e.g., by updating the next expected sequence number based on the length of the packet). If the sequence number in the received packet is lower than the next expected sequence number (YES in block 3510), then the bilateral TCP state machine forwards the packet, in block 3514, and updates the bilateral TCP state record, in block 3516 (e.g., by incrementing an appropriate error counter). If the sequence number in the received packet is greater than the next expected sequence number (NO in block 3510), then the bilateral TCP state machine determines whether the received packet is within the advertised window size for the TCP session, in block 3512. If the received packet is within the advertised window size for the TCP session (YES in block 3512), then the bilateral TCP state machine forwards the packet, in block 3514, and updates the bilateral TCP state record, in block 3516 (e.g., by incrementing an appropriate error counter and updating the next expected sequence number). If the received packet is not within the advertised window size for the TCP session (NO in block 3512), then the bilateral TCP state machine updates the bilateral TCP state record, in block 3516 (e.g., by incrementing an appropriate error counter and updating the next expected sequence number) without forwarding the packet.

FIG. 36 is a flowchart schematically describing the process of updating a bilateral TCP state record in block 3516 of FIG. 35, in accordance with one exemplary embodiment. In this exemplary embodiment, if the received packet was a forward packet, then the bilateral TCP state machine updates ExpectedSeqA, HighestAckA, and the Forward Counter(s) as follows: (1) if the sequence number (Seq) in the received packet is greater than or equal to the expected sequence number (ExpectedSeqA), then the bilateral TCP state machine sets ExpectedSeqA equal to the sum of the received sequence number (Seq) and the length of the packet (Lth); (2) if the acknowledgment number (Ack) in the received packet is greater than the previously received highest acknowledgment (HighestAckA), then the bilateral TCP state machine sets HighestAckA equal to the received acknowledgment number (Ack); and (3) if an error was detected, then the bilateral TCP state machine updates the appropriate Forward Counter(s) based on the error type. Alternatively, if the received packet was a return packet, then the bilateral TCP state machine updates ExpectedSeqB, HighestAckB, and the Return Counter(s) as follows: (1) if the sequence number (Seq) in the received packet is greater than or equal to the expected sequence number (ExpectedSeqB), then the bilateral TCP state machine sets ExpectedSeqB equal to the sum of the received sequence number (Seq) and the length of the packet (Lth); (2) if the acknowledgment number (Ack) in the received packet is greater than the previously received highest acknowledgment (HighestAckB), then the bilateral TCP state machine sets HighestAckB equal to the received acknowledgment number (Ack); and (3) if an error was detected, then the bilateral TCP state machine updates the appropriate Return Counter(s) based on the error type.

In certain exemplary embodiments, the bilateral TCP state machine may be implemented in a router having a service path and a forwarding path, as described above with reference to FIG. 5. In such embodiments, the bilateral TCP state machine is typically implemented substantially in the forwarding path, although the service path is typically involved with processing of the first packet of each new TCP session and, as part of such processing, typically establishes the forward and return flows for the bi-flow TCP session and also establishes the bilateral TCP state record for the TCP session in the shared memory. TCP session packets are processed by the bilateral TCP state machine as part of the packet forwarding processing. Thus, for example, when the TAR receives the first packet of a new TCP session (which can be detected by the forwarding path, e.g., when a 5-tuple of information associated with the packet does not match any existing TCP sessions, as described herein), the packet is redirected for processing by the service path and then redirected back to the forwarding path, which runs the bilateral TCP state machine as part of the processing of the forward and return flows (e.g., as part of the action chains associated with the flows).

As can be seen from the examples discussed above with reference to FIGS. 26-34, a TAR can determine the location of certain types of TCP session errors (e.g., client-side vs. service-side and/or forward path vs. return path). In certain exemplary embodiments, the TAR is configured to modify the bi-flow route of a TCP session if the number or rate of errors is above a predetermined threshold, based on the location of TCP session errors determined by the bilateral TCP state machine.

For example, with reference again to FIG. 7, assume that AIPR 2 714 determines that errors are occurring on the service-side of the TCP session and the errors are due to a problem with the communication link between AIPR 2 714 and Router 720. Then, AIPR 2 714 may modify the bi-flow route to bypass the problematic communication link by routing session packets via AIPR 3 718 and AIPR 4 722. Such modification of the bi-flow route may involve AIPR 2 714 selecting a new router interface for the TCP session (i.e., the interface to Router 712) and then modifying the flows associated with the TCP session to utilize the new router interface and propagate the modification to AIPR 3 718 and AIPR 4 722. Some exemplary embodiments of such flow modification are described below with reference to certain embodiments that use "stateful" routing as discussed herein.

FIG. 37 is a flowchart schematically describing a process for modifying a bi-flow route based on errors detected by the bilateral TCP state machine, in accordance with one exemplary embodiment. In block 3702, the router runs the bilateral TCP state machine for a bi-flow route associated with a TCP session. In block 3704, the router detects errors associated with the TCP session, e.g., based on statistics gathered using the bilateral TCP state machine. In block 3706, the router determines the location of the errors. In block 3708, the router determines if the number or rate of errors is above a predetermined threshold. If the number or rate of errors is above a predetermined threshold (YES in block 3710), then the router proceeds to modify the bi-flow route based on the location of the errors detected using the bilateral TCP state machine, in block 3712.

Additionally, or alternatively, the location of TCP session errors determined by the bilateral TCP state machine can be used to enhance routing decisions such as when running a routing protocol or when establishing a "stateful" routing session as discussed below. For example, the error location information can be used to update routing information in the routing table or forwarding information base (e.g., the weights or ranks associated with various routes), or a router can utilize the error location information more directly when selecting a route (e.g., prioritizing one route over another based on the error location information).

FIG. 38 is a flowchart schematically describing a process for enhancing routing decisions based on errors detected by the bilateral TCP state machine, in accordance with one exemplary embodiment. In block 3802, the router runs the bilateral TCP state machine for a bi-flow route associated with a TCP session. In block 3804, the router detects errors associated with the TCP session, e.g., based on statistics gathered using the bilateral TCP state machine. In block 3806, the router determines the location of the errors. In block 3808, the router may update the routing table based on the location of errors detected using the bilateral TCP state machine. In block 3810, the router may select a route based on the location of errors detected using the bilateral TCP state machine.

In certain exemplary embodiments, the bilateral TCP state machine additionally tracks the TCP flags in TCP packets to determine when a TCP session has been initiated, established and ended. Among other things, the bilateral TCP state machine can release resources (e.g., memory used for the TCP session) after determining that a TCP session has ended. Furthermore, the bilateral TCP state machine can maintain additional statistics regarding TCP sessions, such as, for example, the number of TCP sessions attempted, the number of failed TCP session attempts, the number of successful TCP session attempts, the duration of each established TCP session, and the average duration of established TCP sessions, to name but a few. Such statistical information can be used in a variety of ways, such as, for example, detecting communication errors (e.g., based on the number or frequency of attempted, failed, and successful TCP session) and network planning (e.g., updating routes and allocating network resources based on average length of established TCP sessions).

In certain exemplary embodiments, the bilateral TCP state machine utilizes timers to monitor the status of a TCP session. In one specific embodiment, upon receiving the initial packet for a TCP session from the source node (e.g., as indicated by a SYN flag), the bilateral TCP state machine starts a first timer that is set to expire if the TCP session is not established within a first predetermined amount of time. This first timer may be reset upon receiving additional TCP SYN packets for the session, which might occur, for example, if the initial packet does not reach the destination node or the reply from the destination node does not reach the source node. The bilateral TCP state machine can maintain statistical information including the number of session attempts and whether the TCP session was established or failed.

Assuming a TCP session is established, i.e., upon completion of the three-way TCP session establishment handshake (i.e., SYN/SYN-ACK/ACK) with the socket in the ESTABLISHED state, the bilateral TCP state machine may start a second timer that is set to expire if no packets are received for the TCP session within a second predetermined amount of time. This second timer may be reset each time a packet is received for the TCP session from either the source node or the destination node, which generally indicates that the TCP session is still active.

Typically, the first timer is of short duration (e.g., 10 seconds in one specific exemplary embodiment), since it is expected that a TCP session will be established quickly if at all, while the second timer is of longer duration (e.g., in one specific exemplary embodiment, defaults to two hours but is variable/programmable depending on the type of TCP session—for example, web traffic vs. email traffic—as determined using other information such as TCP port number or traffic analysis), since TCP session packets can be transmitted intermittently with idle periods between packets, and it is desirable to avoid having the bilateral TCP state machine release its resources for the TCP session and consider the TCP session to be closed while the TCP session is actually still active. It should be noted that the first timer and the second timer may be implemented using separate timers or a single programmable timer.

Figure 40:
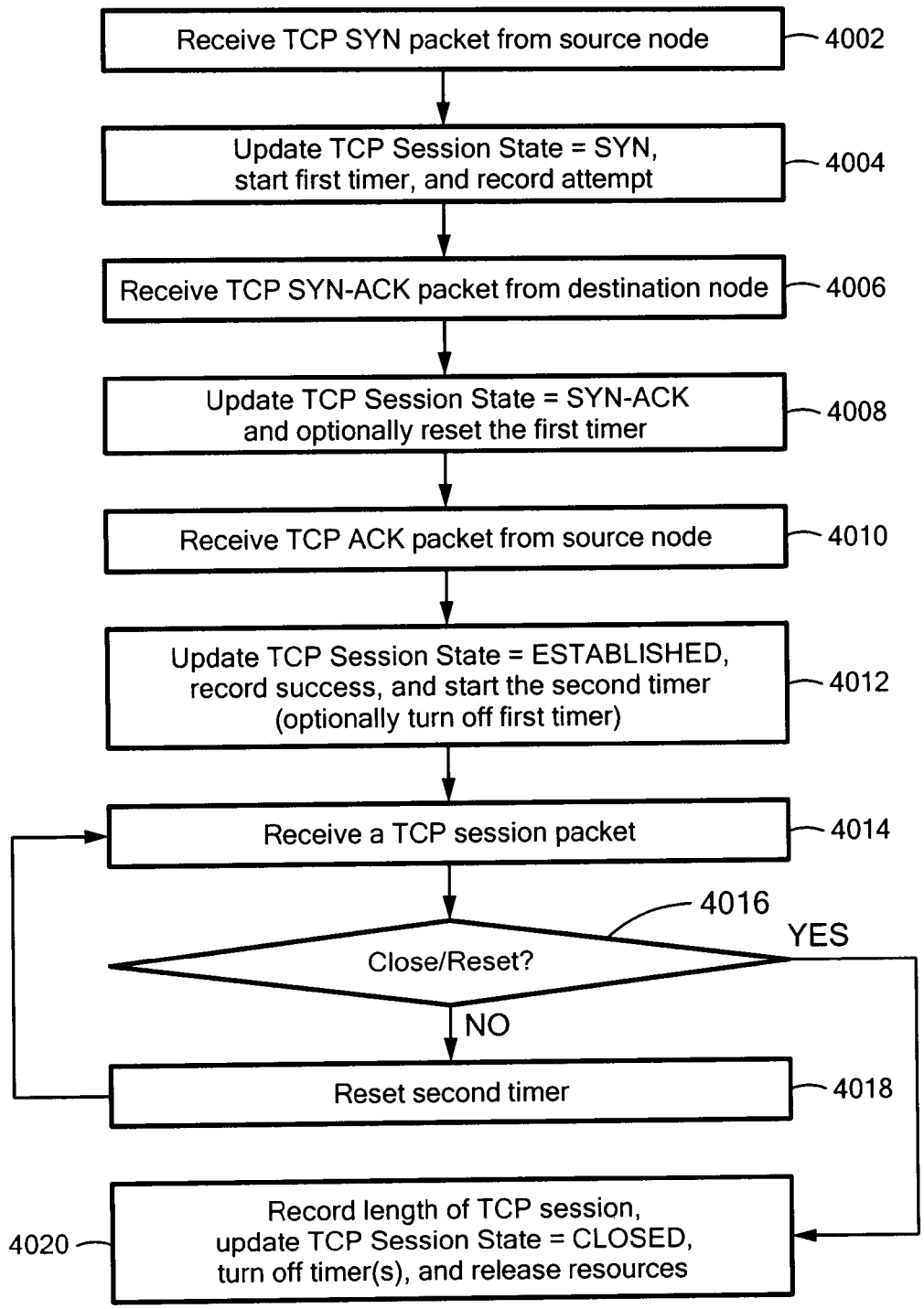
FIG. 40 is a flowchart for monitoring the state of a TCP session by the bilateral TCP state machine, in accordance with one exemplary embodiment.

FIG. 40 is a flowchart for monitoring the state of a TCP session by the bilateral TCP state machine, in accordance with one exemplary embodiment. Upon receiving a TCP SYN packet from the source node, in block 4002, the bilateral TCP state machine updates the TCP Session State to a "SYN" state, starts the first timer, and records the attempt to initiate a TCP session, in block 4004.

Assuming a TCP SYN-ACK packet is received from destination node prior to expiration of the first timer, in block 4006, the bilateral TCP state machine updates the TCP Session State to a "SYN-ACK" state and optionally resets the first timer (e.g., the first timer can be set to account for the expected time it takes to establish a TCP connection or can be set to account for the expected time to receive the next session establishment packet), in block 4008.

Assuming a TCP ACK packet is received from the source node prior to expiration of the first timer, in block 4010, the bilateral TCP state machine updates the TCP Session State to an "ESTABLISHED" state, record the successful establishment of the TCP session, and starts the second timer (and optionally turns off first timer), in block 4012.

Thereafter, each time a TCP session packet is received from either the source node or the destination node prior to expiration of the second timer, in block 4014, the bilateral TCP state machine checks the FIN and RST flags in the TCP session packet to determine if the TCP session is being closed or reset, in block 4016. If TCP session is not being closed or reset (NO in block 4016), then the bilateral TCP state machine resets the second timer, in block 4018, and recycles back to block 4014 to await another TCP session packet. If, however, the TCP session is being closed or reset (YES in block 4016), then the bilateral TCP state machine records the length of the TCP session, updates the TCP Session State to a "CLOSED" state, turns off the timer(s), and eventually releases resources associated with the TCP session.

Figure 41:
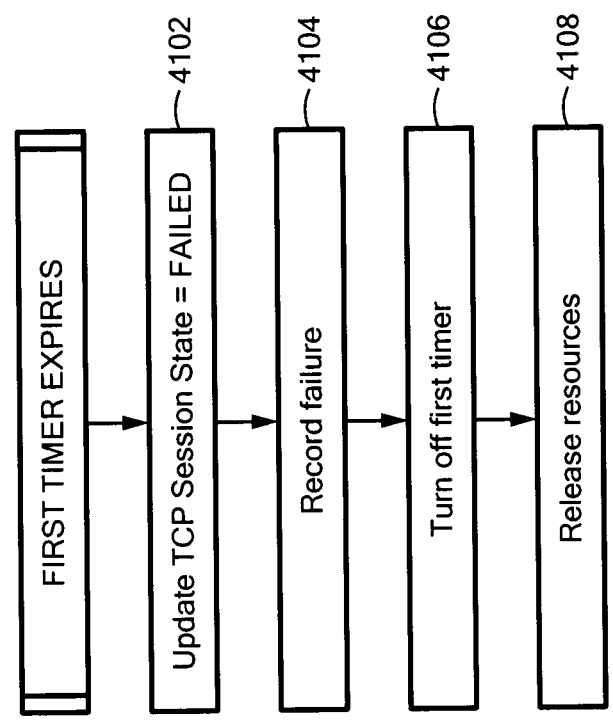
FIG. 41 is a flowchart for a failed TCP session attempt as part of monitoring the state of a TCP session by the bilateral TCP state machine, in accordance with one exemplary embodiment.
Figure 43:
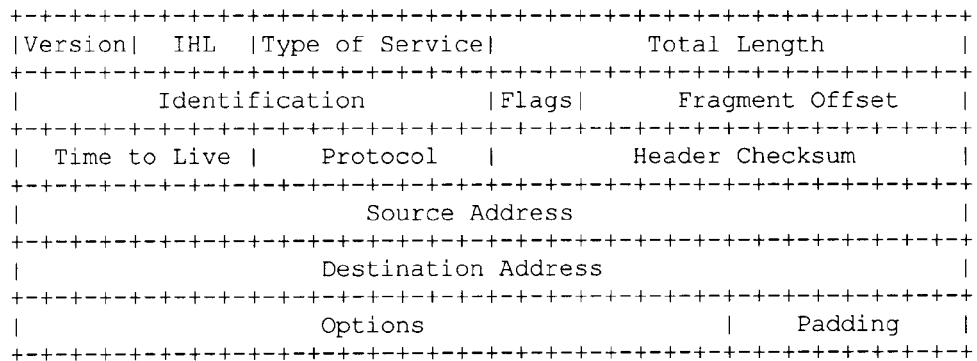
FIG. 43 shows the general header format for IPv4 datagrams.
Figure 44:
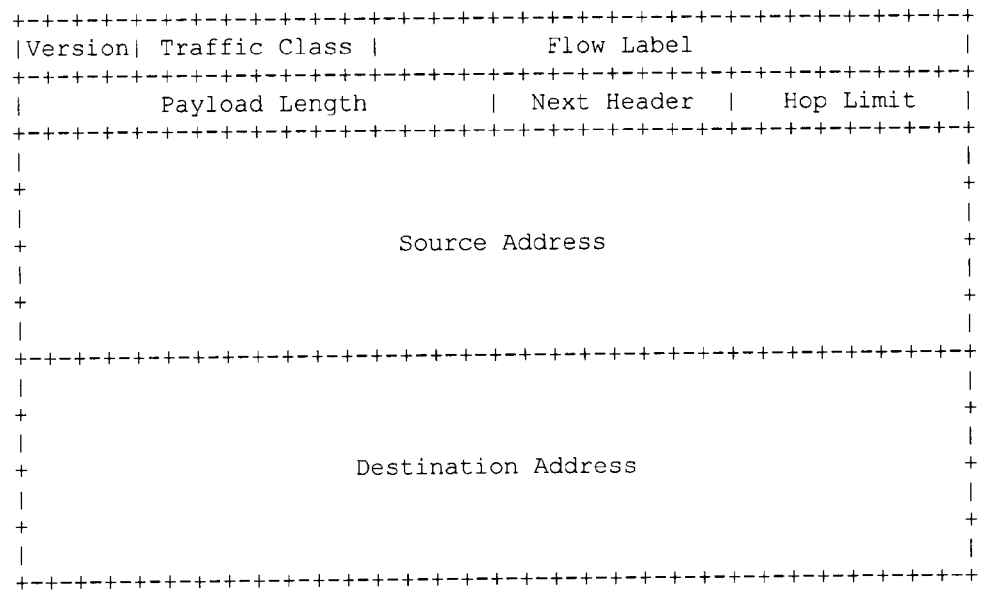
FIG. 44 shows the general header format for IPv6 datagrams.
Figure 45:
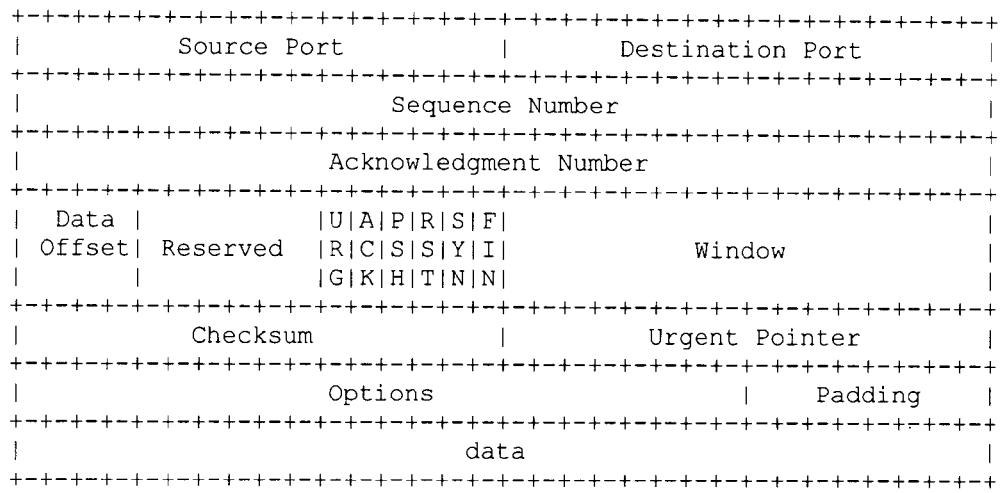
FIG. 45 shows the general format of a TCP segment.
Figure 46:
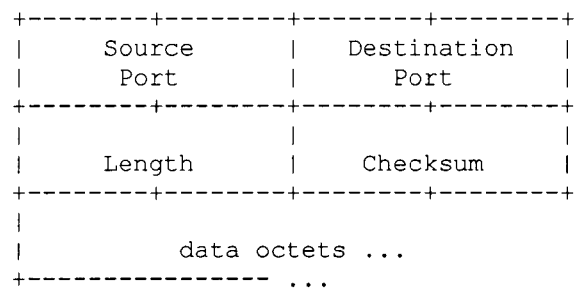
FIG. 46 shows the general format of a UDP segment.

FIG. 41 is a flowchart for a failed TCP session attempt as part of monitoring the state of a TCP session by the bilateral TCP state machine, in accordance with one exemplary embodiment. Assuming the first timer expires prior to establishment of the TCP session, the bilateral TCP state machine updates the TCP Session State to a "FAILED" state in block 4102, records the failed attempt to establish the TCP session in block 4104, turns off the first timer in block 4106, and eventually releases resources associated with the TCP session in block 4108.

Figure 42:
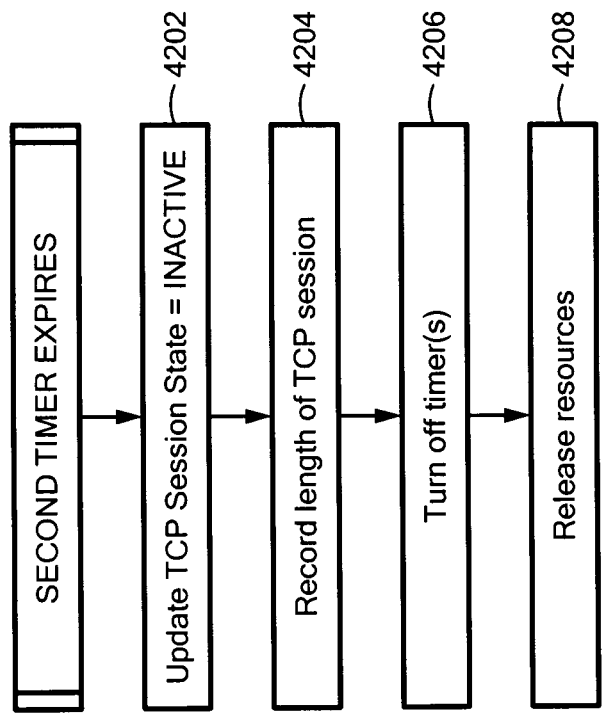
FIG. 42 is a flowchart for an inactive TCP session as part of monitoring the state of a TCP session by the bilateral TCP state machine, in accordance with one exemplary embodiment.

FIG. 42 is a flowchart for an inactive TCP session as part of monitoring the state of a TCP session by the bilateral TCP state machine, in accordance with one exemplary embodiment. Assuming the second timer expires prior to closing of the TCP session, the bilateral TCP state machine updates the TCP Session State to an "INACTIVE" state in block 4202, records the length of the TCP session in block 4204, turns off the second timer in block 4206, and eventually releases resources associated with the TCP session in block 4208.

In this way, the bilateral TCP state machine can track such things as the number of attempted TCP sessions, the number of successful TCP sessions, the number of failed TCP sessions, the reason a TCP session terminated (e.g., explicitly or due to inactivity), and the duration of individual TCP sessions, and the average duration of TCP sessions, to name but a few. The duration of a TCP session can be monitored in various ways, such as by using a separate timer that is turned on when the session is established and turned off when the session ends, or by using timestamps (e.g., recording the time at which the TCP session was established and recording the time at which the TCP session ended).

It should be noted that the TCP session states and statistics referred to in FIGS. 40-42 are for example only; embodiments are not limited to these or to any particular types of TCP session states and statistics. It also should be noted that the TCP session state and statistics may be recorded in the TCP Session State and TCP Session Statistics in the bilateral TCP state record described above with reference to FIG. 25.

The statistical information obtained from monitoring the status of TCP sessions can be used in combination with statistical information obtained from monitoring TCP sequence numbers, as discussed above, to provide a wide range of advanced network diagnostics and management functions including route management, bandwidth management, and quality of service management for TCP sessions.

Stateful Routing

In certain exemplary embodiments, AIPRs are specially configured to perform "stateful" routing on packets associated with a given session between a source node and destination node, as discussed herein. For convenience, such routers may be referred to as waypoint routers. Stateful routing also is discussed in various related patent applications, which are incorporated by reference above.

Generally speaking, stateful routing is a way to ensure that subsequent packets of a session follow the same path as the lead packet of the session through a particular set of AIPRs in the forward and/or reverse direction. The lead packet of the session may pass through one or more AIPRs, either due to traditional routing, or by having each successive AIPR through which the lead packet passes expressly select a next hop AIPR if possible.

The AIPRs through which the lead packet passes insert special metadata into the lead packet and optionally also into return packets as needed to allow each AIPR on the path to determine whether there is a prior AIPR on the path and whether there is a next hop AIPR on the path. In order to force session packets to traverse the same set of AIPRs, each successive AIPR typically changes the destination address field in each session packet to be the address of the next hop AIPR and changes the source address field in each session packet to be its own network address. The last AIPR prior to the destination node then typically will change the source and destination address fields back to the original source and destination addresses used by the source node. In this way, session packets can be forwarded, hop by hop, from the source node through the set of AIPRs to the destination node, and vice versa.

Certain aspects of one exemplary stateful routing embodiment are now described with reference to FIGS. 7-15.

Figure 8:
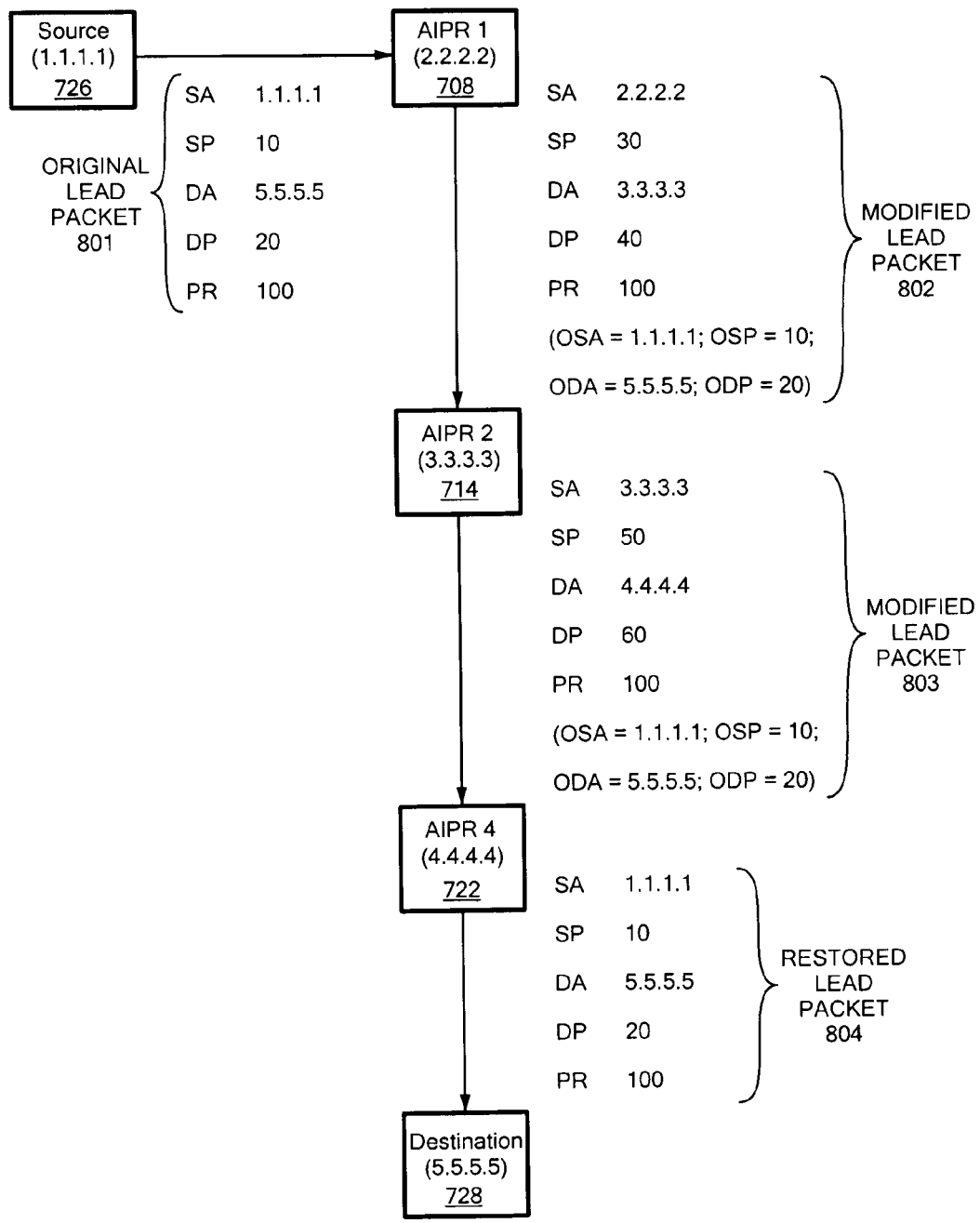
FIG. 8 schematically shows an example of lead packet processing from a source node to a destination node for stateful routing, in accordance with one exemplary embodiment.
Figure 12:
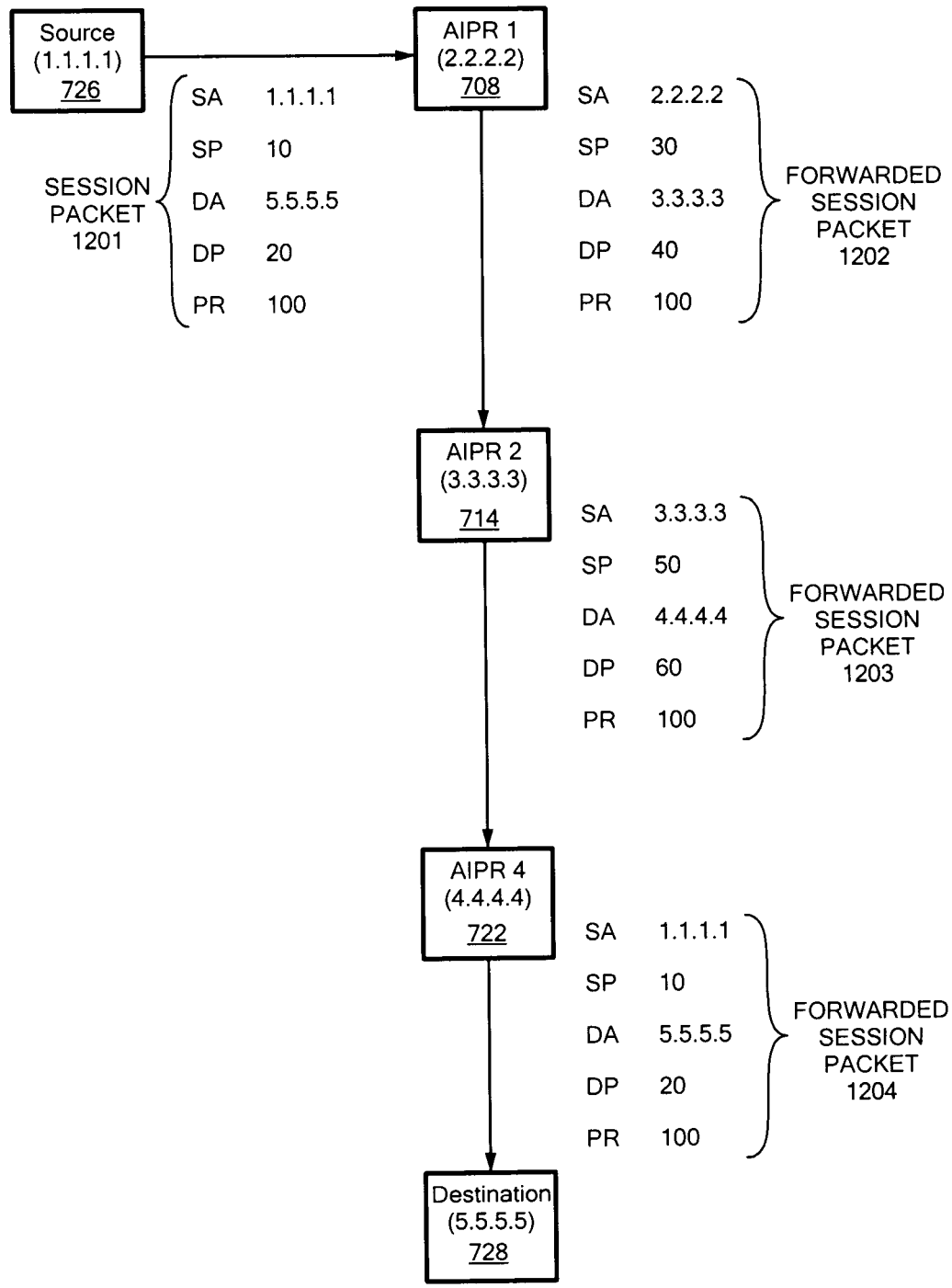
FIG. 12 is a schematic diagram providing an example of session packet processing for an example packet sent from the source device to the destination device through the AIPR devices for the session established in FIG. 8, in accordance with one exemplary embodiment.
Figure 13:
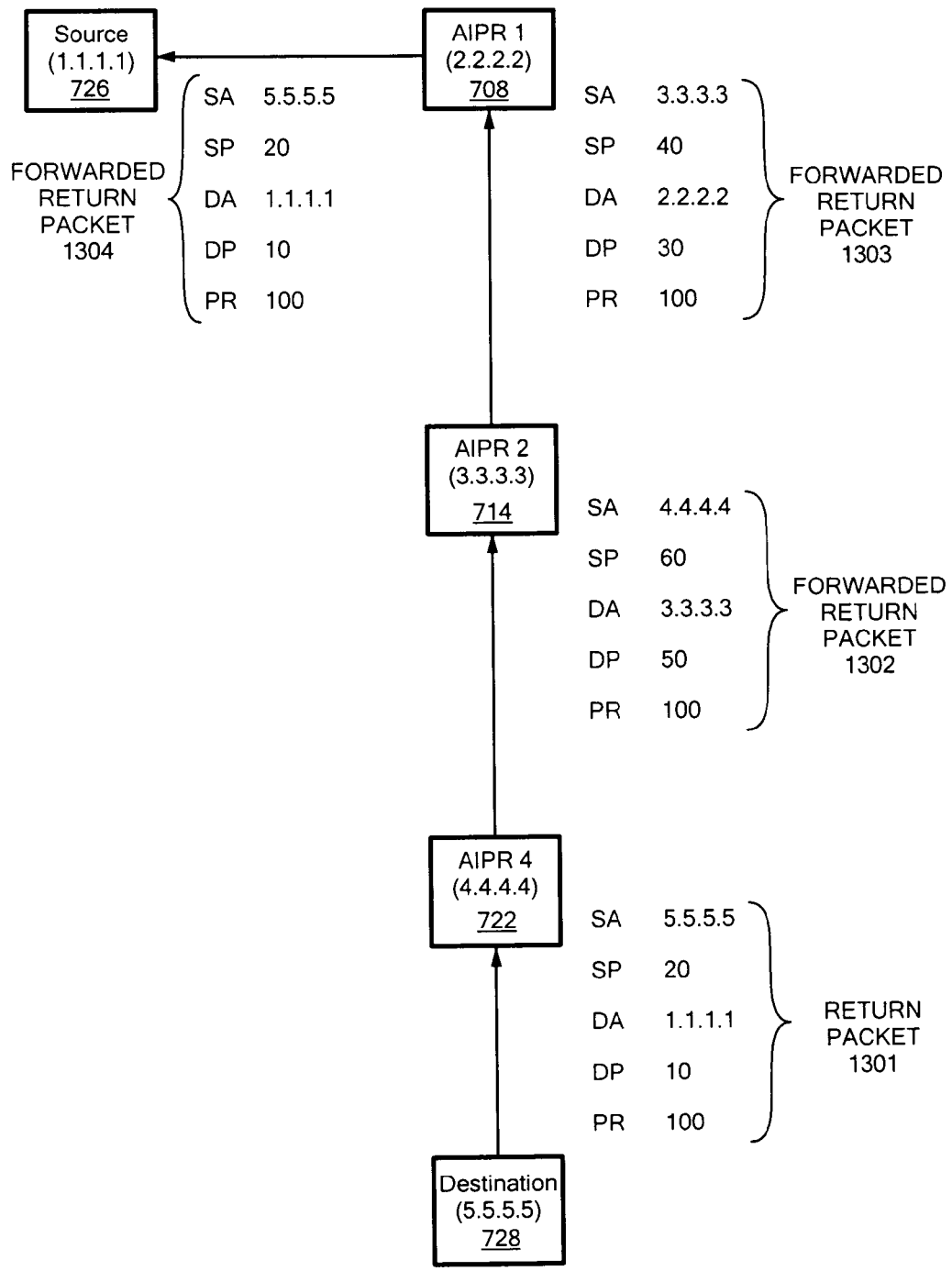
FIG. 13 is a schematic diagram providing an example of session packet processing for a return packet sent by the destination device to the source device through the AIPR devices for the session established in FIG. 8, in accordance with one exemplary embodiment.

FIG. 8 schematically shows an example of lead packet processing from a source node to a destination node for stateful routing, in accordance with certain illustrative embodiments of the invention. FIG. 9 is a schematic diagram showing session-related data associated with AIPR 1 708 based on the lead packet processing of FIG. 8. FIG. 10 is a schematic diagram showing session-related data associated with AIPR 2 714 based on the lead packet processing of FIG. 8. FIG. 11 is a schematic diagram showing session-related data associated with AIPR 4 722 based on the lead packet processing of FIG. 8. FIG. 12 is a schematic diagram providing an example of session packet processing for an example packet sent from the source device to the destination device through the AIPR devices for the session established in FIG. 8. FIG. 13 is a schematic diagram providing an example of session packet processing for a return packet sent by the destination device to the source device through the AIPR devices for the session established in FIG. 8.

In this example, each AIPR is presumed to have a priori knowledge of the other AIPRs in the network in relation to the network/next hop associations contained in its routing information base, such that, for example, a particular AIPR knows not only the outgoing interface for a particular destination network address, but also the next waypoint AIPR (if any) to use for that destination network address. In this example, the nodes communicate using TCP/IP-based messages, and the metadata inserted into the lead packet may be conveyed, for example, as a TCP Option field or added to the TCP packet as payload data. In various alternative embodiments, the nodes may communicate using other protocols, and the method in which the metadata is conveyed in the lead packet would be protocol-specific.

As noted above, in stateful routing, all forward packets associated with a particular session are made to follow the same path through a given set of AIPRs on their way from the source client node 726 to the destination service node 728. In a similar manner, all return packets associated with the session typically, but not necessarily, are made to traverse the same set of AIPRs in reverse order on their way from the destination service node 728 to the source client node 726 (which may be referred to herein as "bi-flow").

Assume the source client node 726 initiates a session with the destination service node 728. For example, the source client node 726 may request a web page, and the destination service node 728 may include a web server. The source client node 726 may, for example, be part of a first local area network (LAN) (not shown) within a first corporation, and the LAN may be connected to the telecommunications carrier network 700 via a gateway router 730 operated by the corporation. Similarly, the destination service node 728 may be operated by a second corporation, and it may be part of a second LAN (not shown) coupled to the network 706 of the second ISP via a gateway router 732 operated by the second corporation.

To establish a communication session between the source client node 726 and the destination service node 728, the source client node 726 typically transmits a lead packet for the session, which generally initiates a communication exchange between the source client node 726 and the destination service node 728. This allows subsequent session-related packets to be exchanged by the two nodes. The type of lead packet will depend on the protocol(s) being used by the source and destination nodes. For the example used herein, TCP/IP-based communications are assumed, in which case the lead packet may include a TCP SYN message carried in an IP datagram. This lead packet typically will include a source address equal to the IP address of the source client node 726 (i.e., 1.1.1.1), a destination address equal to the IP address of the destination service node 728 (i.e., 5.5.5.5), and various types of Transport Layer information including a source port number, a destination port number, and a protocol identifier. For convenience, the combination of source address, source port number, destination address, destination port number, and protocol identifier in a packet is referred to hereinafter collectively as a "5-tuple" and is used in various exemplary embodiments as a session identifier for "stateful" routing, as discussed below.

FIG. 8 shows an exemplary lead packet 801 transmitted by the source client node 726. In this example, the lead packet 801 includes a source address (SA) of 1.1.1.1; a source port number (SP) of 10; a destination address (DA) of 5.5.5.5; a destination port number (DP) of 20; and a protocol identifier (PR) of 100.

The lead packet 801 may be routed naturally and therefore, depending on various factors, the lead packet may or may not reach an AIPR on its way from the source node to the destination node. Thus, waypoints are not necessarily predetermined before the lead packet is transmitted by the source node. However, in some exemplary embodiments, a particular AIPR (e.g., AIPR 1 708 in FIG. 7) may be configured as the default router/gateway for the source node, in which case the lead packet is virtually assured to reach an AIPR.

Assume the lead packet 801 reaches AIPR 1 708 before it reaches network 702, 704 or 706. AIPR 1 708 automatically identifies the lead packet as being an initial packet of a new session (in this example, referred to as "Session X"). AIPR 1 708 may use various techniques to identify the beginning of a session, as discussed in more detail below. For example, for a TCP/IP-based session, AIPR 1 708 may identify the beginning of the session based on the 5-tuple of information in the lead packet. AIPR 1 708 also determines that the lead packet 801 is not a modified lead packet containing session metadata. Therefore, AIPR 1 708 determines that it is the first waypoint AIPR for Session X and stores an indicator so that it will process subsequent packets associated with the session as the first waypoint AIPR. This is represented in FIG. 9 as "Flag=First Waypoint AIPR."

AIPR 1 708 stores 5-tuple information from the received lead packet 801 as the Return Association (RA) for Session X. This is represented in FIG. 9 as "Return Association" information. For convenience, the source address, source port number, destination address, destination port number, and protocol identifier information associated with a particular session is referred to in FIGS. 9-11 as session source address (SSA), session source port number (SSP), session destination address (SDA), session destination port number (SDP), and session protocol identifier (SPR), respectively.

To forward a modified lead packet (i.e., Modified Lead Packet 802) over an outgoing interface, AIPR 1 708 accesses its routing information base to look up routing information based on the original destination address of 5.5.5.5 (e.g., outgoing interface and next node information). In this example, AIPR 1 708 identifies AIPR 2 714 as the next waypoint AIPR based on the original destination address of 5.5.5.5. In certain exemplary embodiments, AIPR 1 708 then assigns a source port number and a destination port number for outgoing packets associated with the session to permit more than 65,535 sessions to be supported concurrently (in this example, source port number 30 and destination port number 40) and stores the resulting 5-tuple as the Forward Association (FA) for outgoing packets associated with the session. This is shown in FIG. 9 as "Forward Association" information. Implicitly, the network address of AIPR 1 708 (i.e., 2.2.2.2) will be the source address for session-related packets forwarded over an outgoing interface.

To force the lead packet to reach next waypoint AIPR 2 714 (as opposed to being randomly routed by the routers in the network), AIPR 1 708 modifies the destination address in the lead packet to the IP address of AIPR 2 714 (i.e., 3.3.3.3). In this example, AIPR 1 708 also modifies the source address in the lead packet to its own IP address (i.e., 2.2.2.2) so that AIPR 2 714 can route return packets back to AIPR 1 708. Also in this example, AIPR 1 708 modifies the source port and destination port fields to the assigned values. Importantly, AIPR 1 708 also modifies the lead packet to include a section of metadata including the original source address, destination address, source port, destination port, and protocol identifier from the original lead packet 801. As discussed below, this metadata is propagated to each successive AIPR on the path to allow each AIPR to maintain session information and also to allow the final AIPR on the path to restore the lead packet to its original form. AIPR 1 708 establishes and maintains various session parameters so that it can identify subsequent session packets and forward such session packets to AIPR 2 714 for stateful routing. AIPR 1 708 then transmits the modified lead packet 802 into the network toward AIPR 2 714 via the selected outgoing interface. In certain exemplary embodiments, AIPR 1 708 may establish a flow that associates the session with the incoming interface over which the lead packet 801 was received and the outgoing interface over which the modified lead packet 802 is forwarded.

FIG. 8 shows an exemplary modified lead packet 802 transmitted by AIPR 1 708. The modified lead packet 802 includes the network address of AIPR 1 708 (i.e., 2.2.2.2) as the source address (SA), the assigned session source port number (SSP) of 30 as the source port number (SP), the network address of AIPR 2 714 (i.e., 3.3.3.3) as the destination address (DA), the assigned session destination port number (SDP) of 40 as the destination port number (DP), and the received protocol identifier of 100 as the protocol identifier (PR). AIPR 1 708 also includes the original source address (OSA) of 1.1.1.1, the original source port number (OSP) of 10, the original destination address (ODA) of 5.5.5.5, and the original destination port number (ODP) of 20 from the original lead packet 801 as metadata in the modified lead packet 802. This information is shown in parentheses to represent that it is metadata that has been added to the lead packet.

In this example, AIPR 1 708 forwards the modified lead packet 802 to AIPR 2 714 via router 710. The modified lead packet 802 packet may traverse other routers between AIPR 1 708 and AIPR 2 714. Because the destination address in the modified lead packet 802 is set to the IP address of AIPR 2 714 (i.e., 3.3.3.3), the modified lead packet should eventually reach AIPR 2 714.

AIPR 2 714 automatically identifies the modified lead packet 802 as being an initial packet of the session, but also identifies that AIPR 2 714 is not the first waypoint for the session because the modified lead packet already contains metadata inserted by AIPR 1 708. AIPR 2 714 therefore becomes the second waypoint along the path the lead packet eventually follows.

AIPR 2 714 stores 5-tuple information from the received modified lead packet 802 as the Return Association (RA) for Session X. This is represented in FIG. 10 as "Return Association" information.

To forward a modified lead packet (i.e., Modified Lead Packet 803) over an outgoing interface, AIPR 2 714 accesses its routing information base to look up routing information based on the original destination address of 5.5.5.5 (e.g., outgoing interface and next node information). In this example, AIPR 2 714 identifies two possible next hop AIPRs for the lead packet to reach destination service node 728, namely AIPR 3 718 and AIPR 4 722. Assume AIPR 2 714 selects AIPR 4 722 as the next hop AIPR for the path. AIPR 2 714 therefore determines that it is an intermediate waypoint AIPR for the session, i.e., it is neither the first waypoint AIPR nor the last waypoint AIPR. AIPR 2 714 stores an indicator so that it will process subsequent packets associated with the session as an intermediate waypoint AIPR. This is represented in FIG. 10 as "Flag=Intermediate Waypoint AIPR." In this example, AIPR 2 714 then assigns a source port number and a destination port number for outgoing packets associated with the session (in this example, source port number 50 and destination port number 60) and stores the resulting 5-tuple as the Forward Association (FA) for outgoing packets associated with the session. This is shown in FIG. 10 as "Forward Association" information. Implicitly, the network address of AIPR 2 714 (i.e., 3.3.3.3) will be the source address for session-related packets forwarded over an outgoing interface.

To force the modified lead packet 803 to reach AIPR 4 722 (as opposed to being randomly routed by the routers in the network), AIPR 2 714 modifies the destination address in the lead packet to the IP address of AIPR 4 722 (i.e., 4.4.4.4). In this example, AIPR 2 714 also modifies the source address in the lead packet to its own IP address (i.e., 3.3.3.3) so that AIPR 4 722 can route return packets back to AIPR 2 714. Also in this example, AIPR 2 714 modifies the source port and destination port fields to the assigned values. Importantly, AIPR 2 714 leaves the section of metadata including the original source address, destination address, source port, destination port, and protocol identifier. AIPR 2 714 establishes and maintains various session parameters so that it can identify subsequent session packets and forward such session packets to AIPR 4 722 for stateful routing. AIPR 2 714 then transmits the modified lead packet 803 into the network toward AIPR 4 722 via the selected outgoing interface. In certain exemplary embodiments, AIPR 2 714 may establish a flow that associates the session with the incoming interface over which the modified lead packet 802 was received and the outgoing interface over which the modified lead packet 803 is forwarded.

FIG. 8 shows an exemplary modified lead packet 803 transmitted by AIPR 2 714. The modified lead packet 803 includes the network address of AIPR 2 714 (i.e., 3.3.3.3) as the source address (SA), the assigned session source port number (SSP) of 50 as the source port number (SP), the network address of AIPR 4 722 (i.e., 4.4.4.4) as the destination address (DA), the assigned session destination port number (SDP) of 60 as the destination port number (DP), and the received protocol identifier of 100 as the protocol identifier (PR). AIPR 2 714 also includes the original source address (OSA) of 1.1.1.1, the original source port number (OSP) of 10, the original destination address (ODA) of 5.5.5.5, and the original destination port number (ODP) of 20 from the modified lead packet 802 as metadata in the modified lead packet 803. This information is shown in parentheses to represent that it is metadata that has been added to the lead packet.

In this example, AIPR 2 714 forwards the modified lead packet 803 to AIPR 4 722 via router 720. The modified lead packet 803 may traverse other routers between AIPR 2 714 and AIPR 4 722. Because the destination address in the modified lead packet 803 is set to the IP address of AIPR 4 722 (i.e., 4.4.4.4), the modified lead packet should eventually reach AIPR 4 722.

AIPR 4 722 automatically identifies the modified lead packet as being an initial packet of the session, but also identifies that AIPR 4 722 is not the first waypoint for the session because the modified lead packet already contains metadata inserted by AIPR 2 714. AIPR 4 722 therefore becomes the third waypoint along the path the lead packet eventually follows.

AIPR 4 722 stores 5-tuple information from the received modified lead packet 803 as the Return Association (RA) for Session X. This is represented in FIG. 11 as "Return Association" information.

To forward a modified lead packet (i.e., Modified Lead Packet 804) over an outgoing interface, AIPR 4 722 accesses its routing information base to look up routing information based on the original destination address of 5.5.5.5 (e.g., outgoing interface and next node information). AIPR 4 722 determines that there is no next hop AIPR for the lead packet to reach destination service node 728. AIPR 4 722 therefore determines that it is the last waypoint AIPR on the path. AIPR 4 722 stores an indicator so that it will process subsequent packets associated with the session as a final waypoint AIPR. This is represented in FIG. 11 as "Flag=Final Waypoint AIPR." AIPR 4 722 then stores the original 5-tuple information as the Forward Association (FA) for outgoing packets associated with the session. This is shown in FIG. 11 as "Forward Association" information.

As the last waypoint AIPR, AIPR 4 722 performs special processing on the lead packet. Specifically, AIPR 4 722 removes the metadata section from the lead packet and restores the source address, destination address, source port, destination port, and protocol identifier fields in the lead packet back to the original values transmitted by source client node 726, which it obtains from the metadata in modified lead packet 803. AIPR 4 722 establishes and maintains various session parameters so that it can identify subsequent session packets and forward such session packets to destination service node 728 for stateful routing. AIPR 4 722 then transmits the restored lead packet 804 into the network toward destination service node 728 via the selected outgoing interface. In certain exemplary embodiments, AIPR 4 722 may establish a flow that associates the session with the incoming interface over which the lead packet 803 was received and the outgoing interface over which the restored lead packet 804 is forwarded.

FIG. 8 shows an exemplary restored lead packet 804 transmitted by AIPR 4 722. The restored lead packet 804 includes the original source address of 1.1.1.1 as the source address (SA), the original source port number (SSP) of 10 as the source port number (SP), the original destination device address of 5.5.5.5 as the destination address (DA), the original destination port number of 20 as the destination port number (DP), and the received/original protocol identifier of 100 as the protocol identifier (PR).

In this example, AIPR 4 722 forwards the restored lead packet 804 to destination service node 728 via routers 724 and 732. The restored lead packet 804 may traverse other routers between AIPR 4 722 and destination service node 728. Because the destination address in the restored lead packet 804 is set to the IP address of destination service node 728 (i.e., 5.5.5.5), the restored lead packet should eventually reach destination service node 728.

Thus, as a lead packet of the session traverses the internet when the session is established, each AIPR (waypoint) that the packet traverses records information that eventually enables the waypoint to be able to identify its immediately previous waypoint and its immediately next waypoint, with respect to the session.

As discussed above, error location information produced from the bilateral TCP state machine can be used to enhance routing decisions when establishing a "stateful" routing session. For example, with reference again to FIG. 7, each AIPR may run the bilateral TCP state machine for various TCP sessions on an ongoing basis and may store error location information produced therefrom. When establishing the stateful route for the new TCP session using the lead packet processing discussed above with reference to FIG. 8, each AIPR may use the error location information when selecting the next waypoint AIPR for the stateful routing session. For example, AIPR 2 714 may use error location information to choose between AIPR 3 718 and AIPR 4 722 as the next waypoint AIPR for the stateful routing session. In the example discussed above with reference to FIG. 8, AIPR 2 714 selected AIPR 4 722 as the next waypoint AIPR, although AIPR 2 714 alternatively may select AIPR 3 718 or some other AIPR (not shown) as the next waypoint if bilateral TCP session monitoring by AIPR 2 714 had detected excessive errors associated with TCP sessions routed through Router 720.

It should be noted that each node can store information for multiple sessions. For example, FIGS. 9-11 schematically show information stored for additional Sessions Y and Z. As for Session X, the information stored for Sessions Y and Z includes Return Association (RA) information, Forward Association (FA) information, and a Flag. It should be noted that the AIPRs may have different roles in different sessions, e.g., whereas AIPR 1 708 is the first waypoint AIPR and AIPR 4 722 is the final waypoint AIPR in the example of FIG. 8, AIPR 1 708 could be the final waypoint AIPR for Session Y and could be an intermediate waypoint AIPR for Session Z.

After the lead packet has been processed and the session-related information has been established by the waypoint AIPRs hop-by-hop from the source client node 726 to the destination service node 728, additional session packets may be exchanged between the source client node 726 and the destination service node 728 to establish an end-to-end communication session between the source client node 726 and the destination service node 728.

FIG. 12 is a schematic diagram providing an example of session packet processing for an example session packet sent from the source client node 726 to the destination service node 728 through the AIPR devices for the session established in FIG. 8. Here, the source client node 726 sends a session packet 1201 having a source address (SA) of 1.1.1.1; a source port number of 10 (i.e., the original SP); a destination address of 5.5.5.5; a destination port number of 20 (i.e., the original DP); and a protocol identifier of 100. Because AIPR 1 708 is the default router/gateway for source 1.1.1.1, the session packet 1201 is routed by the network to AIPR 1 708.

Based on the 5-tuple information contained in the received session packet 1201 and the Return Association stored in memory by AIPR 1 708, AIPR 1 708 is able to determine that the received session packet 1201 is associated with Session X. AIPR 1 708 forwards the packet according to the Forward Association information associated with Session X as shown in FIG. 9. Specifically, the forwarded session packet 1202 transmitted by AIPR 1 708 has a source address (SA) of 2.2.2.2; a source port number of 30 (i.e., the SSP assigned by AIPR 1 708); a destination address of 3.3.3.3; a destination port number of 40 (i.e., the SDP assigned by AIPR 1 708); and a protocol identifier of 100.

Since the forwarded session packet 1202 has a destination address of 3.3.3.3 (i.e., the network address of AIPR 2 714), the session packet 1202 is routed to AIPR 2 714. Based on the 5-tuple information contained in the received session packet 1202 and the Return Association stored in memory by AIPR 2 714, AIPR 2 714 is able to determine that the received session packet 1202 is associated with Session X. AIPR 2 714 forwards the packet according to the Forward Association information associated with Session X as shown in FIG. 10. Specifically, the forwarded session packet 1203 transmitted by AIPR 2 714 has a source address (SA) of 3.3.3.3; a source port number of 50 (i.e., the SSP assigned by AIPR 2 714); a destination address of 4.4.4.4; a destination port number of 60 (i.e., the SDP assigned by AIPR 2 714); and a protocol identifier of 100.

Since the forwarded session packet 1203 has a destination address of 4.4.4.4 (i.e., the network address of AIPR 4 722), the session packet 1203 is routed to AIPR 4 722. Based on the 5-tuple information contained in the received session packet 1203 and the Return Association stored in memory by AIPR 4 722, AIPR 4 722 is able to determine that the received session packet 1203 is associated with Session X. AIPR 4 722 forwards the packet according to the Forward Association information associated with Session X as shown in FIG. 11. Specifically, the forwarded session packet 1204 transmitted by AIPR 4 722 has a source address (SA) of 1.1.1.1 (i.e., the original source address); a source port number of 10 (i.e., the original SP); a destination address of 5.5.5.5 (i.e., the original destination address); a destination port number of 20 (i.e., the original DP); and a protocol identifier of 100.

Since the forwarded session packet 1204 has a destination address of 5.5.5.5 (i.e., the network address of destination service node 728), the forwarded session packet 1204 is routed to the destination service node 728, which processes the packet.

FIG. 13 is a schematic diagram providing an example of session packet processing for a return packet sent by the destination device to the source device through the AIPR devices for the session established in FIG. 8.

Here, the destination service node 728 sends a return packet 1301 having a source address (SA) of 5.5.5.5; a source port number of 20 (i.e., the original DP); a destination address of 1.1.1.1 (i.e., the original source address); a destination port number of 10 (i.e., the original SP); and a protocol identifier of 100. In this example, AIPR 4 722 is the default router/gateway for destination 5.5.5.5, so the return packet 1301 is routed by the network to AIPR 4 722.

Based on the 5-tuple information contained in the received return packet 1301 and the Forward Association stored in memory by AIPR 4 722, AIPR 4 722 is able to determine that the received return packet 1301 is associated with Session X. AIPR 4 722 forwards the packet according to the Return Association information associated with Session X as shown in FIG. 11. Specifically, the forwarded return packet 1302 transmitted by AIPR 4 722 has a source address (SA) of 4.4.4.4; a source port number of 60 (i.e., the SDP assigned by AIPR 2 714); a destination address of 3.3.3.3; a destination port number of 50 (i.e., the SSP assigned by AIPR 2 714); and a protocol identifier of 100.

Since the forwarded return packet 1302 has a destination address of 3.3.3.3 (i.e., the network address of AIPR 2 714), the return packet 1302 is routed to AIPR 2 714. Based on the 5-tuple information contained in the received return packet 1302 and the Forward Association stored in memory by AIPR 2 714, AIPR 2 714 is able to determine that the received return packet 1302 is associated with Session X. AIPR 2 714 forwards the packet according to the Return Association information associated with Session X as shown in FIG. 10. Specifically, the forwarded return packet 1303 transmitted by AIPR 2 714 has a source address (SA) of 3.3.3.3; a source port number of 40 (i.e., the SDP assigned by AIPR 1 708); a destination address of 2.2.2.2; a destination port number of 30 (i.e., the SSP assigned by AIPR 1 708); and a protocol identifier of 100.

Since the forwarded return packet 1303 has a destination address of 2.2.2.2 (i.e., the network address of AIPR 1 708), the return packet 1303 is routed to AIPR 1 708. Based on the 5-tuple information contained in the received return packet 1303 and the Forward Association stored in memory by AIPR 1 708, AIPR 1 708 is able to determine that the received return packet 1303 is associated with Session X. AIPR 1 708 forwards the packet according to the Return Association information associated with Session X as shown in FIG. 9. Specifically, the forwarded return packet 1304 transmitted by AIPR 1 708 has a source address (SA) of 5.5.5.5; a source port number of 20 (i.e., the original DP); a destination address of 1.1.1.1; a destination port number of 10 (i.e., the original SP); and a protocol identifier of 100.

Since the forwarded return packet 1304 has a destination address of 1.1.1.1 (i.e., the network address of source client node 726), the forwarded return packet 1304 is routed to the source client node 726, which processes the packet.

It should be noted that an AIPR can assign source and destination port numbers in any of a variety of ways (e.g., sequentially, non-sequentially, randomly).

Figure 14:
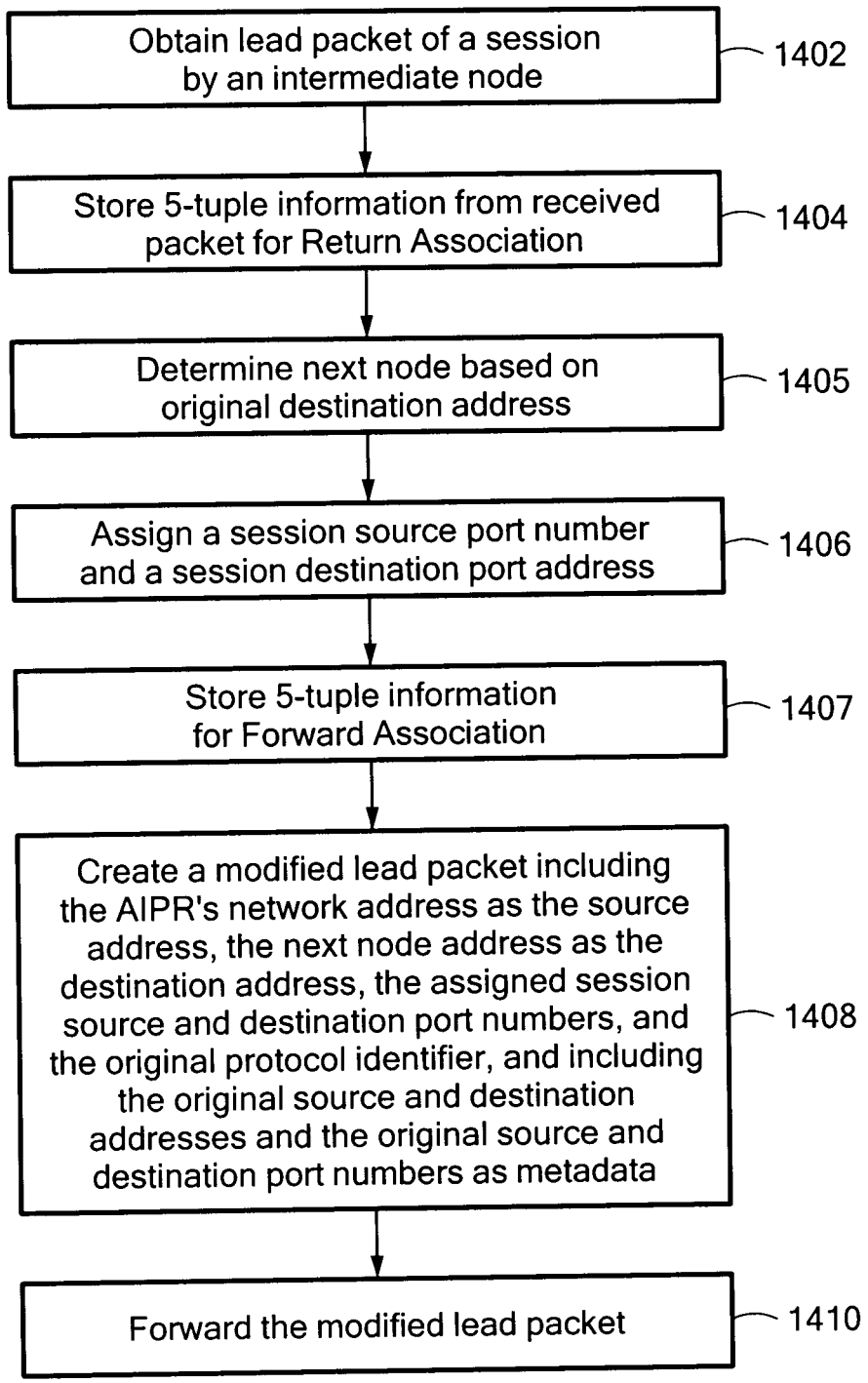
FIG. 14 is a flowchart schematically illustrating some lead packet processing operations performed by an AIPR, in accordance with one exemplary embodiment.

FIG. 14 is a flowchart schematically illustrating some lead packet processing operations performed by an intermediate AIPR, in accordance with one exemplary embodiment.

In block 1402, an intermediate AIPR obtains the lead packet of a session. In block 1404, the AIPR stores 5-tuple information from the received packet as Return Association information for the session.

In block 1405, the AIPR determines the next waypoint AIPR based on the original destination address. This typically involves accessing the AIPR's routing information base from which the AIPR can determine the outgoing port and next waypoint AIPR (if any) for the original destination address.

In block 1406, the AIPR assigns a session source port number and a session destination port number.

In block 1407, the AIPR stores 5-tuple information for a Forward Association. The Forward Association includes the AIPR's network address as the source address, the next node address as the destination address, the assigned session source and destination port numbers, and the original protocol identifier.

In block 1408, the AIPR creates a modified lead packet including the AIPR network address as the source address, the next node address as the destination address, the assigned session source and destination port numbers, and the original protocol identifier, and also including the original source and destination addresses and the original source and destination port numbers as metadata. In block 1410, the AIPR forwards the modified lead packet.

It should be noted that the flowchart of FIG. 14 applies to intermediate AIPRs other than the final waypoint AIPR, which performs slightly different processing as discussed above (e.g., the final waypoint AIPR uses the original source address, original source port number, original destination address, and original destination port number contained in the metadata of the received packet for its Forward Association information).

Figure 15:
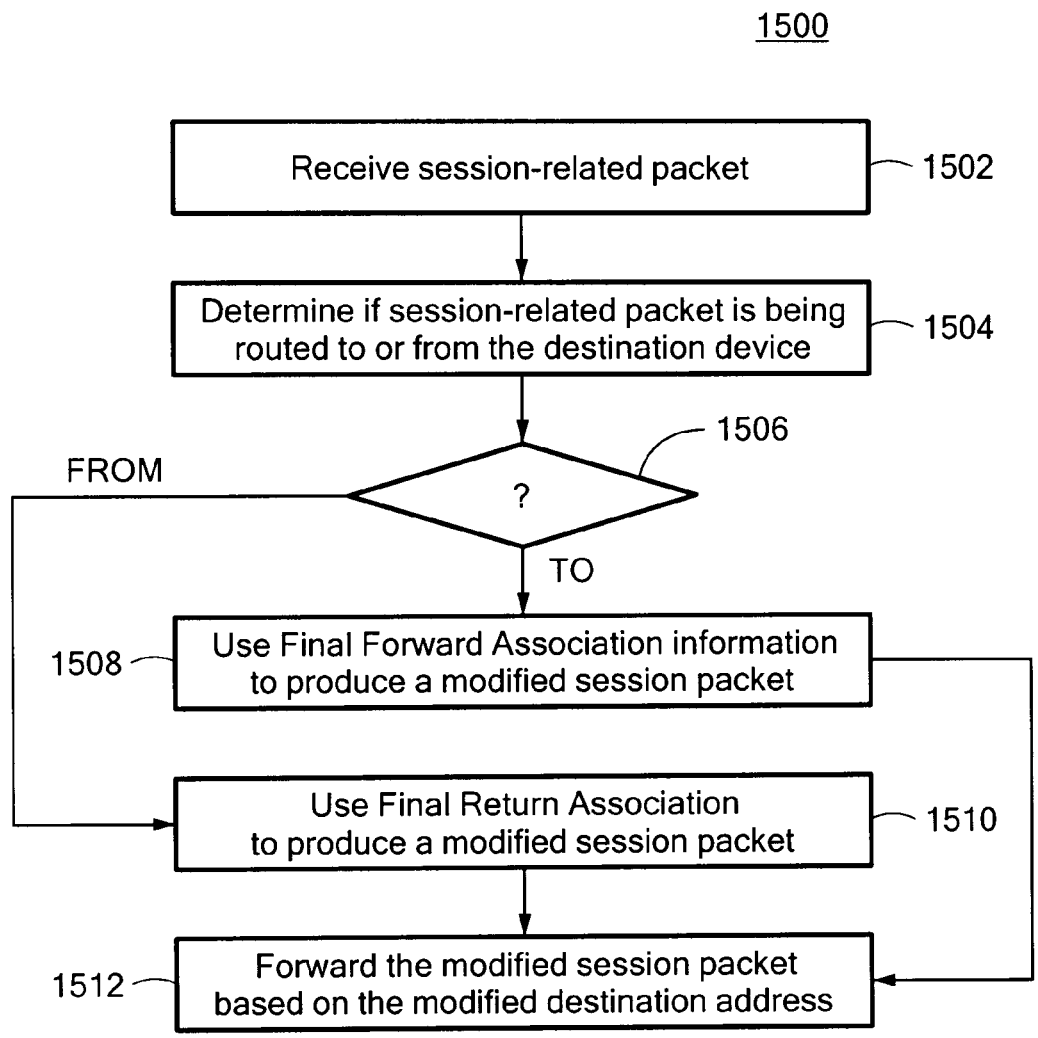
FIG. 15 is a flowchart schematically illustrating some session packet processing operations performed by an AIPR, in accordance with one exemplary embodiment.

FIG. 15 is a flowchart 1500 schematically illustrating some packet processing operations performed by an AIPR, in accordance with one exemplary embodiment. In block 1502, the AIPR receives a session-related packet. In block 1504, the AIPR determines if the session-related packet is being routed to or from the destination device. If the session-related packet is being routed to the destination device in block 1506, then the AIPR uses the Final Forward Association information to produce a modified session packet, in block 1508. If, however, the session-related packet is being routed from the destination device in block 1506, then the AIPR uses the Final Return Association information to produce a modified session packet, in block 1510. In either case, the AIPR forwards the modified session packet based on the modified destination address, in block 1512.

Stateful routing can be accomplished without presuming that each AIPR has a priori knowledge of the other AIPRs in the network in relation to the network/next hop associations contained in its routing information base. For example, a particular AIPR may not know the next waypoint AIPR (if any) to use for the destination network address. Rather, each waypoint AIPR can determine the presence or absence of a next waypoint AIPR after forwarding a modified lead packet.

By way of example with reference to FIG. 8, assuming AIPR 1 708 receives the original lead packet 801 from source client node 726, AIPR 1 708 identifies the lead packet 801 as the lead packet for a new session as discussed above, and also determines that the lead packet 801 is not a modified lead packet containing session metadata. Therefore, AIPR 1 708 determines that it is the first waypoint AIPR for the session. AIPR 1 708 stores information from the received lead packet 801, such as the source address, the source port number, the destination port number, and the protocol identifier.

Since AIPR 1 708 is the first waypoint AIPR, AIPR 1 708 is able to determine that future session-related packets received from the source client node 726 will have a source address (SA) of 1.1.1.1; a source port number of 10; a destination address of 5.5.5.5; a destination port number of 20; and a protocol identifier of 100.

To forward a modified lead packet, AIPR 1 708 does not know whether or not there is a next hop AIPR through which the modified lead packet will traverse. Therefore, rather than changing both the source address field and the destination address field in the lead packet, AIPR 1 708 may change just the source address field to be the network address of AIPR 1 708 (i.e., 2.2.2.2) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 1 708 may include the following information:

| | | |
|---|---|---|
| SA | 2.2.2.2 | |
| SP | 10 | |
| DA | 5.5.5.5 | |
| DP | 20 | |
| PR | 100 | |
| SSP | 30 | (session source port number assigned by AIPR 1 708) |
| SDP | 40 | (session destination port number assigned by AIPR 1 708) |

In this way, the modified lead packet transmitted by AIPR 1 708 will be routed based on the destination address of 5.5.5.5 and therefore may or may not traverse another AIPR on its way to destination service node 728. At this point, AIPR 1 708 does not know the destination address that will be used for session-related packets forwarded over an outgoing interface (since AIPR 1 708 does not determine until later whether or not it is the final waypoint AIPR between the source client node 726 and the destination service node 728).

Assume that the modified lead packet transmitted by AIPR 1 708 reaches AIPR 2 714. AIPR 2 714 identifies the modified lead packet as a lead packet for a new session as discussed above, and also determines that the modified lead packet is a modified lead packet containing session metadata. Therefore, AIPR 2 714 determines that it is not the first waypoint AIPR for the session. At this time, AIPR 2 714 is unable to determine whether or not it is the final waypoint AIPR for the session. AIPR 2 714 stores information from the received modified lead packet, such as the source address, the source port number, the destination port number, and the protocol identifier.

Since AIPR 2 714 is not the first waypoint AIPR, AIPR 2 714 is able to determine that future session-related packets received from AIPR 1 708 will have a source address (SA) of 2.2.2.2; a source port number of 30 (i.e., the SSP assigned by AIPR 1 708); destination address of 3.3.3.3; a destination port number of 40 (i.e., the SDP assigned by AIPR 1 708); and a protocol identifier of 100.

To forward a modified lead packet, AIPR 2 714 does not know whether or not there is a next hop AIPR through which the modified lead packet will traverse. Therefore, rather than changing both the source address field and the destination address field in the lead packet, AIPR 2 714 may change just the source address field to be the network address of AIPR 2 714 (i.e., 3.3.3.3) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 2 714 may include the following information:

| | | |
|---|---|---|
| SA | 3.3.3.3 | |
| SP | 10 | |
| DA | 5.5.5.5 | |
| DP | 20 | |
| PR | 100 | |
| SSP | 50 | (session source port number assigned by AIPR 2 714) |
| SDP | 60 | (session destination port number assigned by AIPR 2 714) |

In this way, the modified lead packet transmitted by AIPR 2 714 will be routed based on the destination address of 5.5.5.5 and therefore may or may not traverse another AIPR on its way to destination service node 728. At this point, AIPR 2 714 does not know the destination address that will be used for session-related packets forwarded over an outgoing interface (since AIPR 2 714 does not determine until later whether or not it is the final waypoint AIPR between the source client node 726 and the destination service node 728).

At some point, AIPR 2 714 identifies itself to AIPR 1 708 as a waypoint AIPR for the session (e.g., upon receipt of the modified lead packet from AIPR 1 708 or in a return packet associated with the session). This allows AIPR 1 708 to determine that it is not the final waypoint AIPR and therefore also allows AIPR 1 708 to determine the forward association parameters to use for forwarding session-related packets, i.e., AIPR 1 708 is able to determine that future session-related packets sent to AIPR 2 714 will have a source address (SA) of 2.2.2.2; a source port number of 30 (i.e., the SSP assigned by AIPR 1 708); destination address of 3.3.3.3; a destination port number of 40 (i.e., the SDP assigned by AIPR 1 708); and a protocol identifier of 100.

Assume that the modified lead packet transmitted by AIPR 2 714 reaches AIPR 4 722. AIPR 4 722 identifies the modified lead packet as a lead packet for a new session as discussed above, and also determines that the modified lead packet is a modified lead packet containing session metadata. Therefore, AIPR 4 722 determines that it is not the first waypoint AIPR for the session. At this time, AIPR 4 722 is unable to determine whether or not it is the final waypoint AIPR for the session. AIPR 4 722 stores information from the received modified lead packet, such as the source address, the source port number, the destination port number, and the protocol identifier.

Since AIPR 4 722 is not the first waypoint AIPR, AIPR 4 722 is able to determine that future session-related packets received from AIPR 2 714 will have a source address (SA) of 3.3.3.3; a source port number of 50 (i.e., the SSP assigned by AIPR 2 714); destination address of 4.4.4.4; a destination port number of 60 (i.e., the SDP assigned by AIPR 2 714); and a protocol identifier of 100.

To forward a modified lead packet, AIPR 4 722 does not know whether or not there is a next hop AIPR through which the modified lead packet will traverse. Therefore, rather than changing both the source address field and the destination address field in the lead packet, AIPR 4 722 may change just the source address field to be the network address of AIPR 4 722 (i.e., 4.4.4.4) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 4 722 may include the following information:

| | | |
|---|---|---|
| SA | 4.4.4.4 | |
| SP | 10 | |
| DA | 5.5.5.5 | |
| DP | 20 | |
| PR | 100 | |
| SSP | 70 | (session source port number assigned by AIPR 4 722) |
| SDP | 80 | (session destination port number assigned by AIPR 4 722) |

In this way, the modified lead packet transmitted by AIPR 4 722 will be routed based on the destination address of 5.5.5.5 and therefore may or may not traverse another AIPR on its way to destination service node 728. At this point, AIPR 4 722 does not know the destination address that will be used for session-related packets forwarded over an outgoing interface (since AIPR 4 722 does not determine until later whether or not it is the final waypoint AIPR between the source client node 726 and the destination service node 728).

At some point, AIPR 4 722 identifies itself to AIPR 2 714 as a waypoint AIPR for the session (e.g., upon receipt of the modified lead packet from AIPR 2 714 or in a return packet associated with the session). This allows AIPR 2 714 to determine that it is not the final waypoint AIPR and therefore also allows AIPR 2 714 to determine the forward association parameters to use for forwarding session-related packets, i.e., AIPR 2 714 is able to determine that future session-related packets sent to AIPR 4 722 will have a source address (SA) of 3.3.3.3; a source port number of 50 (i.e., the SSP assigned by AIPR 2 714); destination address of 4.4.4.4; a destination port number of 60 (i.e., the SDP assigned by AIPR 2 714); and a protocol identifier of 100.

Assume that the modified lead packet transmitted by AIPR 4 722 reaches the destination service node 728, which processes the modified lead packet without reference to the session metadata contained in the packet. Typically, this includes the destination device sending a reply packet back toward the source client node 726.

Since AIPR 4 722 receives a packet from the destination service node 728, as opposed to another waypoint AIPR, AIPR 4 722 is able to determine that it is the final waypoint AIPR and therefore also is able to determine the forward association parameters to use for forwarding session-related packets, i.e., AIPR 4 722 is able to determine that future session-related packets sent to the destination service node 728 will have a source address (SA) of 4.4.4.4; a source port number of 10 (i.e., the original SP); a destination address of 5.5.5.5; a destination port number of 20 (i.e., the original DP); and a protocol identifier of 100.

After the lead packet has been processed and the session-related information has been established by the waypoint AIPRs hop-by-hop from the source client node 726 to the destination service node 728, additional packets may be exchanged between the source client node 726 and the destination service node 728 in order to establish an end-to-end communication session between the source client node 726 and the destination service node 728.

Lead Packet Identification

As noted above, a waypoint should be able to identify a lead packet of a session. Various techniques may be used to identify lead packets. Some of these techniques are protocol-specific. For example, a TCP session is initiated according to a well-known three-part handshake involving a SYN packet, a SYN-ACK packet and an ACK packet. By statefully following packet exchanges between pairs of nodes, a waypoint can identify a beginning of a session and, in many cases, an end of the session. For example, a TCP session may be ended by including a FIN flag in a packet and having the other node send an ACK, or by simply including an RST flag in a packet. Because each waypoint stores information about each session, such as the source/destination network address and port number pairs, the waypoint can identify the session with which each received packet is associated. The waypoint can follow the protocol state of each session by monitoring the messages and flags, such as SYN and FIN, sent by the endpoints of the session and storing state information about each session in its database.

It should be noted that a SYN packet may be re-transmitted—each SYN packet does not necessarily initiate a separate session. However, the waypoint can differentiate between SYN packets that initiate a session and re-transmitted SYN packets based on, for example, the response packets.

Where a protocol does not define a packet sequence to end a session, the waypoint may use a timer. After a predetermined amount of time, during which no packet is handled for a session, the waypoint may assume the session is ended. Such a timeout period may also be applied to sessions using protocols that define end sequences.

The following table describes exemplary techniques for identifying the beginning and end of a session, according to various protocols. Similar techniques may be developed for other protocols, based on the definitions of the protocols.

| Protocol | Destination Port | Technique for Start/End Determination |
|---|---|---|
| TCP | Any | Detect start on the first SYN packet from a new address/port unique within the TCP protocol's guard time between address/port reuse. Following the TCP state machine to determine an end (FIN exchange, RST, or guard timeout). |

| Protocol | Destination Port | Technique for Start/End Determination |
|---|---|---|
| UDP-TFTP | 69 | Trap on the first RRQ or WRQ message to define a new session, trap on an undersized DAT packet for an end of session. |
| UDP-SNMP | 161, 162 | Trap on the message type, including GetRequest, SetRequest, GetNextRequest, GetBulkRequest, InformRequest for a start of session, and monitor the Response for end of session. For SNMP traps, port 162 is used, and the flow of data generally travels in the "reverse" direction. |
| UDP-SYSLOG | 514 | A single message protocol, thus each message is a start of session, and end of session. |
| UDP-RTP | Any | RTP has a unique header structure, which can be reviewed/analyzed to identify a start of a session. This is not always accurate, but if used in combination with a guard timer on the exact same five-tuple address, it should work well enough. The end of session is detected through a guard timer on the five-tuple session, or a major change in the RTP header. |
| UDP-RTCP | Any | RTCP also has a unique header, which can be reviewed, analyzed, and harvested for analytics. Each RTCP packet is sent periodically and can be considered a "start of session" with the corresponding RTCP response ending the session. This provides a very high quality way of getting analytics for RTCP at a network middle point, without using a Session Border Controller. |
| UDP-DNS (Nameserver) | 53 | Each DNS query is a single UDP message and response. By establishing a forward session (and subsequent backward session) the Augmented router gets the entire transaction. This allows analytics to be gathered and manipulations that are appropriate at the Augmented router. |
| UDP-NTP | 123 | Each DNS query/response is a full session. So, each query is a start, and each response is an end. |

Figure 16:
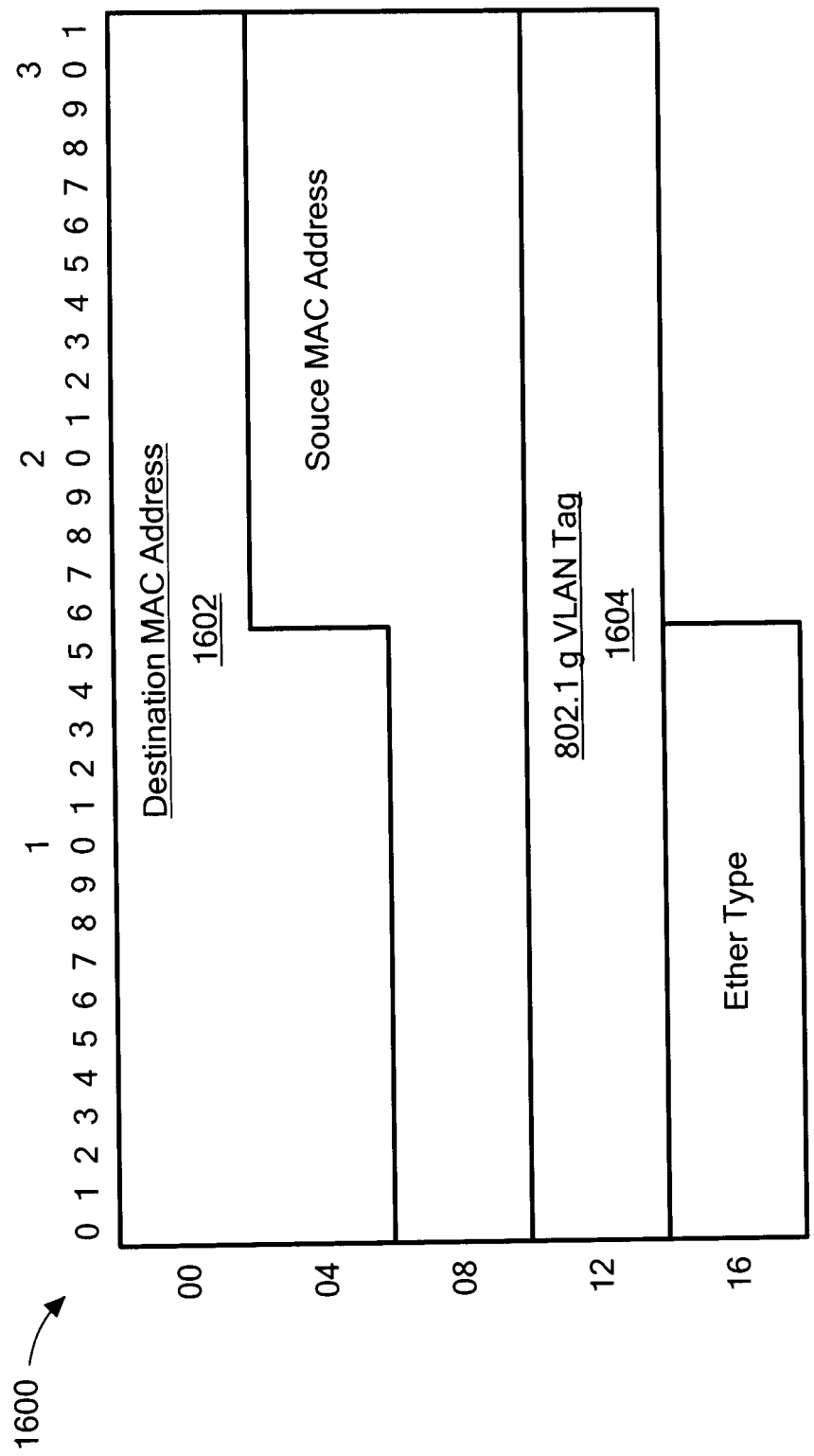
FIG. 16 schematically shows a layout of an Ethernet header, identifying fields used for identifying a beginning of a session, in accordance with one exemplary embodiment.

FIG. 16 is a schematic layout of an Ethernet header 1600, including a Destination MAC Address 1602 and an 802.1q VLAN Tag 1604.

Figure 17:
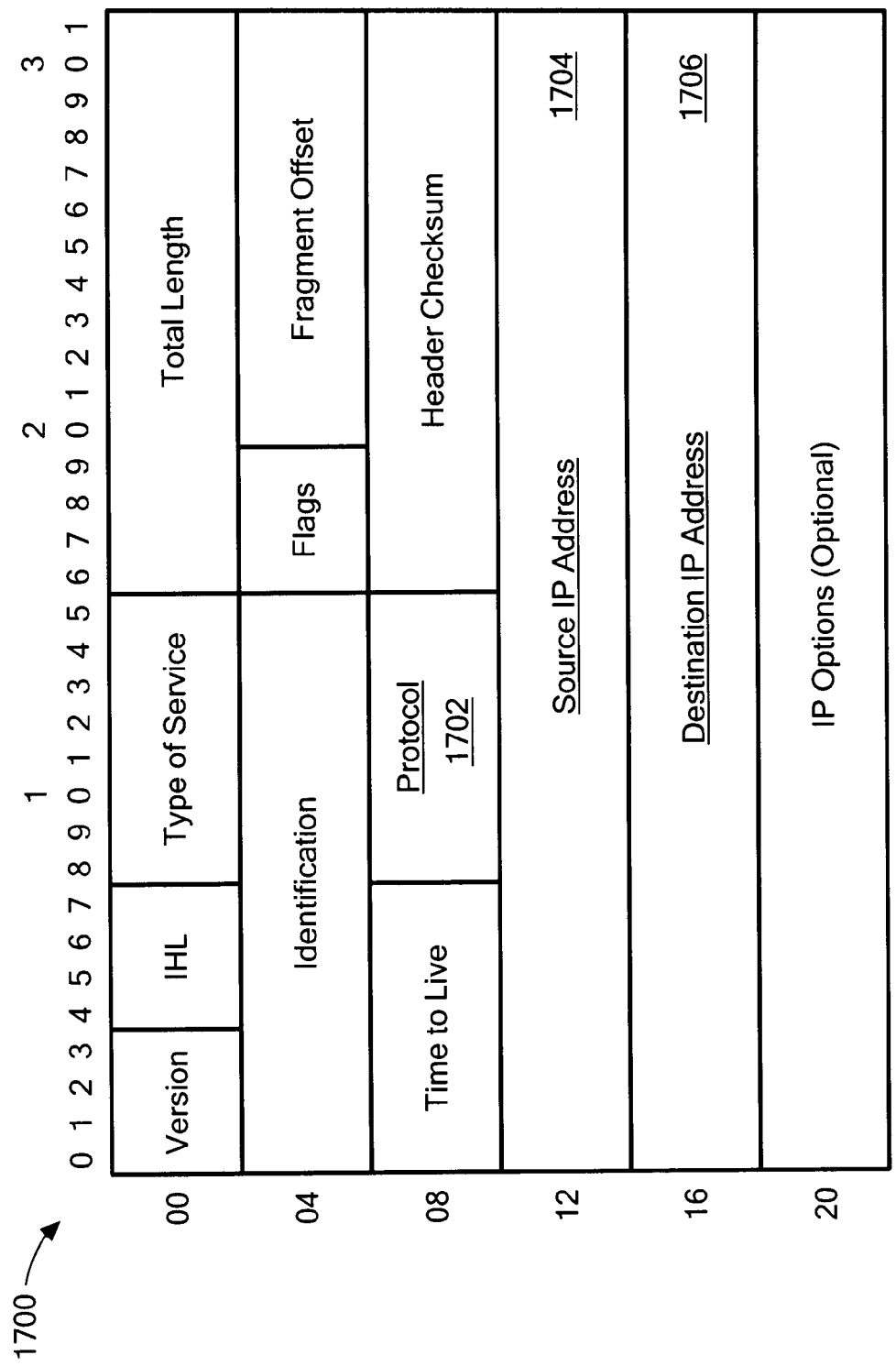
FIG. 17 schematically shows a layout of an IP header, identifying fields used for identifying a beginning of a session, in accordance with one exemplary embodiment.

FIG. 17 is a schematic layout of an IPv4 header 1700, including a Protocol field 1702, a Source IP Address 1704 and a Destination IP Address 1706. There are two commonly-used versions of IP, namely IP version 4 ("IPv4") and IP version 6 ("IPv6"). IPv4 is described in IETF RFC 791, which is hereby incorporated herein by reference in its entirety. IPv6 is described in IETF RFC 2460, which is hereby incorporated herein by reference in its entirety. The main purpose of both versions is to provide unique global computer addressing to ensure that communicating devices can identify one another. One of the main distinctions between IPv4 and IPv6 is that IPv4 uses 32-bit IP addresses, whereas IPv6 utilizes 128 bit IP addresses. In addition, IPv6 can support larger datagram sizes.

Figure 18:
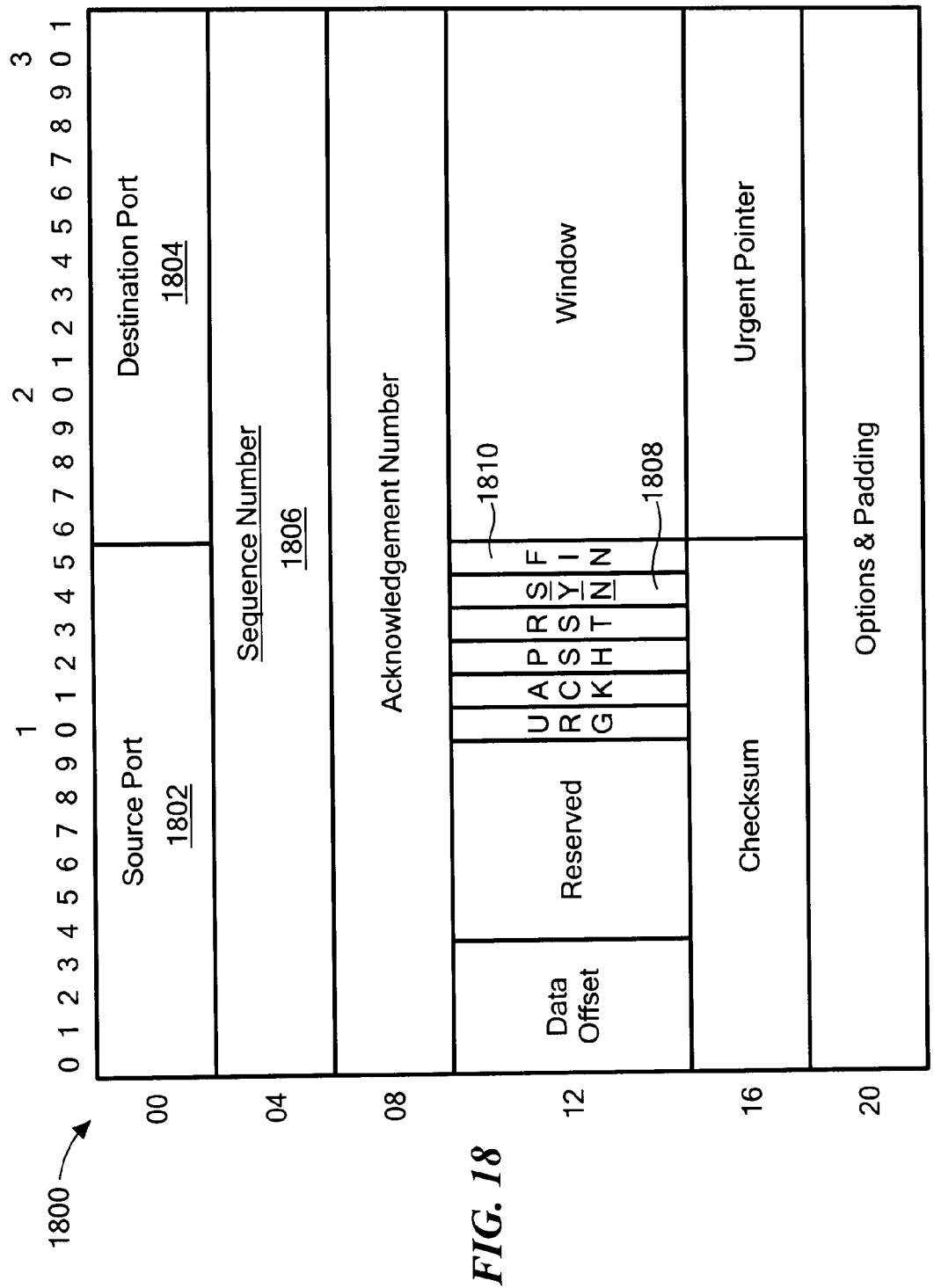
FIG. 18 schematically shows a layout of a TCP header, identifying fields used for identifying a beginning of a session, in accordance with one exemplary embodiment.

FIG. 18 is a schematic layout of a TCP header 1800, including a Source Port 1802, a Destination Port 1804, a Sequence Number 1806, a SYN flag 1808 and a FIN flag 1810. TCP is described generally in IETF RFC 793, which is hereby incorporated herein by reference in its entirety. Similar to TCP, the UDP header includes a Source Port field and a Destination Port field. UDP is described generally in IETF RFC 768, which is hereby incorporated herein by reference in its entirety.

These packets and the identified fields may be used to identify the beginning of a session, as summarized in the following table.

| Data Item | Where From | Description |
|---|---|---|
| Physical Interface | Ethernet Header | This is the actual port that the message was received on, which can be associated or discerned by the Destination MAC Address |
| Tenant | Ethernet Header OR Source MAD Address & Previous Advertisement | Logical association with a group of computers. |
| Protocol | IP Header | This defines the protocol in use and, for the TCP case, it must be set to a value that corresponds to TCP |
| Source IP Address | IP Header | Defines the source IP Address of the initial packet of a flow. |
| Destination IP Address | IP Header | Defines the destination IP Address of the initial packet of a flow. |

| Data Item | Where From | Description |
| --- | --- | --- |
| Source Port | TCP or UDP Header | Defines the flow instance from the source. This may reflect a client, a firewall in front of the client, or a carrier grade NAT. |
| Destination Port | TCP or UDP Header | This defines the desired service requested, such as 80 for HTTP. |
| Sequence Number | TCP Header | This is a random number assigned by the client. It may be updated by a firewall or carrier grade NAT. |
| SYN Bit On | TCP Header | When the SYN bit is on, and no others, this is an initial packet of a session. It may be retransmitted if there is no response to the first SYN message. |

The lead packet, and hence the session identifying information, can include information from a single field or can include information from multiple fields. In certain exemplary embodiments, sessions are based on a "5-tuple" of information including the source IP address, source port number, destination IP address, destination port number, and protocol from the IP and TCP headers.

Bi-Flow Route Enforcement

As discussed above, when a first packet for a new session arrives at an AIPR on a given ingress interface, the AIPR establishes a stateful routing session for routing forward and return session packets. In order to establish a bi-flow route, the AIPR typically establishes the session such that return session packets will be forwarded back over the ingress interface used for forward session packets such that both forward session packets and return session packets associated with the session traverse the same set of AIPRs. In certain exemplary embodiments, the AIPR will only establish the bi-flow route if the ingress interface is suitable for use in forwarding return session packets, for example, as described in 15/169,003. In such exemplary embodiments, when a first packet for a new session arrives at an AIPR on a given ingress interface, the AIPR determines whether the ingress interface is suitable for use in forwarding return session packets. In certain exemplary embodiments, determining whether the ingress interface is suitable for the return path includes first determining if the routing information base includes a valid route for the return path and, if so, determining whether the next hop on the return path is associated with the ingress interface. If there is a valid route for the return path and the next hop for the route is associated with the ingress interface, then the ingress interface is deemed to be suitable for the return path; otherwise the ingress interface is deemed to be not suitable for the return path. Additionally or alternatively, if a certain level of performance is required (e.g., bandwidth, error rate, latency, etc.), then the AIPR may determine whether the ingress interface can provide that level of performance for return packets. If the ingress interface is suitable for the return path, then the AIPR may continue to establish the bi-flow routing session using the ingress port for the return path. If the ingress interface is not suitable for the return path, then the AIPR may drop the session (e.g., by either sending back a session rejection message or sending back no reply message).

Flow Modification

As discussed above, under some circumstances, a TAR may be configured to modify the bi-flow route of a TCP session if the number or rate of errors is above a predetermined threshold, based on the determined location of the TCP session errors. For example, with reference again to FIG. 7, assume that AIPR 2 714 determines that errors are occurring on the service-side of the TCP session and the errors are due to a problem with the communication link between AIPR 2 714 and Router 720. Then, AIPR 2 714 may modify the bi-flow route to bypass the problematic communication link by routing session packets via AIPR 3 718 and AIPR 4 722. Such modification of the bi-flow route may involve AIPR 2 714 selecting a new router interface for the TCP session (i.e., the interface to Router 712) and then modifying the flows associated with the TCP session to utilize the new router interface and propagate the modification to AIPR 3 718 and AIPR 4 722.

FIG. 39 shows an enlarged section of FIG. 7 focusing on AIPR 2 714. Prior to any bi-flow route modification, the bi-flow session between the source client node 726 and the destination service node 728 traverses AIPR 2 714 via interfaces 1 and 2. Thus, AIPR 2 714 typically has forward and return flows between interface 1 (the "ingress" interface for packets sent by the source node to the destination node) and interface 2 (the "egress" interface for packets sent by the source node to the destination node). In certain exemplary embodiments, each AIPR maintains a flow configuration information record for each flow that it manages, where each flow is associated with a session. Thus, AIPR 2 714 maintains a flow configuration information record for the flows between interfaces 1 and 2 for the session. The flow configuration information record generally allows for bi-directional packet forwarding within the router. Specifically, among other things, the flow configuration information record maintained by AIPR 2 714 may associate or map egress interface 2 with session packets received over ingress interface 1 and may associate or map ingress interface 1 with return session packets received over egress interface 2. In certain exemplary embodiments, the flow configuration information record for a packet received on an interface can be found using a set of information including session information associated with the packet (e.g., the 5-tuple information associated with the packet) plus a VLAN identifier and interface identifier (i.e., the "7-tuple").

In certain exemplary embodiments, in order to modify the bi-flow route, AIPR 2 714 deactivates the existing flows for the session, sets up new flows for the session while the existing flows are deactivated (during which time any packets received with respect to the existing flows may receive special handling, e.g., by directing the packets to the service path, buffering the packets until the new flow is activated, or dropping the packets), and then activates the new flows so that packets can then be forwarded by the new flows, for example, as described in 15/168,700. In this example, AIPR 2 714 modifies the flows for the session to utilize interfaces 1 and 3. Specifically, among other things, the flow configuration information record maintained by AIPR 2 714 may now associate or map egress interface 3 with session packets received over ingress interface 1 and may associate or map ingress interface 1 with return session packets received over egress interface 3. AIPR 2 714 also addresses forward session packets to AIPR 3 718 rather than to AIPR 4 722.

Thus, forward session packets will now be routed to AIPR 3 718. One issue here is that AIPR 3 718 is not part of the stateful bi-flow route for the session. Therefore, AIPR 3 718 will not have any information for the session and will not have flows established to route forward packets received from AIPR 2 714 to AIPR 4 722 and to route return packets received from AIPR 4 722 to AIPR 2 714. Similarly, AIPR 4 722 will not recognize packets received from AIPR 3 718 as being part of the stateful bi-flow session, and will continue to route return packets to AIPR 2 714.

Therefore, in certain exemplary embodiments, AIPR 2 714 inserts session metadata (e.g., including a 5-tuple of information for the session) in at least the first packet it forwards to AIPR 3 718 over egress interface 3, e.g., substantially as described above. Typically, AIPR 2 714 is aware that AIPR 3 718 is an AIPR and therefore supports such metadata, although in some exemplary embodiments, AIPR 2 714 may not be aware that AIPR 3 718 is an AIPR but still may insert such session metadata into the packet. The metadata allows AIPR 3 718 to set up a flow configuration information record for the session for stateful routing, as discussed above. Thus, when new flow is activated, the next packet that reaches the flow is essentially treated as a first packet and is attached to the same session as that of the original flow.

Similarly, AIPR 3 718 inserts session metadata in at least the first packet it forwards to AIPR 4 722. The metadata allows AIPR 4 722 to recognize the packet as belonging to the stateful bi-flow route and to recognize that the stateful bi-flow route has been modified. Consequently, AIPR 4 722 performs a flow modification to continue the stateful bi-flow routing session via AIPR 3 718, e.g., AIPR 4 722 would then address return packets to AIPR 3 718 rather than to AIPR 2 714. If AIPR 4 722 receives the packet from AIPR 3 718 on a different interface than packets from AIPR 2 714 were being received, then such flow modification typically would include modifying the flows to associate the new interface with the stateful bi-flow route.

In certain exemplary embodiments, deactivating the flow configuration information record associated with a flow during a flow modification involves the service path setting the valid field of the associated chain descriptor to indicate that the action chain is invalid/deactivated. At this point, no further packets can be forwarded using the deactivated action chain. The service path generates a new action chain for the new flow and attaches it to the old chain descriptor. In order to activate the new action chain, the service path sets the valid field of the chain descriptor to indicate that the action chain is valid/activated, thus permitting packets associated with the affected session/flow to now be forwarded via the new action chain. At this point, the fast path can take over forwarding of packets associated with the session in both directions, using the activated action chain. The service path can delete any obsoleted action chain at an appropriate time, e.g., as a background function.

In various embodiments, a session may be associated with separate forward and reverse flows having separate action chains. When a flow modification event occurs as discussed above, both flows generally would be deactivated, modified as needed, and then reactivated.

When a flow associated with a session is modified, or when a new flow is created for an existing session, data for the session (e.g., parameters, counters, functions) and flow specific contexts (e.g., TCP state machine, reverse metadata) can be lost, e.g., from an original flow (e.g., action chain) that is being removed or deleted. Thus, in certain exemplary embodiments, such session information (e.g., from the old action chain) is stored as a "shared context" in a shared memory, e.g., a memory that is shared by the fast path and service path. Then, the new or modified flow (e.g., the new action chain) can use the information from the shared context (e.g., TCP state machine, reverse metadata, BFD echo states, etc.) in order to seamlessly continue the session. Specifically, the router deactivates the existing flows associated with the session, saves context information for the session in a shared memory, sets up new flows for the session, links the new flows to the saved context information for the session, and then activates the new flows. The new flows use the saved context information to continue the session.

Sample AIPR/TAR Architecture

Figure 19:
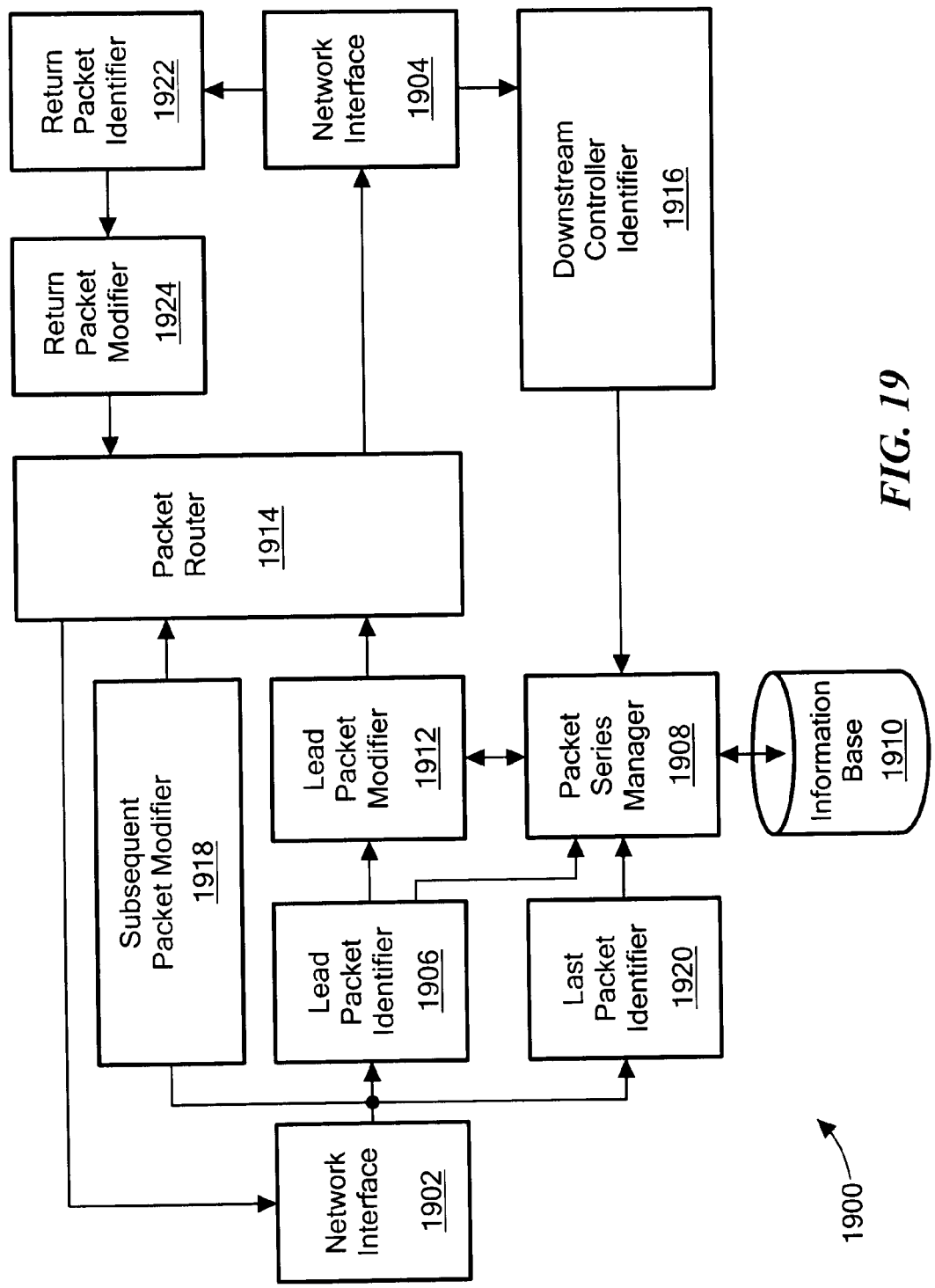
FIG. 19 schematically shows a block diagram of an AIPR of FIG. 7, in accordance with one exemplary embodiment.

FIG. 19 is a schematic block diagram of an AIPR (waypoint) 1900 configured in accordance with certain illustrative embodiments of the invention. The AIPR 1900 includes at least two network interfaces 1902 and 1904, through which the AIPR 1900 may be coupled to two or more networks. The interfaces 1902 and 1904 may be, for example, Ethernet interfaces. The AIPR 1900 also includes a packet router, which, in this example, encompasses elements 1906-1926 and is configured to implement both stateful routing and bilateral TCP state machines as discussed herein. The packet router of AIPR 1900 may send and receive packets via the interfaces 1902 and 1904.

A lead packet identifier 1906 automatically identifies lead packets, as discussed herein. In general, the lead packet identifier 1906 identifies a lead packet when the lead packet identifier 1906 receives a packet related to a session that is not already represented in the AIPR's information base 1910, such as a packet that identifies a new source client/destination service network address/port number pair. As noted, each lead packet is an initial, non-dropped, packet of a series of packets (session). Each session includes a lead packet and at least one subsequent packet. The lead packet and all the subsequent packets are sent by the same source client toward the same destination service, for forward flow control. For forward and backward flow control, all the packets of the session are sent by either the source client or the destination service toward the other.

A session (packet series) manager 1908 is coupled to the lead packet identifier 1906. For each session, the session manager assigns a unique identifier. The unique identifier may be, for example, a combination of the network address of the AIPR 1900 or of the interface 1902, in combination with a first port number assigned by the session manager 1908 for receiving subsequent packets of this session. The unique identifier may further include the network address of the AIPR 1900 or of the other interface 1904, in combination with a second port number assigned by the session manager 1908 for transmitting the lead packet and subsequent packets. This unique identifier is associated with the session. The session manager 1908 stores information about the session in an information base 1910. This information may include the unique identifier, in association with the original source client/destination service network address/port number pairs.

Figure 20:
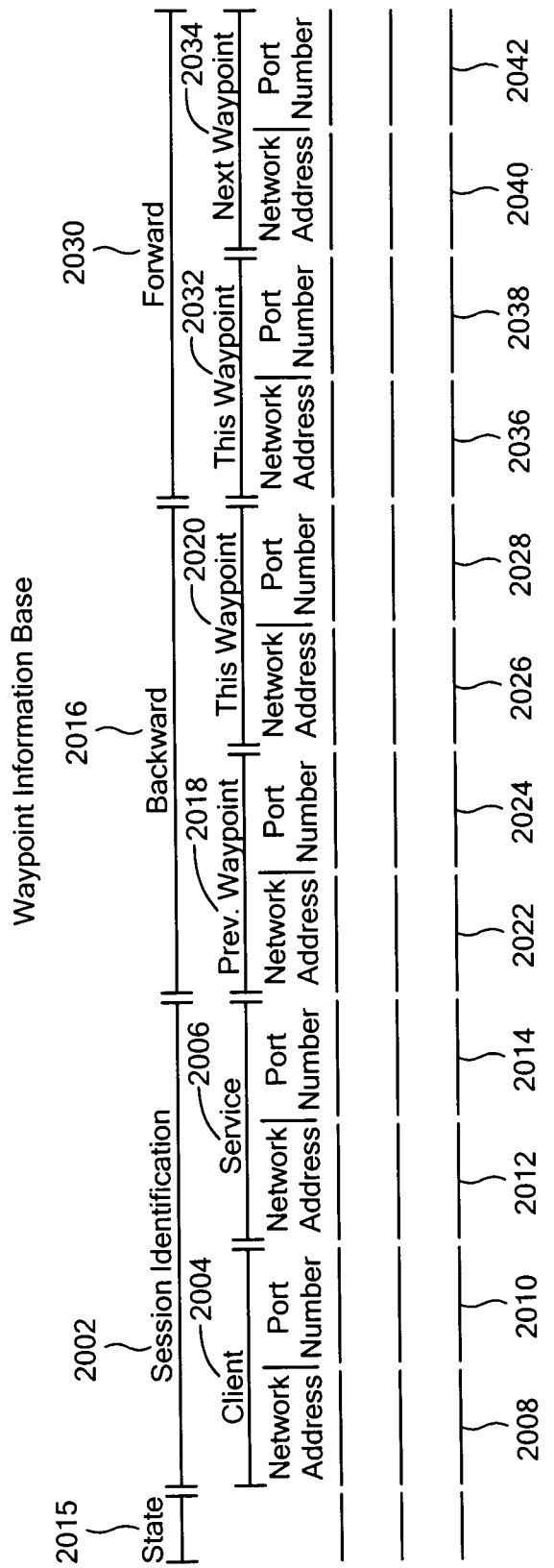
FIG. 20 shows a schematic illustration of information stored in an information base by the AIPR of FIGS. 7 and 19, in accordance with one exemplary embodiment.

FIG. 20 is a schematic layout of an exemplary waypoint information base 2000. Each row represents a session. A session identification column 2002 includes sub-columns for the source client 2004 and the destination service 2006. For each client 2004, its network address 2008 and port number 2010 are stored. For each destination service 2006, its network address 2012 and port number 2014 are stored. This information is extracted from the lead packet.

State information about the session may be stored in a state column 2015. This information may be used to statefully follow a series of packets, such as when a session is being initiated or ended.

A backward column includes sub-columns for storing information 2016 about a portion of the backward path, specifically to the previous AIPR. The backward path information 2016 includes information 2018 about the previous AIPR and information 2020 about the present AIPR 1900. The information 2018 about the previous AIPR includes the AIPR's network address 2022 and port number 2024. The session manager 1908 extracts this information from the lead packet, assuming the lead packet was forwarded by an AIPR. If, however, the present AIPR 1900 is the first AIPR to process the lead packet, the information 2018 is left blank as a flag. The information 2020 about the present AIPR 1900 includes the network address 2026 of the interface 1902 over which the lead packet was received, as well as the first port number 2028 assigned by session manager 1908.

The waypoint information base 2000 is also configured to store information 2030 about a portion of the forward path (of a session), specifically to the next AIPR. This information 2030 includes information 2032 about the present AIPR 1900 and information 2034 about the next AIPR along the path, assuming there is a next AIPR. The information 2032 includes the network address 2036 of the interface over which the present AIPR will send the lead packet and subsequent packets, as well as the second port number 2038 assigned by the session manager 1908. The information 2034 about the next AIPR along the path may not yet be available, unless the AIPR is provisioned with information about the forward path. The information 2034 about the next AIPR includes its network address 2040 and port number 2042. If the information 2034 about the next AIPR is not yet available, the information 2034 may be filled in when the AIPR 1900 processes a return packet, as described below.

Some embodiments of the waypoint information base 2000 may include the forward information 2030 without the backward information 2016. Other embodiments of the waypoint information base 2000 may include the backward information 2016 without the forward information 2030. Statistical information may be gathered and/or calculated using either or both forward and backward information 2016.

Returning to FIG. 19, a lead packet modifier 1912 is coupled to the session manager 1908. The lead packet modifier 1912 modifies the lead packet to store the unique identifier associated with the session. The original source client network address/port number pair, and the original destination service network address/port number pair, are stored in the modified lead packet, if necessary. The lead packet may be enlarged to accommodate the additional information stored therein, or existing space within the lead packet, such a vendor specific attribute field, may be used. Other techniques for transmitting additional information are protocol specific, for example with TCP, the additional information could be transmitted as a TCP Option field, or added to the SYN packet as data. In either case, the term session data block is used to refer to the information added to the modified lead packet.

Figure 21:
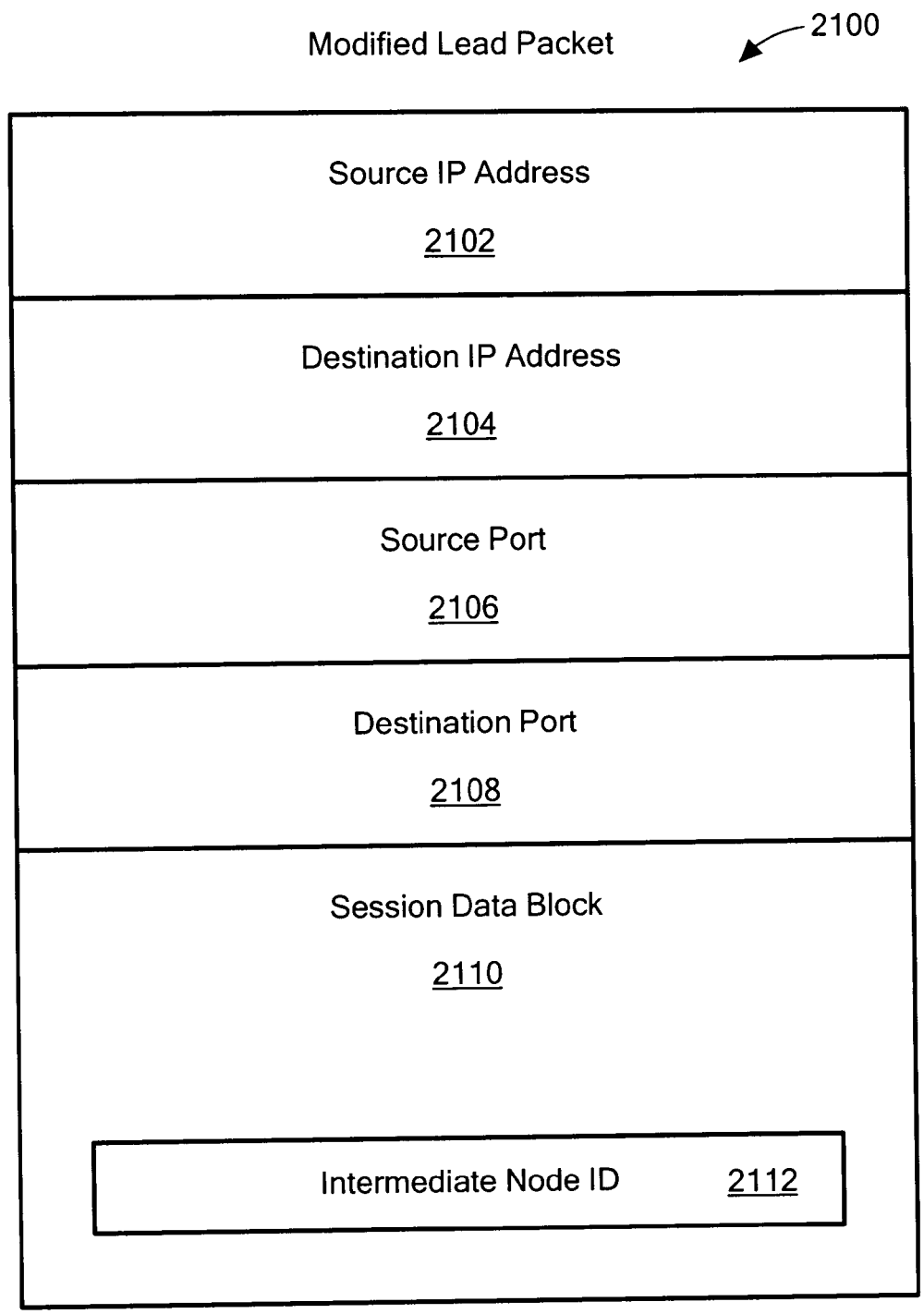
FIG. 21 schematically shows a modified lead packet produced by the AIPR of FIGS. 7 and 19, in accordance with one exemplary embodiment.

FIG. 21 is a schematic diagram of an exemplary modified lead packet 2100 showing the original source and destination IP addresses 2102 and 2104, respectively, and the original source and destination port numbers 2106 and 2108, respectively. FIG. 21 also shows a session data block 2110 in the modified lead packet 2100. Although the session data block 2110 is shown as being contiguous, it may instead have its contents distributed throughout the modified lead packet 2100. The session data block 2110 may store an identification of the sending AIPR, i.e., an intermediate node identifier 2112, such as the network address of the second network interface 2104 and the second port number.

Returning to FIG. 21, the lead packet modifier 2112 updates the packet length, if necessary, to reflect any enlargement of the packet. The lead packet modifier 2112 updates the checksum of the packet to reflect the modifications made to the packet. The modified lead packet is then transmitted by a packet routing engine 1914, via the second network interface 1904. The modified lead packet is naturally routed, unless the AIPR 1900 has been provisioned with forward path information.

Eventually, the destination service sends a return packet. The AIPR 1900 receives the return packet via the second interface 1904. If another AIPR (downstream AIPR) between the present AIPR 1900 and the destination service handles the lead packet and the return packet, the downstream AIPR modifies the return packet to include the downstream AIPR's network address and a port number. A downstream controller 1916 identifier uses stateful inspection, as described herein, to identify the return packet. The downstream controller 1916 stores information 2034 (FIG. 20), specifically the network address and port number, about the next AIPR in the waypoint information base 2000. The present AIPR 1900 may use this information to address subsequent packets to the next AIPR. Specifically, a subsequent packet modifier 1918 may set the destination address of the subsequent packets to the network address and port number 2040 and 2042 (FIG. 20) of the next waypoint, instead of directly to the destination service. The packet routing engine 1914 sends the subsequent packets, according to their modified destination addresses. Thus, for each series of packets, subsequent packets flow through the same downstream packet flow controllers as the lead packet of the series of packets.

A last packet identifier 1920 statefully follows each session, so as to identify an end of each stream, as discussed above. As noted, in some cases, the end is signified by a final packet, such as a TCP packet with the RST flag set or a TCP ACK packet in return to a TCP packet with the FIN flag set. In other cases, the end may be signified by a timer expiring. When the end of a session is detected, the packet series manager 1908 disassociates the unique identifier from the session and deletes information about the session from the waypoint information base 2000.

Where the AIPR 1900 is provisioned to be a last AIPR before a destination service, the lead packet modifier 1906 restores the lead packet to the state the lead packet was in when the source client sent the lead packet, or as the lead packet was modified, such as a result of network address translation (NAT). Similarly, the subsequent packet modifier 1918 restores subsequent packets.

Similarly, if the destination address of the lead packet is the same as the network address of the AIPR 1900, or its network interface 1902 over which it receives the lead packets, the lead packet modifier 1906 and the subsequent packet modifier 1918 restore the packet and subsequent packets.

As noted, in some protocols, several packets are required to initiate a session, as with the SYN-SYN/ACK-ACK handshake of the TCP. Thus, the downstream controller identifier 1916 may wait until a second return packet is received from the destination service before considering a session as having started.

As noted, some embodiments of the waypoint 1900 also manage return packet paths. The lead packet identifier 1906 automatically ascertains whether a lead packet was forwarded to the waypoint 1900 by an upstream waypoint. If the lead packet includes a session data block, an upstream waypoint forwarded the lead packet. The packet series manager 1908 stores information about the upstream waypoint in the waypoint information base 1910. A return packet identifier 1922 receives return packets from the second network interface 1904 and automatically identifies return packets of the session. These return packets may be identified by destination address and port number being equal to the information 2032 (FIG. 20) in the waypoint information base corresponding to the session. A return packet modifier modifies the return packets to address them to the upstream waypoint for the session, as identified by the information 2018 in the waypoint information base 2000.

In the exemplary embodiment shown in FIG. 19, the AIPR is a TAR in which the packet router is configured to implement bilateral TCP state machines 1926 to monitor TCP sessions associated with stateful bi-flow routes. In this example, the bilateral TCP state machines 1926 are shown as being part of the packet routing engine 1914, in which case the bilateral TCP state machines 1926 may process forward packets via Lead Packet Modifier 1912 and return packets via Return Packet Modifier 1924 for a given TCP bi-flow session, with the Bilateral TCP State Database including Bilateral TCP State Records of the type shown in FIG. 25 maintained by the bilateral TCP state machines 1926 in a packet router memory (e.g., a memory such as Shared Memory 432 shown in FIG. 5) and/or in the Information Base 1910. In alternative embodiments, the bilateral TCP state machines 1926 may be separate from the packet routing engine 1914 and may have distributed components (e.g., a forward path bilateral TCP state machine processor that processes forward packets and a return path bilateral TCP state machine processor that processes return packets, where such processing may occur prior to any packet modification for stateful routing).

Figure 22:
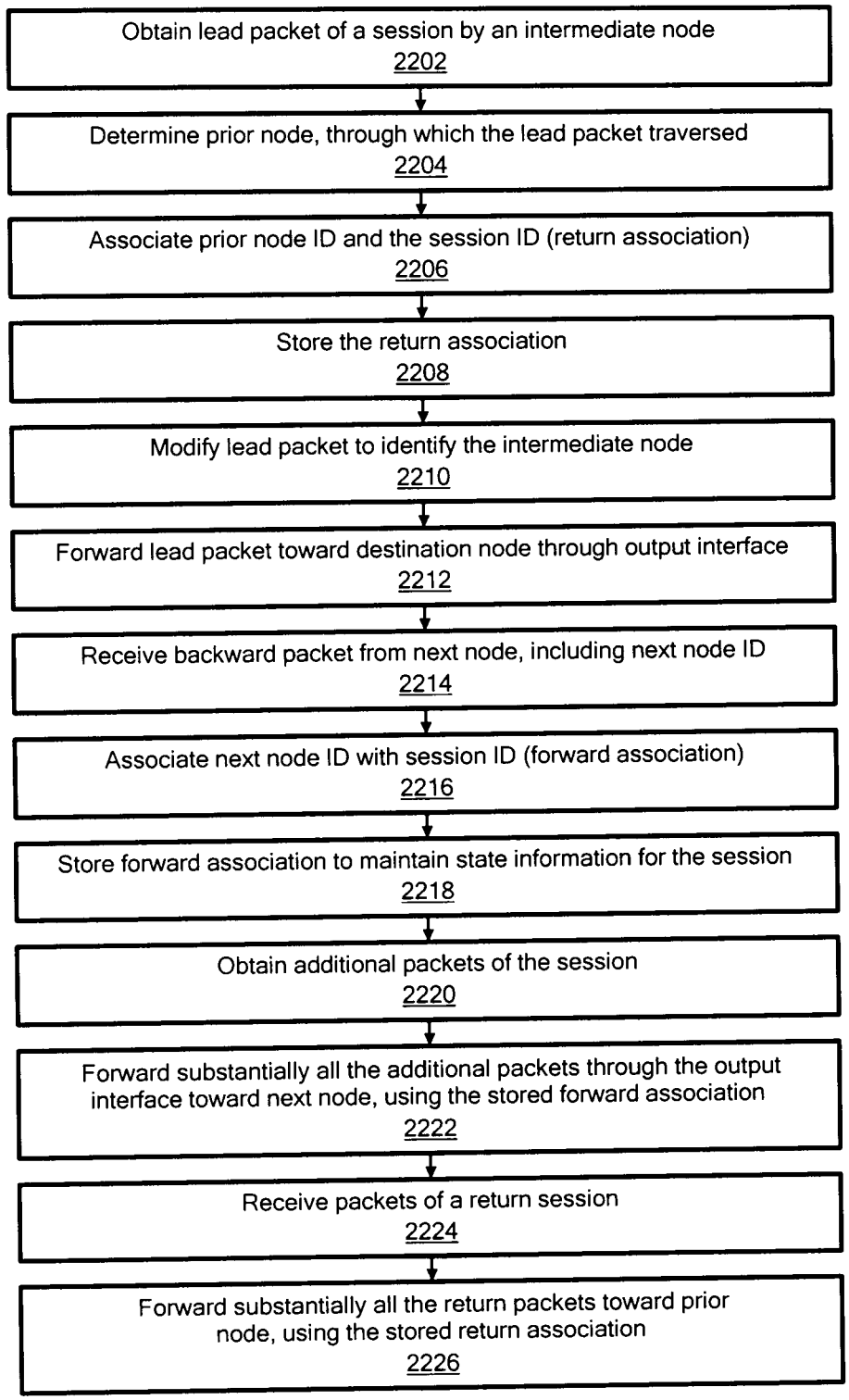
FIG. 22 is a flowchart illustrating some of the operations performed by the AIPR of FIGS. 7 and 19, in accordance with one exemplary embodiment.

FIG. 22 shows a flowchart schematically illustrating some operations performed by the AIPR 1900 (FIG. 19) in accordance with illustrative embodiments of the invention. The flowchart illustrates a packet routing method for directing packets of a session from an originating node toward a destination node in an IP network. At 2202, an intermediate node obtains a lead packet of a plurality of packets in a session. The intermediate node may include a routing device or a switching device that performs a routing function.

The packets in the session have a unique session identifier. At 2204, a prior node, through which the lead packet traversed, is determined. The prior node has a prior node identifier. At 2206, a return association is formed between the prior node identifier and the session identifier. At 2208, the return association is stored in memory to maintain state information for the session.

At 2210, the lead packet is modified to identify at least the intermediate node. At 2212, the lead packet is forwarded toward the destination node though an intermediate node electronic output interface to the IP network. The next hop node may be determined any number of ways. The electronic output interface is in communication with the IP network. At 2214, a backward message (e.g., a packet, referred to as a "backward packet") is received through an electronic input interface of the intermediate node. The backward message is received from a next node having a next node identifier. The backward message includes the next node identifier and the session identifier. The electronic input interface is in communication with the IP network.

At 2216, a forward association is formed between the next node identifier and the session identifier. At 2218, the forward association is stored in memory, to maintain state information for the session. At 2220, additional packets of the session are obtained. At 2222, substantially all of the additional packets in the session are forwarded toward the next node, using the stored forward association. The additional packets are forwarded through the electronic output interface of the intermediate node.

At 2224, a plurality of packets is received in a return session, or a return portion of the session, from the destination. The return session is addressed toward the originating node. At 2226, substantially all the packets in the return session are forwarded toward the prior node, using the stored return association. The packets are forwarded through the electronic output interface.

Figure 23:
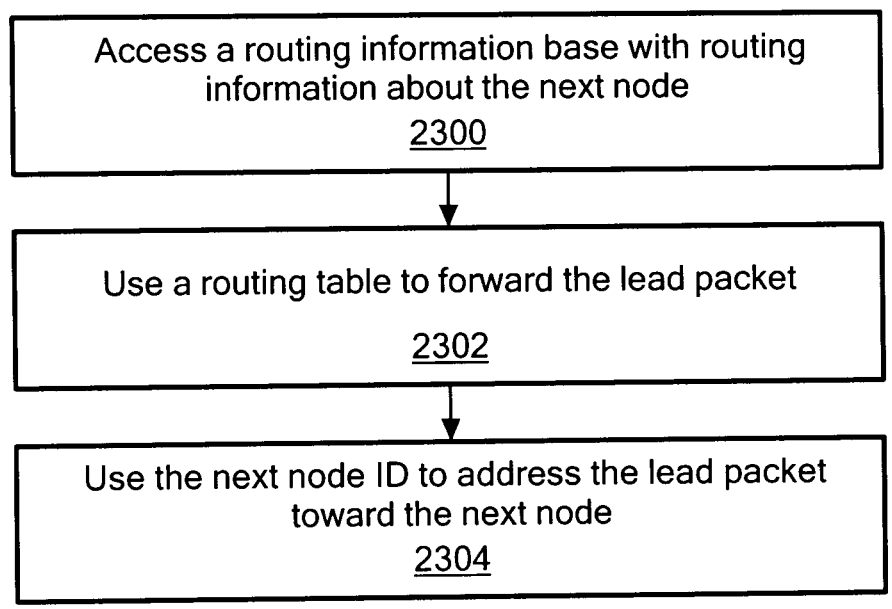
FIG. 23 is a flowchart illustrating some of the operations involved with forwarding a lead packet as part of the process of FIG. 22, in accordance with one exemplary embodiment.

FIG. 23 shows a high-level alternative process of managing the lead packet when establishing a session. As shown at 2300, forwarding the lead packet 2212 toward the destination node may include accessing a routing information base having routing information for the next hop node and other potential next nodes. As shown at 2302, the intermediate node may have a routing table, and forwarding the lead packet 2212 toward the destination node may include using the routing table to forward the lead packet toward the destination node and next hop node. As shown at 2304, forwarding the lead packet 2212 toward the destination node may include using the next node identifier to address the lead packet toward the next hop node. The lead packet may be addressed so that a plurality of network devices receives the lead packet after it is forwarded and before the next hop node receives the lead packet.

In FIG. 19, the depicted arrangement of elements is based on forward session packets entering Network Interface 1902 and exiting Network Interface 1904 while return session packets enter Network Interface 1904 and exit Network Interface 1902. It should be noted that, however, that different interfaces may be used for different roles for different TCP bi-flow sessions. For example, for another TCP bi-flow session, forward session packets may enter Network Interface 1904 and exit Network Interface 1902 while return session packets enter Network Interface 1902 and exit Network Interface 1904. For yet another TCP bi-flow session, forward session packets may enter Network Interface 1902 and exit some other network interface while return session packets enter that other network interface and exit Network Interface 1902. For yet another TCP bi-flow session, forward session packets may enter Network Interface 1904 and exit some other network interface while return session packets enter that other network interface and exit Network Interface 1904. For yet another TCP bi-flow session, session packets may flow through two network interfaces other than network interfaces 1902 and 1904. Generally speaking, for each TCP bi-flow session, lead/forward packet processing would be performed at the forward path incoming interface while return packet processing would be performed at the return path incoming interface.

In a manner similar to other components discussed above, the AIPR 1900 and all or a portion of its components 1902-1926 may be implemented by a processor executing instructions stored in a memory, hardware (such as combinatorial logic, Application Specific Integrated Circuits (ASICs), Field-Programmable Gate Arrays (FPGAs) or other hardware), firmware or combinations thereof.

Miscellaneous

It should be noted that headings are used above for convenience and are not to be construed as limiting the present invention in any way.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the REX processor) are necessarily non-conventional because, absent special programming or configuration, the conventional components do not inherently perform the described non-conventional functions.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A Transmission Control Protocol (TCP) augmented router capable of monitoring TCP sessions, the TCP augmented router comprising
   a plurality of network interfaces;
   a computer memory storing a bilateral TCP state database; and
   a packet router configured to implement, for each of a number of TCP bi-flow sessions established by the packet router, a bilateral TCP state machine that performs a process comprising:
   establishing, in the bilateral TCP state database, a bilateral TCP state record for the TCP bi-flow session including reference TCP sequence information for monitoring the TCP bi-flow session and statistical information regarding TCP errors detected by the bilateral TCP state machine;
   receiving, via a first network interface, forward session packets in transit from a source node to a target node;
   receiving, via a second network interface, return session packets in transit from the target node to the source node;
   monitoring the TCP bi-flow session based on received TCP sequence information from both the received forward session packets and the received return session packets and the reference TCP sequence information maintained in the bilateral TCP state record, including detecting TCP errors based on the received and reference TCP sequence information; and
   updating the bilateral TCP state record for the TCP bi-flow session, including updating the reference TCP sequence information in the bilateral TCP state record based on the received TCP sequence information from the received forward and return session packets and updating the statistical information in the bilateral TCP state record when a TCP error is detected.

2. A TCP augmented router according to claim 1, wherein at least one TCP bi-flow route is a stateful bi-flow route.

3. A TCP augmented router according to claim 1, wherein monitoring the TCP bi-flow session comprises:
   (a) for each received forward session packet:
      (i) determining a next sequence number expected from the source node based on the reference TCP sequence information maintained in the bilateral TCP state record;
      (ii) comparing a TCP sequence number in the received forward session packet with the next sequence number expected from the source node to determine if a TCP error occurred for the TCP bi-flow session; and (iii) updating the bilateral TCP state record, including updating the reference TCP sequence information in the bilateral TCP state record based on the TCP sequence number in the received forward session packet and updating the statistical information in the bilateral TCP state record when a TCP error is detected; and (b) for each received return session packet:

(i) determining a next sequence number expected from the target node based on the reference TCP sequence information maintained in the bilateral TCP state record;

(ii) comparing a TCP sequence number in the received return session packet with the next sequence number expected from the target node to determine if a TCP error occurred for the TCP bi-flow session; and (iii) updating the bilateral TCP state record, including updating the reference TCP sequence information in the bilateral TCP state record based on the TCP sequence number in the received return session packet and updating the statistical information in the bilateral TCP state record when a TCP error is detected.

4. A TCP augmented router according to claim 1, wherein monitoring the TCP bi-flow session comprises monitoring the TCP bi-flow session based on received TCP sequence and acknowledgment numbers from the received forward and return session packets, including detecting TCP errors based on the received TCP sequence and acknowledgment numbers and the reference TCP sequence information, and wherein updating the bilateral TCP state record for the TCP bi-flow session includes updating the reference TCP sequence information based on the received TCP sequence and acknowledgment numbers from the received forward and return session packets.

5. A TCP augmented router according to claim 1, wherein the process further comprises:

determining if the number or rate of TCP errors exceeds a predetermined threshold; and reconfiguring the TCP bi-flow session when the number or rate of TCP errors exceeds the predetermined threshold.

6. A TCP augmented router according to claim 5, wherein the TCP bi-flow route is associated with a forward flow and a return flow using the first and second network interfaces, and wherein reconfiguring the TCP bi-flow route comprises:

modifying the forward and return flows to utilize at least one network interface other than the first and second network interfaces; and transmitting stateful routing session metadata in at least one session packet following such modifying of the forward and return flows.

7. A TCP augmented router according to claim 1, wherein detecting TCP errors based on the received and reference TCP sequence information comprises:

determining a location of TCP errors based on the received and reference TCP sequence information.

8. A TCP augmented router according to claim 7, wherein the process further comprises at least one of:

updating a routing table of the TCP augmented router based on the determined location of TCP errors; or selecting a route based on the determined location of TCP errors.

9. A TCP augmented router according to claim 1, wherein the process further comprises:

determining if a received session packet is outside of an advertised window size for the TCP bi-flow session based on received TCP sequence information from the received session packet and the reference TCP sequence information maintained in the bilateral TCP state record; and dropping said packet without forwarding said packet when the bilateral TCP state machine determines that the received session packet is outside of the advertised window size for the TCP bi-flow session.

10. A TCP augmented router according to claim 1, wherein the process further comprises:

monitoring status of the TCP bi-flow session including determination of at least initiation, establishment, and termination of the TCP bi-flow session; and storing statistical information related to the status of the TCP bi-flow session.

11. A computer program product comprising a tangible, non-transitory computer readable medium having embodied therein a computer program that, when run on at least one computer processor, implements a packet router for a Transmission Control Protocol (TCP) augmented router having a plurality of network interfaces and a computer memory storing a bilateral TCP state database, the packet router configured to implement, for each of a number of TCP bi-flow sessions established by the packet router, a bilateral TCP state machine that performs a process comprising:

establishing, in the bilateral TCP state database, a bilateral TCP state record for the TCP bi-flow session including reference TCP sequence information for monitoring the TCP bi-flow session and statistical information regarding TCP errors detected by the bilateral TCP state machine;

receiving, via a first network interface, forward session packets in transit from a source node to a target node;

receiving, via a second network interface, return session packets in transit from the target node to the source node;

monitoring the TCP bi-flow session based on received TCP sequence information from both the received forward session packets and the received return session packets and the reference TCP sequence information maintained in the bilateral TCP state record, including detecting TCP errors based on the received and reference TCP sequence information; and updating the bilateral TCP state record for the TCP bi-flow session, including updating the reference TCP sequence information in the bilateral TCP state record based on the received TCP sequence information from the received forward and return session packets and updating the statistical information in the bilateral TCP state record when a TCP error is detected.

12. A computer program product according to claim 11, wherein at least one TCP bi-flow route is a stateful bi-flow route.

13. A computer program product according to claim 11, wherein monitoring the TCP bi-flow session comprises:

(a) for each received forward session packet:

(i) determining a next sequence number expected from the source node based on the reference TCP sequence information maintained in the bilateral TCP state record;

(ii) comparing a TCP sequence number in the received forward session packet with the next sequence number expected from the source node to determine if a TCP error occurred for the TCP bi-flow session; and (iii) updating the bilateral TCP state record, including updating the reference TCP sequence information in the bilateral TCP state record based on the TCP sequence number in the received forward session packet and updating the statistical information in the bilateral TCP state record when a TCP error is detected; and (b) for each received return session packet:
(i) determining a next sequence number expected from the target node based on the reference TCP sequence information maintained in the bilateral TCP state record;
(ii) comparing a TCP sequence number in the received return session packet with the next sequence number expected from the target node to determine if a TCP error occurred for the TCP bi-flow session; and
(iii) updating the bilateral TCP state record, including updating the reference TCP sequence information in the bilateral TCP state record based on the TCP sequence number in the received return session packet and updating the statistical information in the bilateral TCP state record when a TCP error is detected.

14. A computer program product according to claim 11, wherein monitoring the TCP bi-flow session comprises monitoring the TCP bi-flow session based on received TCP sequence and acknowledgment numbers from the received forward and return session packets, including detecting TCP errors based on the received TCP sequence and acknowledgment numbers and the reference TCP sequence information, and wherein updating the bilateral TCP state record for the TCP bi-flow session includes updating the reference TCP sequence information based on the received TCP sequence and acknowledgment numbers from the received forward and return session packets.

15. A computer program product according to claim 11, wherein the process further comprises:
determining if the number or rate of TCP errors exceeds a predetermined threshold; and
reconfiguring the TCP bi-flow session when the number or rate of TCP errors exceeds the predetermined threshold.

16. A computer program product according to claim 15, wherein the TCP bi-flow route is associated with a forward flow and a return flow using the first and second network interfaces, and wherein reconfiguring the TCP bi-flow route comprises:
modifying the forward and return flows to utilize at least one network interface other than the first and second network interfaces; and
transmitting stateful routing session metadata in at least one session packet following such modifying of the forward and return flows.

17. A computer program product according to claim 11, wherein detecting TCP errors based on the received and reference TCP sequence information comprises:
determining a location of TCP errors based on the received and reference TCP sequence information.

18. A computer program product according to claim 17, wherein the process further comprises at least one of:
updating a routing table of the TCP augmented router based on the determined location of TCP errors; or
selecting a route based on the determined location of TCP errors.

19. A computer program product according to claim 11, wherein the process further comprises:

determining if a received session packet is outside of an advertised window size for the TCP bi-flow session based on received TCP sequence information from the received session packet and the reference TCP sequence information maintained in the bilateral TCP state record; and
dropping said packet without forwarding said packet when the bilateral TCP state machine determines that the received session packet is outside of the advertised window size for the TCP bi-flow session.

20. A computer program product according to claim 11, wherein the process further comprises:
monitoring status of the TCP bi-flow session including determination of at least initiation, establishment, and termination of the TCP bi-flow session; and
storing statistical information related to the status of the TCP bi-flow session.

21. A method for monitoring Transmission Control Protocol (TCP) sessions by a TCP augmented router having a plurality of network interfaces and a computer memory storing a bilateral TCP state database, the method comprising, for each of a number of TCP bi-flow sessions established by the TCP augmented router, implementing a bilateral TCP state machine that performs a process comprising:
establishing, in the bilateral TCP state database, a bilateral TCP state record for the TCP bi-flow session including reference TCP sequence information for monitoring the TCP bi-flow session and statistical information regarding TCP errors detected by the bilateral TCP state machine;
receiving, via a first network interface, forward session packets in transit from a source node to a target node;
receiving, via a second network interface, return session packets in transit from the target node to the source node;
monitoring the TCP bi-flow session based on received TCP sequence information from both the received forward session packets and the received return session packets
and the reference TCP sequence information maintained in the bilateral TCP state record, including detecting TCP errors based on the received and reference TCP sequence information; and
updating the bilateral TCP state record for the TCP bi-flow session, including updating the reference TCP sequence information in the bilateral TCP state record based on the received TCP sequence information from the received forward and return session packets and updating the statistical information in the bilateral TCP state record when a TCP error is detected.

22. A method according to claim 21, wherein at least one TCP bi-flow route is a stateful bi-flow route.

23. A method according to claim 21, wherein monitoring the TCP bi-flow session comprises:
(a) for each received forward session packet:
(i) determining a next sequence number expected from the source node based on the reference TCP sequence information maintained in the bilateral TCP state record;
(ii) comparing a TCP sequence number in the received forward session packet with the next sequence number expected from the source node to determine if a TCP error occurred for the TCP bi-flow session; and
(iii) updating the bilateral TCP state record, including updating the reference TCP sequence information in the bilateral TCP state record based on the TCP sequence number in the received forward session packet and updating the statistical information in the bilateral TCP state record when a TCP error is detected; and (b) for each received return session packet:
(i) determining a next sequence number expected from the target node based on the reference TCP sequence information maintained in the bilateral TCP state record;
(ii) comparing a TCP sequence number in the received return session packet with the next sequence number expected from the target node to determine if a TCP error occurred for the TCP bi-flow session; and
(iii) updating the bilateral TCP state record, including updating the reference TCP sequence information in the bilateral TCP state record based on the TCP sequence number in the received return session packet and updating the statistical information in the bilateral TCP state record when a TCP error is detected.

24. A method according to claim 21, wherein monitoring the TCP bi-flow session comprises monitoring the TCP bi-flow session based on received TCP sequence and acknowledgment numbers from the received forward and return session packets, including detecting TCP errors based on the received TCP sequence and acknowledgment numbers and the reference TCP sequence information, and wherein updating the bilateral TCP state record for the TCP bi-flow session includes updating the reference TCP sequence information based on the received TCP sequence and acknowledgment numbers from the received forward and return session packets.

25. A method according to claim 21, wherein the process further comprises:
determining if the number or rate of TCP errors exceeds a predetermined threshold; and
reconfiguring the TCP bi-flow session when the number or rate of TCP errors exceeds the predetermined threshold.

26. A method according to claim 25, wherein the TCP bi-flow route is associated with a forward flow and a return flow using the first and second network interfaces, and wherein reconfiguring the TCP bi-flow route comprises:
modifying the forward and return flows to utilize at least one network interface other than the first and second network interfaces; and
transmitting stateful routing session metadata in at least one session packet following such modifying of the forward and return flows.

27. A method according to claim 21, wherein detecting TCP errors based on the received and reference TCP sequence information comprises:
determining a location of TCP errors based on the received and reference TCP sequence information.

28. A method according to claim 27, wherein the process further comprises at least one of:
updating a routing table of the TCP augmented router based on the determined location of TCP errors; or
selecting a route based on the determined location of TCP errors.

29. A method according to claim 21, wherein the process further comprises:
determining if a received session packet is outside of an advertised window size for the TCP bi-flow session based on received TCP sequence information from the received session packet and the reference TCP sequence information maintained in the bilateral TCP state record; and
dropping said packet without forwarding said packet when the bilateral TCP state machine determines that the received session packet is outside of the advertised window size for the TCP bi-flow session.

30. A method according to claim 21, wherein the process further comprises:
monitoring status of the TCP bi-flow session including determination of at least initiation, establishment, and termination of the TCP bi-flow session; and
storing statistical information related to the status of the TCP bi-flow session.

\* \* \* \* \*